US012608750B2

(12) United States Patent
 Ramer

(10) Patent No.: US 12,608,750 B2
(45) Date of Patent: Apr. 21, 2026

(54) SYSTEM AND METHOD FOR COVERING COST OF DELIVERING REPAIR AND MAINTENANCE SERVICES TO PREMISES OF SUBSCRIBERS INCLUDING PRICING TO RISK

(71) Applicant: Super Home, Inc., San Francisco, CA (US)

(72) Inventor: Jorey E. Ramer, Danville, CA (US)

(73) Assignee: Super Home, Inc., San Francisco, CA (US)

( * ) Notice: Subject to any disclaimer, the term of this patent is extended or adjusted under 35 U.S.C. 154(b) by 0 days.

(21) Appl. No.: 19/096,158

(22) Filed: Mar. 31, 2025

(65) Prior Publication Data

US 2025/0232382 A1 Jul. 17, 2025

Related U.S. Application Data

(63) Continuation-in-part of application No. 18/083,909, filed on Dec. 19, 2022, now abandoned, which is a continuation of application No. PCT/US2022/049162, filed on Nov. 7, 2022.

(60) Provisional application No. 63/276,770, filed on Nov. 8, 2021.

(51) Int. Cl.
| | |
|---|---|
| *G06Q 40/08* | (2012.01) |
| *G06Q 10/0635* | (2023.01) |
| *G06Q 10/20* | (2023.01) |
| *G06Q 30/0283* | (2023.01) |

(52) U.S. Cl.
 CPC ......... *G06Q 40/08* (2013.01); *G06Q 10/0635* (2013.01); *G06Q 10/20* (2013.01); *G06Q 30/0283* (2013.01)

(58) Field of Classification Search
 CPC .................................................... G06Q 40/08
 See application file for complete search history.

(56) References Cited

U.S. PATENT DOCUMENTS 12,288,014 B1 * 4/2025 Romero ................ G06N 20/20

* cited by examiner

*Primary Examiner* — Edward Chang
(74) *Attorney, Agent, or Firm* — Alexander Detschelt

(57) ABSTRACT

Methods and systems for enabling a host provider to provide a consumer homeowner with improved maintenance and repair services for items in the home are included under a subscription model that provides the consumer with predictable cost while assuring reliable services. The predictable cost and that presented for acceptance may be modified by interaction with remote data input from potential subscribers in real-time to maximize the amount of actual subscribers.

1 Claim, 12 Drawing Sheets

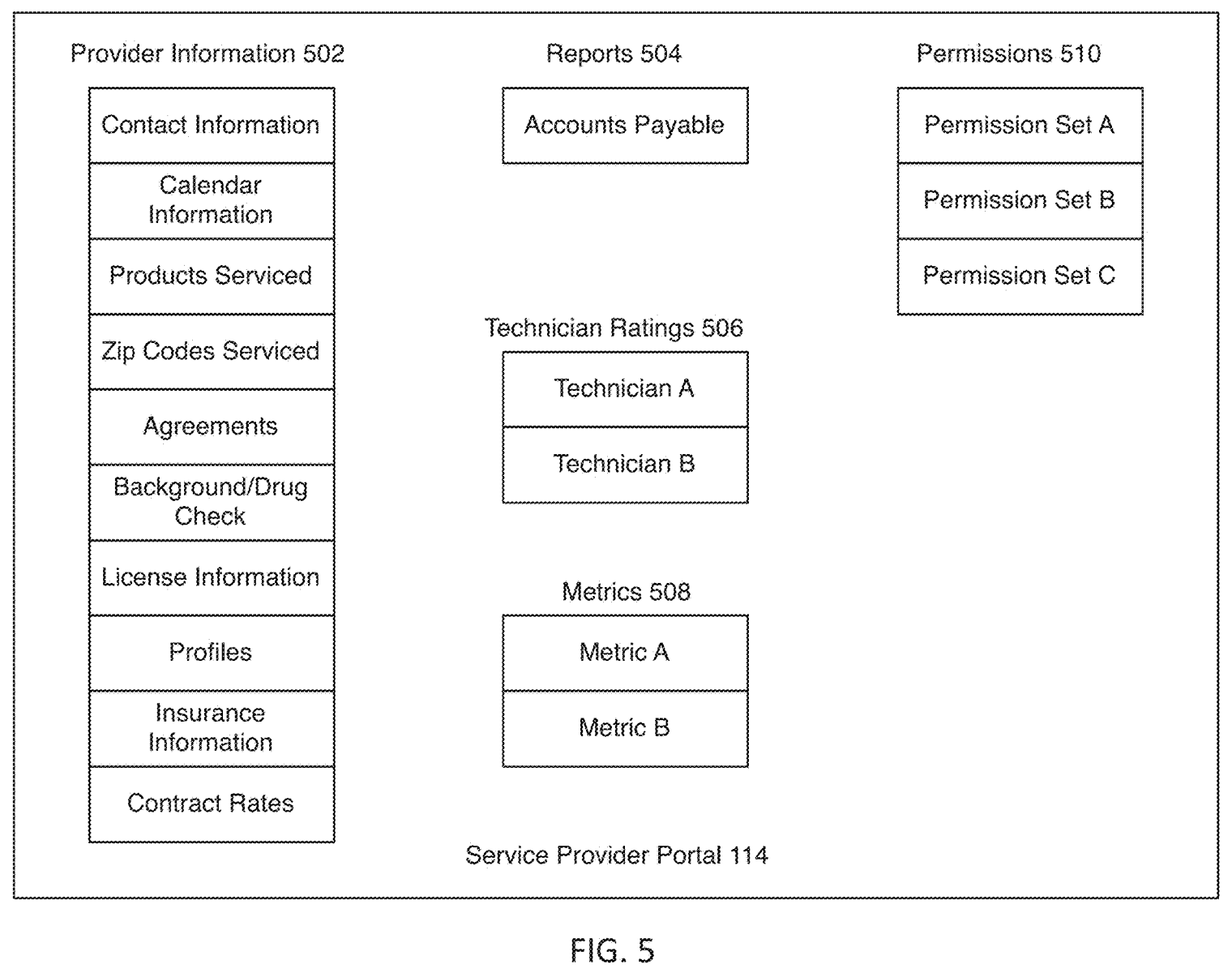

Permissions 510

| Permission Set A |
| Permission Set B |
| Permission Set C |

Reports 504

| Accounts Payable |

Technician Ratings 506

| Technician A |
| Technician B |

Metrics 508

| Metric A |
| Metric B |

Provider Information 502

| Contact Information |
| Calendar Information |
| Products Serviced |
| Zip Codes Serviced |
| Agreements |
| Background/Drug Check |
| License Information |
| Profiles |
| Insurance Information |
| Contract Rates |

Service Provider Portal 114

FIG. 5

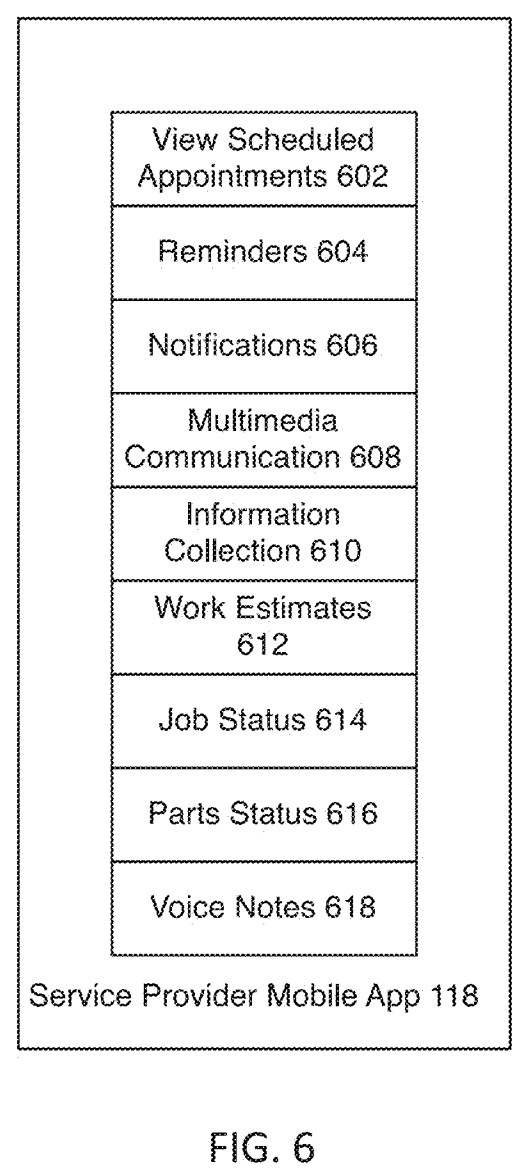

View Scheduled
Appointments 602

Reminders 604

Notifications 606

Multimedia
Communication 608

Information
Collection 610

Work Estimates
612

Job Status 614

Parts Status 616

Voice Notes 618

Service Provider Mobile App 118

FIG. 6

SYSTEM AND METHOD FOR COVERING COST OF DELIVERING REPAIR AND MAINTENANCE SERVICES TO PREMISES OF SUBSCRIBERS INCLUDING PRICING TO RISK

CROSS-REFERENCE TO RELATED APPLICATIONS

This application is a continuation-in-part of U.S. Non-provisional patent application Ser. No. 18/083,909 filed on Dec. 19, 2022, which is a bypass continuation that claims priority to International Patent Application No. PCT/US22/49162 filed on Nov. 7, 2022, which claims priority to U.S. Provisional Patent Application No. 63/276,770 filed on Nov. 8, 2021, where the entire contents of each of the foregoing are incorporated herein by reference in their entirety.

TECHNICAL FIELD

This disclosure generally relates to a field of home repair and maintenance, and more particularly to methods and systems for facilitating and covering a cost of long term repair and maintenance services for consumer and commercial subscribers through a host company's system or platform that makes use of information technology.

BACKGROUND

A typical home or property includes or is made up of various items or entities including structural elements, appliances, equipment, fixtures, furniture and the like. These entities are subject to potential problems that are unique to each entity and typically require maintenance and repair over time. Many if not most of these entities also require specific expert services that include the ability to diagnose the problems of the entities and maintain, repair, and/or replace the entities. These services are also known more generally as repair services.

Most homeowners/consumers lack the time and expertise to perform the repair services on the entities of their homes or properties themselves. As a result, the homeowners often hire service providers to perform the repair services. These service providers employ service professional individuals, also known as servicers, that have the specific expertise to perform the repair services on the entities. This expertise may include training and licensing that qualifies the servicers to perform the repair services, knowledge of and/or operation of one or more entities, and the ability to access and purchase inventory for replacement parts, in examples.

SUMMARY

One or more of the entities of a property may be covered by a warranty. A warranty may be a service contract between a homeowner and a service provider or other organization. In exchange for fees paid by the homeowner, the warranty may pay the cost of repair services, either in whole or in part, for one or more entities listed in or otherwise associated with the warranty. Thus, an entity listed in or otherwise associated with a warranty may also be known as a covered entity. For new entities, in one example, an initial warranty may be provided by a manufacturer or a retailer of an entity. Each initial warranty typically has a limited scope of repair service coverage and a time limit during which the warranty may be honored. Moreover, an entity that is otherwise listed in a home protection plan and has an amount of payment (either in whole or in part) associated with repair of that entity that the platform pays may also be known as a covered entity.

Home owners may also purchase additional warranties via a traditional home warranty service. These traditional home warranty services may allow homeowners to purchase new warranties for covered entities before the initial warranties lapse, for new entities not previously covered by a warranty, and to increase or decrease the scope of protection offered by an existing warranty for a covered entity, in examples.

In a traditional home warranty service, homeowners may typically submit home warranty claims to begin the process of scheduling repair services. Each claim may specify the one or more entities to which the repair service pertains and describes problems with the one or more entities. Via a process known as claim adjudication, a claim manager of the home warranty service may receive the claim, and may decide whether to pay the claim in whole or in part. The decision may be based upon whether the entity is a covered entity and whether the expected cost of the repair may be consistent with the scope of coverage or policy limits of the warranty, in examples.

The service providers may rely on information concerning the entities of the homeowners and upon various software and hardware-based components of their home service systems to schedule the repairs and dispatch servicers. These components may include various data sources and communication components. These systems may enable the scheduling and performance of large scale, efficient services to possibly thousands of homeowners or more.

Home repair and maintenance presents challenges for homeowners. Whether or not repair services are covered by a warranty, each homeowner usually bears the responsibility for contacting service providers to schedule and perform the repairs. The homeowners may also need to pay up-front costs for parts/inventory for the repairs, ensure that the repair services are performed properly, and pay invoices for the repair services performed. In addition, servicers may be difficult to find, visits may be difficult to schedule, and scheduled visits may be ineffective, as necessary parts may be absent, or a problem may be beyond the expertise of the scheduled servicer. The homeowners may also contract with service providers of uncertain quality, availability, and value to make repairs, thus exposing the homeowners to unpredictable patterns of expense. As a result, a need exists for methods and systems that improve the consumer/homeowner experience of scheduling repair services, such as by assuring the provision of available, high quality repair services at fair prices and with predicable costs.

Home repair and maintenance presents challenges for service providers as well. The information regarding the entities of homeowners has been historically lacking or otherwise not been accessible to service providers. In one example, makes, models and vintages of appliances and heating, ventilation, and air conditioning (HVAC) systems have historically been maintained or located across a wide range of different sources. These different sources include disparate companies that have sold appliances, installed equipment, or otherwise provided items to a particular consumer. Much of this information has not been available to anyone other than the consumer, and consumers have not typically cataloged this information in a way that is accessible to others. Also, a holistic view of different service providers, and in particular their relevancy to a given consumer homeowner, has also been lacking. For example, data about experiences of consumers with service providers and their servicers, and experiences of service providers with customers, has typically been limited to anecdotal information, or simple social network sites like Angie's List™ or ratings sites like Yelp™. In addition, integration and analysis of heterogeneous components of the home services systems, across many potentially relevant factors, has been challenging for technology developers of the home services systems of the service providers.

As increasing amounts of data are available about all of these factors, such as in the proliferation of data sources in a home as a result of emergence of the Internet of Things, and many other factors, a need also exists for improved information technology and analytic systems that will enable improved outcomes for both consumers and providers of home maintenance and repair services. Information about items in the home may be difficult to locate, as the information may be fragmented across many different vendors and service providers. Costs may be difficult to forecast, making it hard for homeowners to budget appropriately. Claims may be difficult to adjudicate, resulting in delays in reimbursement, inconsistent outcomes across similar claims, and other problems. As such, a need also exists for improved systems and methods for ameliorating a wide range of problems with current home repair and maintenance approaches.

Provided herein are systems and methods for enabling a host organization to offer and support a subscription for a consumer or homeowner. The subscription provides maintenance, preventative care, and repairs for the consumer's home, in examples. The host may use a range of data sources and structures, novel analytics, and various information technology elements to determine what resources should be used to provide services to the consumer, and the host pays for work to be done that may be covered by the subscription. Services that may be provided may include HVAC, appliances (e.g., refrigerator, washer, dryer), fixtures such as electrical wiring, receptacles, switches and lighting, plumbing, roofing, siding, foundation maintenance, and others.

Provided herein is an overall information technology system, with interrelated modules and components for enabling a host to facilitate provision of home maintenance and repair services to a consumer. The methods and systems disclosed herein may include an item scoring module for scoring at least one item based on its type, the score based at least in part on a probability of a need for maintenance or repair and the estimated cost of such maintenance or repair; a service provider scoring module for scoring at least one service provider based on at least one of the quality of maintenance or repairs provided by the service provider, the availability of the service provider, the reliability of the service provider and the cost of the service provider; and a pricing module for estimating the cost of providing a commitment to provide long term maintenance and repairs for the at least one scored item using at least one scored service provider. In example embodiments, the pricing module may include a facility for determining at least one of a loss ratio, an administrative cost, a lifetime value, and/or a renewal rate.

In example embodiments, the pricing module may include a pricing analysis module. In example embodiments, the methods and systems may include a consumer communication module, such as allowing communication to a consumer using various interfaces. The consumer communication module may include at least one of a scheduling module, a cost estimation module, a gamification module, and/or a coordination module. The system may further include a service fulfillment module. In example embodiments, the service fulfillment module may be used to select a service provider for fulfillment based at least in part on the service provider scoring module. In example embodiments, the methods and systems may include a bad faith detection module for determining bad faith behavior on the part of at least one of a consumer and a service provider. In example embodiments, the methods and systems may further include a service provider portal for facilitating interaction of a service provider with the system. In example embodiments, the service provider portal may facilitate the provision of information to a service provider mobile application that provides information about repair or maintenance activities for a service provider with respect to at least one item of at least one consumer.

References to the "host" herein refer to a user of the information technology methods and systems described herein in order to provide home maintenance, repair and similar services with respect to various items, such as appliances, equipment and the like, on behalf of the owner of a home, such as a consumer. The host may be a company that provides such services to the consumer on a subscription basis, such as for a predetermined monthly or annual fee.

A home protection plan may effectively provide subscription care for a premises, such as a home owned or leased by an individual. A home protection plan may include any of a home warranty, an extended warranty, and/or a home services contract. Each of the home warranty, extended warranty, and/or home services contract may include or are associated with one or more entities in or of the home or property of the individual. The home services contract may include repair services and maintenance services for each of the one or more entities. As a result, the cost of repair services for one or more entities in the subscriber's home may be covered (either in whole or in part) in the home protection plan of the subscriber. A home protection plan may provide subscription-based care for the subscriber's home and property.

Home repair and maintenance services companies may provide and support these home protection plans using a collection of computer systems, software systems, and/or services known as a home services platform. Individuals that pay for home protection plans are also known as subscribers of the home services platform.

The disclosure relates generally to a home services system and method.

According to some example embodiments of the disclosure, a home services system substantially as shown and described is disclosed.

According to some example embodiments of the disclosure, a method for providing home services substantially as shown and described is disclosed.

According to some example embodiments of the disclosure, a computer-implemented method substantially as hereinbefore described with reference to any of the examples and/or to any of the accompanying drawings is disclosed.

According to some embodiments of the disclosure, a computing system including one or more processors and one or more memories configured to perform operations substantially as hereinbefore described with reference to any of the examples and/or to any of the accompanying drawings is disclosed.

According to some example embodiments of the disclosure, a computer program product residing on a computer readable storage medium having a plurality of instructions stored thereon which, when executed across one or more processors, causes at least a portion of the one or more processors to perform operations substantially as hereinbefore described with reference to any of the examples and/or to any of the accompanying drawings is disclosed.

According to some example embodiments of the disclosure, a device configured substantially as hereinbefore described with reference to any of the examples and/or to any of the accompanying drawings is disclosed.

Disclosed herein is a proposed home services service (e.g., a home services platform) that includes systems and methods for covering the cost of delivering repair and maintenance services to premises of one or more subscribers, where service may be an included feature. The platform may use a range of data sources and structures, analytics, and various information technology elements, including artificial intelligence ("AI"), to determine what resources should be used to provide services to the subscriber, and the platform pays for work/jobs to be performed that is covered by the subscription. Services that may be provided may include repair services for any of the following entities: HVAC, appliances (e.g., refrigerator, washer, dryer), electrical, plumbing, roofing, siding, foundation maintenance, and the like.

In example embodiments, a method and system for automated adjudication of a home warranty claim is disclosed, which may include a set of adjudication rules for application to a set of parameters involved in a home warranty claim; a data storage system for receiving the set of parameters relating to the home warranty claim; and an automated adjudication agent for applying the adjudication rules to the set of parameters to produce an indicator of an outcome of adjudication regarding the claim. In embodiments, the set of adjudication rules may be configured in a graph structure. In embodiments, the graph structure may be a directed acyclic graph structure. In embodiments, the graph structure may be stored in a graph database. In embodiments, the set of adjudication rules may be embodied in a smart contract. In embodiments, the set of adjudication rules may exchange data with a smart contract. In embodiments, the set of adjudication rules may include at least one of a type of coverage rule, an amount of coverage rule, a duration of coverage rule, a deductible rule, a pre-existing condition rule, and an exclusion rule.

In embodiments, the set of parameters may include at least one of an age of item parameter, a cause of damage parameter, a type of damage parameter, a maintenance parameter, and a repair parameter. In embodiments, the data storage system may receive the set of parameters from a data collection system. In embodiments, the data collection system may collect data from at least one of a set of sensors in the home covered by the home warranty, a set of Internet of Things ("IoT") devices in the home covered by the home warranty, a set of environmental sensors in the environment of the home covered by the home warranty, a set of components in the home covered by the home warranty, and a set of vendors of items in the home covered by the home warranty.

In embodiments, the automated adjudication agent may use a robotic process automation system that is trained to apply the adjudication rules. In embodiments, the robotic process automation system may be trained on a training data set of adjudications by human adjudicators. In embodiments, the automated adjudication agent may be trained on a training data set of adjudication outcomes. In embodiments, the training of the automated adjudication agent may be supervised by an expert adjudicator. In embodiments, the methods and systems may further include an automated negotiation agent that is trained to negotiate a claim based on a training data set. In embodiments, the automated negotiation agent may be a robotic process automation agent that is trained based on a set of negotiation actions undertaken by a set of home warranty claim negotiators.

According to some example embodiments of the disclosure, a claim adjudication system in a home services platform is disclosed. The claim adjudication system may include a controller and a memory that stores non-transitory computer instructions for execution by the controller. The controller may be configured to execute the non-transitory computer instructions to cause the claim adjudication system to receive a service request for a property of a subscriber. The service request may relate to at least one repair service possibly covered by a home protection plan for the property of the subscriber. The claim adjudication system may receive a designation of a servicer to perform a job at the property of the subscriber based upon one or more problems identified by the subscriber in the service request. The claim adjudication system may receive a job estimate object for the job from the servicer that may include the one or more problems identified by the subscriber and an estimated cost prepared by the servicer to address the one or more problems. The claim adjudication system may determine whether to approve performance of the job in whole or in part by the servicer based upon coverage limits in the home protection plan for the job.

In example embodiments, the service request may be sent by an application ("app") accessed by the subscriber that executes on a user device. The app may create the service request from the one or more problems identified at the property that the subscriber entered into the app.

In example embodiments, the job estimate object may include a diagnosis of the one or more problems.

In example embodiments, the system may notify the servicer at the property of the subscriber as to whether the job is either rejected or approved in whole or in part, and if the job is approved in whole or in part, the servicer may perform the job.

In example embodiments, the system may determine a predicted cost of the job from a plurality of stored jobs of the same type. If a variance between the predicted cost and the estimated cost is below a threshold value, the system may approve the job in whole.

In example embodiments, the controller may determine whether to approve performance of the job in whole or in part by the servicer based upon the estimated cost being less than a threshold allowed cost for the job. In other example embodiments, the controller may determine whether to approve performance of the job in whole or in part by the servicer based upon a range of costs allowed for all jobs assigned to a particular servicer. In example embodiments, the controller may determine whether to approve performance of the job in whole or in part by the servicer based upon a range of costs allowed for a specific job type for all servicers. In example embodiments, the controller may determine whether to approve performance of the job in whole or in part by the servicer based upon a range of costs allowed for a specific job type matching a job type of the approved job for the servicer. The system may adjust the range of costs based upon a trust score calculated for the servicer.

In example embodiments, the system may be configured to adjust the estimated cost based upon a dispatch type of the job.

In example embodiments, the controller may notify the platform to pay the covered job in whole or in part by using the estimated cost of the associated job when at least performance of the job may be completed by the servicer. In some example embodiments, when the controller approves performance of the job in whole by the servicer, the controller may also notify the platform to pay a claim associated with the service request while the servicer remains at the property. In example embodiments, the controller may notify the platform to pay a servicer invoice associated with the job. The servicer invoice may be submitted by the servicer via an application executing on a user device carried by the servicer. The application may be in communication with the platform.

In example embodiments, the controller may determine whether to approve performance of the job in whole or in part by the servicer based upon a range of costs derived from previously approved jobs of a same type as the job. In other example embodiments, the controller may determine whether to approve performance of the job in whole or in part by the servicer based upon a minimum trust score calculated for the servicer.

In example embodiments, the controller may pass the estimated cost for the job as input to a trained machine learning model to obtain a predicted cost value as output. The controller may use the predicted cost value as the estimated cost. The trained machine learning model may be previously trained using training data that includes a plurality of previously approved jobs of a same type as the job. In example embodiments, the input passed to the trained machine learning model may further include contents of an inspection report of the property for the job. The trained machine learning model may be previously trained using training data that includes a plurality of inspection reports of properties for previously approved jobs of a same type as the job.

In example embodiments, the service request may include: a description of the at least one repair service to be performed at the property, one or more taxonomy of repair labels that may be associated with the at least one repair service, and/or a system taxonomy label that may identify a component or an aspect of the property that may be a subject of the at least one repair service.

In example embodiments, the home protection plan may include: a description of covered repairs and one or more taxonomy of repair labels that may be associated with the covered repairs, one or more covered entities of the property, and/or one or more system taxonomy labels associated with the one or more covered entities.

In example embodiments, the one or more problems may be associated with at least one of one or more taxonomy of repair labels or at least one of one or more system taxonomy labels. The at least one of the one or more taxonomy of repair labels or the at least one of the one or more system taxonomy labels may be included within the job estimate object.

In example embodiments, the service request may be verified by the system when a level of matching between one or more taxonomy of repair labels in the service request and one or more taxonomy of repair labels in the home protection plan for the subscriber meets a minimum matching score. In other example embodiments, the service request may be verified by the system when a level of matching between one or more system taxonomy labels in the service request and one or more system taxonomy labels in the home protection plan for the subscriber may meet a minimum matching score.

According to some example embodiments of the disclosure, a home services system is disclosed. The home services system may include a claim management system configured to receive service requests from subscribers of the home services system, in association with properties of the subscribers. Each service request may relate to at least one repair service possibly covered by a home protection plan for the property of each subscriber. The home services system may also include a claim adjudication system that may be configured to receive the service requests sent from the claim management system. The claim adjudication system may assign servicers to perform jobs at the properties of the subscribers based upon one or more problems identified by the subscribers in the service requests. The claim adjudication system may receive job estimate objects for the jobs from the servicers that may each include the one or more problems identified by each subscriber and an estimated cost to address the one or more problems. The claim adjudication system may determine whether to approve performance of the jobs in whole or in part by the servicers based upon coverage limits for each job in the home protection plan of each subscriber.

According to some example embodiments of the disclosure, a computer-implemented method for a claim adjudication system in a home services platform is disclosed. The method may include receiving a service request for a property of a subscriber. The service request may relate to at least one repair service possibly covered by a home protection plan for the property of the subscriber. The method may include receiving a designation of a servicer to perform a job at the property of the subscriber based upon one or more problems identified by the subscriber in the service request. The method may also include receiving a job estimate object for the job from the servicer that may include the one or more problems identified by the subscriber and an estimated cost prepared by the servicer to address the one or more problems. The method may include determining whether to approve performance of the job in whole or in part by the servicer based upon coverage limits in the home protection plan for the job.

According to some example embodiments of the disclosure, an intelligent pricing system in a home protection and service automation platform is disclosed. The intelligent pricing system may include a pricing engine and a memory that stores non-transitory computer instructions for execution by the pricing engine. The pricing engine may be configured to execute the non-transitory computer executable instructions to cause the pricing engine to calculate a price for a premium that an individual pays to be a subscriber of the platform based upon one or more risk factors of a property. The premium may be associated with a subscription that relates to at least one repair service possibly covered in a home protection plan for the property.

In example embodiments, the risk factors may include at least one of: a physical attribute of the property; a coverage level selected by the subscriber; state of repair information for covered entities at the property; and/or subscriber information associated with repair-related activities. In example embodiments, the state of repair information may include at least one of maintenance information, repair information, an age of the covered entities, and/or an indication of how often the covered entities are used by the subscriber. In example embodiments, the physical attribute of the property may include at least one of an age of the property, a condition of the property, a location of the property, and/or a square footage of the property. In example embodiments, the subscriber information may include at least a number of repairs requested by the subscriber and a timeliness of payment information by the subscriber for each of the requested repairs over a period of time that starts at a time of subscription. In example embodiments, the pricing system may further comprise a correlation engine that may compare the price of the premium calculated by the pricing engine for the requested repair against one or more prices of one or more stored objects for repairs previously adjudicated by the platform that may be related to the requested repair. The pricing engine may be configured to adjust the price for the premium in response to the comparison. In example embodiments, the correlation engine may compare the price of the premium calculated by the pricing engine for the requested repair against one or more prices of related repairs stored in a third-party database. The pricing engine may be configured to adjust the price for the premium in response to the comparison. In example embodiments, the risk factors may include at least state of operation information of the covered entities at the property of the subscriber. The state of operation information may be included within sensor data sent from one or more sensors of the covered entities.

In example embodiments, the pricing system may further comprise a ranking engine that identifies one or more stored objects for repairs previously adjudicated by the platform that may be related to the requested repair. The identification may be based upon a ranking score that the ranking engine calculates for each of the one or more stored objects.

In example embodiments, the pricing system may pass the calculated price of the premium for the requested repair, in conjunction with at least a portion of the risk factors upon which the pricing engine calculated the price, as input to a trained machine learning model to obtain a predicted price as output. The pricing engine may be configured to adjust the calculated price based upon the predicted price. In example embodiments, the machine learning model was previously trained using training data that may include a plurality of stored objects for repairs previously adjudicated by the platform. The stored objects may each include at least one of a price and the same risk factors.

In example embodiments, the one or more risk factors may be based on at least one of: a size of the property, an age of the property, a history of repair in the property, a make and model of systems and components in the property, an age of systems and components in the property, information obtained from one or more inspection reports for the property, and/or information provided by servicers for the property. In some example embodiments, the one or more risk factors may be based on at least one of: a customer score for the subscriber based on historical interactions with servicers, demographic information for the subscriber, and/or a history of service requests entered by the subscriber. In other example embodiments, the one or more risk factors may include public and semi-public information for the subscriber including at least one of: credit history, employment status, and/or court proceedings.

According to some example embodiments of the disclosure, a computer-implemented method for providing intelligent pricing is disclosed. The method may include calculating a price for a premium that an individual pays to be a subscriber based upon one or more risk factors of a property. The premium may be associated with a subscription that may relate to at least one repair service possibly covered in a home protection plan for the property.

In example embodiments, the risk factors may include at least one of: a physical attribute of the property, a coverage level selected by the subscriber, state of repair information for covered entities at the property, and/or subscriber information associated with claim-related activities. In example embodiments, the subscriber information may include at least a number of repairs requested by the subscriber and a timeliness of payment information by the subscriber for each of the requested repairs over a period of time that starts at a time of subscription. In example embodiments, the method may further comprise comparing the price of the premium calculated for the requested repair against one or more prices of one or more objects for repairs previously adjudicated that may be related to the requested claim and adjusting the price for the premium in response to the comparison. In example embodiments, the method may further comprise identifying one or more stored objects for repairs previously adjudicated that may be related to the requested repair. The identification may be based upon a ranking score calculated for each of the one or more stored objects. In some example embodiments, the method may further comprise passing the calculated price of the premium for the requested repair, in conjunction with at least a portion of the risk factors upon which the price is calculated, as input to a trained machine learning model to obtain a predicted price as output, and adjusting the calculated price based upon the predicted price.

According to some example embodiments of the disclosure, a home services platform is disclosed. The home services platform may include a service request system that may create service requests for repair services requested by subscribers of the platform. Each service request may relate to at least one repair service to be performed at a property of each subscriber and is possibly covered in a home protection plan for each subscriber. The home services platform may include a broker service that may designate servicers to perform jobs at the properties of the subscribers associated with the service requests by matching servicer profile objects of servicers registered with the platform to the service requests. The servicer profile objects may include information identifying the servicers and may include at least one repair service that the servicers provide, and binding at least some of the matching servicers to the jobs.

In example embodiments, the home services platform may further include a scheduling system that schedules times for the bound servicers to perform the jobs. In some example embodiments, the scheduled times may be same-day times in relation to performance of the jobs.

In example embodiments, during the matching of the servicer profile objects of the servicers to the service requests, the broker service may calculate a matching score, and may select servicers with matching scores above a threshold level as the matching servicers. In other example embodiments, the broker service may filter the matching servicers based upon quality metrics within each of the servicer profile objects for the servicers. In other example embodiments, the broker service may bind at least some of the matching servicers to the jobs by sending solicitation messages to the matching servicers to perform the jobs, identifying servicers that respond affirmatively to the solicitation messages, instructing a servicer management system to create servicer work objects derived from the servicer profile objects of the identified servicers, and linking the servicer work objects to the jobs.

In example embodiments, the home services platform may further include a prediction engine that predicts date ranges of failures of covered entities at the properties of the subscribers based upon data associated with the covered entities collected and stored by the platform for each of the properties. The prediction engine may send information including the predicted date ranges of failures of the covered entities at the properties in messages to a claim management system. The claim management system may be configured to create internal claim objects for internal claims in response to the messages received from the prediction engine. The broker service may match the servicers to the internal claims, and the broker service may bind at least some of the matching servicers to the internal claims. The scheduling system may schedule times for the bound servicers to perform the at least one repair service identified in the claim objects for the internal claims. In example embodiments, the data may be sensor data sent from one or more covered entities at the properties.

In example embodiments, the broker service may filter the matching servicers based upon a trust score including a level of trust metrics. In example embodiments, the level of trust metrics may include at least one of: job/dispatch acceptance rates, average time to appointment acceptance, average time to appointment date, average time to estimate submission, average time to job completion, rating based on customer feedback, average cost per dispatch, average cost per claim, recall percentage and cost, warranty paid replacement percentage, customer paid replacement percentage, first time fix percentage, average out of pocket (OOP) cost and percentage, platform usage, auto approval percentage, platform payment time, HVAC maintenance to repair ratio, transfer away percentage and cost, call for status, renewals, and/or emergency incidence and cost. In example embodiments, the broker service may be configured to optimize job distribution against the level of trust metrics automatically. In other example embodiments, the broker service may be configured to provide an interface for a user to set percentages or an absolute number of jobs based on an optimization against the level of trust metrics.

According to some example embodiments of the disclosure, a computer implemented method for providing home services is disclosed. The method may include creating service requests for repair services requested by subscribers of a platform. Each service request may relate to at least one repair service to be performed at a property of each subscriber and is possibly covered in a home protection plan for each subscriber. The method may create servicer profile objects for servicers registered with the platform. The servicer profile objects may include information identifying the servicers and may include the at least one repair service that the servicers provide. The method may designate servicers registered with the platform to perform jobs at the properties of the subscribers associated with the service requests by matching the servicer profile objects of the servicers to the service requests. The method may bind at least some of the matching servicers to the jobs.

In example embodiments, the method may further include scheduling times for the bound servicers to perform the jobs.

In example embodiments, during the matching of the servicer profile objects of the servicers to the service requests, the method may calculate a matching score and select servicers with matching scores above a threshold level as the matching servicers.

In example embodiments, the method may further include filtering the matching servicers based upon quality metrics within each of the servicer profile objects for the servicers.

In example embodiments, the method may further include binding at least some of the matching servicers to the jobs by: sending solicitation messages to the matching servicers to perform the jobs, identifying servicers that respond affirmatively to the solicitation messages, instructing a servicer management system to create servicer work objects derived from the servicer profile objects of the identified servicers, and linking the servicer work objects to the jobs.

In example embodiments, the method may further include predicting date ranges of failures of covered entities at the properties of the subscribers based upon data associated with the covered entities collected and stored by the platform for each of the properties, and sending information including the predicted date ranges of failures of the covered entities at the properties in messages. The method may create internal claim objects for internal claims in response to the messages, match the servicers to the internal claims, bind at least some of the matching servicers to the internal claims, and schedule times for the bound servicers to perform the at least one of repair service identified in the claim objects for the internal claims.

In example embodiments, the broker service may filter the matching servicers based upon a level of trust metrics. In example embodiments, the broker service may be configured to optimize job distribution against the level of trust metrics automatically.

According to some example embodiments of the disclosure, a same day service system in a home services platform is disclosed. The same day service system may include a service request system that creates service requests for repair services requested by subscribers of the platform. Each service request may relate to at least one repair service to be performed at a property of a subscriber and may be possibly covered in a home protection plan for the subscriber. The same day service system may include a broker service that may designate servicers to perform jobs at the properties of the subscribers associated with the service requests by matching servicer profile objects of servicers registered with the platform to the service requests. The servicer profile objects may include information identifying the servicers and include at least one repair service that the servicers provide, and binding at least some of the matching servicers to the jobs. The same day service system may include a scheduler service that may schedule same-day times for the bound servicers to perform the jobs.

In example embodiments, the scheduler service may schedule same-day times for the bound servicers to perform the jobs based upon availability of the bound servicers. In other example embodiments, the scheduler service may schedule same-day times for the bound servicers to perform the jobs based upon proximity of the bound servicers to the properties of the jobs at time of scheduling. In example embodiments, the scheduler service may schedule same-day times for the bound servicers to perform the jobs after receiving messages from the bound servicers confirming willingness of the bound servicers to perform the jobs. In example embodiments, the scheduler service may schedule same-day times for the bound servicers to perform the jobs based upon a trust score included within the servicer profile object for each of the bound servicers for each job. In example embodiments, the scheduler service may schedule same-day times for the bound servicers to perform the jobs based upon a job rate included within the servicer profile object for each of the bound servicers for each job. In other example embodiments, the scheduler service may schedule same-day times for the bound servicers to perform the jobs based upon a job type for each of the jobs. The scheduler service may schedule same-day times for the bound servicers to perform the jobs based upon performance history of the same job type by the bound servicers as the job type for each of the jobs. The scheduler service may schedule same-day times for the bound servicers to perform the jobs based upon whether preferred job types within the servicer profile objects for each of the servicers match the job type for each of the jobs. In example embodiments, the scheduler service may arrange for the purchase of at least some inventory for performing each job in advance of the scheduled same-day times for the bound servicers to perform the jobs. In example embodiments, the scheduler service may schedule a specific bound servicer for same-day perfor-
mance of the jobs based upon a trust score for the specific
bound servicer.

According to some example embodiments of the disclo-
sure, a computer-implemented method for providing same
day service is disclosed. The method may include creating
service requests for repair services requested by subscribers
of a platform. Each service request may relate to at least one
repair service to be performed at a property of a subscriber
and is possibly covered in a home protection plan for the
subscriber. The method may include creating servicer profile
objects for servicers registered with the platform. The ser-
vicer profile objects may include information identifying the
servicers and may include at least one repair service that the
servicers provide. The method may include designating
servicers to perform jobs at the properties of the subscribers
associated with the service requests by matching the servicer
profile objects of the servicers registered with the platform
to the service requests. The method may include binding at
least some of the matching servicers to the jobs. The method
may further include scheduling same-day times for the
bound servicers to perform the jobs.

In example embodiments, the scheduling same-day times
for the bound servicers to perform the jobs may be based
upon availability of the bound servicers. In example
embodiments, the scheduling same-day times for the bound
servicers to perform the jobs may be based upon proximity
of the bound servicers to the properties of the jobs at time of
scheduling. In example embodiments, the scheduling same-
day times for the bound servicers to perform the jobs after
receiving messages from the bound servicers may confirm a
willingness of the bound servicers to perform the jobs. In
example embodiments, the scheduling same-day times for
the bound servicers to perform the jobs may be based upon
a trust score included within the servicer profile object for
each of the bound servicers for each job. In example
embodiments, the scheduling same-day times for the bound
servicers to perform the jobs may be based upon a job rate
included within the servicer profile object for each of the
bound servicers for each job. In example embodiments, the
scheduling same-day times for the bound servicers to per-
form the jobs may be based upon a job type for each of the
jobs. In examples, the scheduling same-day times for the
bound servicers to perform the jobs may be based upon
performance history of the same job type by the bound
servicers as the job type for each of the jobs. In other
examples, the scheduling same-day times for the bound
servicers to perform the jobs may be based upon whether
preferred job types within the servicer profile objects for
each of the servicers match the job type for each of the jobs.

In example embodiments, the method may further include
arranging for the purchase of at least some inventory for
performing each job in advance of the scheduled same-day
times for the bound servicers to perform the jobs.

According to some example embodiments of the disclo-
sure, a predictive service apparatus is disclosed. The appa-
ratus may include a service request system that creates
service requests for repair services. Each service request
may relate to at least one repair service to be performed at
a property of a subscriber and is possibly covered in a home
protection plan for the subscriber. The apparatus may also
include a prediction engine that may predict failures of
entities at the properties of each subscriber based upon data
associated with the entities that the apparatus collects and
stores for each of the properties. The entities may be
possibly covered in the home protection plan of each sub-
scriber. The prediction engine may send information including the predicted failures of the entities at the properties in
messages to the service request system. The service request
system may create the service requests for repair services to
be performed at the properties of the subscribers based upon
the information in the messages sent from the prediction
engine.

In example embodiments, the data associated with the
entities at each property of each subscriber may be sensor
data sent from one or more entities at the properties. In
example embodiments, the prediction engine may analyze
the sensor data to determine whether the entities may be in
need of repair or servicing. The prediction engine may
include the determination of whether the entities may be in
need of repair or servicing in the information that the
prediction engine sends in the messages to the service
request system. In example embodiments, the prediction
engine may analyze the sensor data to predict when future
faults of the entities occur. The prediction engine may
include the prediction of whether future faults of the entities
may occur in the information that the prediction engine
sends in the messages to the service request system. In
example embodiments, the prediction engine may analyze
the sensor data to predict a type of repair needed for the
entities and to predict a cost of repair for the entities. The
prediction engine may include the predicted type of repair of
the entities and the predicted cost of repair of the entities in
the information that the prediction engine may send in the
messages to the service request system.

In example embodiments, the prediction engine may
execute a lookup of the data associated with the entities
against an action table. The action table may map the data
associated with the entities to a recommended time frame for
scheduling repair or replacement of the entities. The predic-
tion engine may include the data associated with the entities
and the recommended time frame for scheduling repair or
replacement of the entities in the information that the
prediction engine sends in the messages to the service
request system. In example embodiments, the service
request system may extract the recommended time frame for
scheduling repair or replacement of the entities from the
information in the messages, and may notify a scheduler
service to schedule the service requests using the extracted
recommended time frame for scheduling repair or replace-
ment of the entities.

In example embodiments, the prediction engine may
analyze the data associated with the entities at the properties.
Upon determining that one or more of the entities are
network-connected entities, the prediction engine may send
messages that include automatic actions for the network-
connected entities to execute in response to receiving
messages.

In example embodiments, the data associated with the
entities at the properties of the subscribers may be diagnos-
tics data sent from one or more entities at the properties. In
example embodiments, the data associated with the entities
at the properties of the subscribers may be collected by the
apparatus from an inspection report for the property of each
subscriber. In example embodiments, the data associated
with the entities at the properties of the subscribers may be
provided to the apparatus by servicers that have previously
performed repair services at the properties of the subscrib-
ers.

According to some example embodiments of the disclo-
sure, a computer-implemented method for providing predic-
tive service is disclosed. The method may include creating
service requests for repair services. Each service request
may relate to at least one repair service to be performed at a property of a subscriber and is possibly covered in a home protection plan for the subscriber. The method may include predicting failures of entities at the properties of each subscriber based upon data associated with the entities that may be collected and stored for each of the properties. The entities may be possibly covered in the home protection plan of each subscriber. The method may further include sending information including the predicted failures of the entities at the properties in messages to a service request system. The service request system may create the service requests for repair services to be performed at the properties of the subscribers based upon the information in the messages.

In example embodiments, the data associated with the entities at each property of each subscribers may be sensor data sent from one or more entities at the properties. In example embodiments, the method may further include at least one of: analyzing the sensor data to determine whether the entities are in need of repair or servicing; analyzing the sensor data to predict when future faults of the entities occur; and/or analyzing the sensor data to predict a type of repair needed for the entities and to predict a cost of repair for the entities.

In example embodiments, the method further comprising executing a lookup of the data associated with the entities against an action table. The action table may map the data associated with the entities to a recommended time frame for scheduling repair or replacement of the entities. The data may be associated with the entities and the recommended time frame for scheduling repair or replacement of the entities in the information. In example embodiments, the method may further include extracting the recommended time frame for scheduling repair or replacement of the entities from the information, and notifying a scheduling service to schedule the service requests using the extracted recommended time frame for scheduling repair or replacement of the entities.

In example embodiments, the method may further include analyzing the data associated with the entities at the properties. Upon determining that one or more of the entities are network-connected entities, sending messages that may include automatic actions for the network-connected entities to execute in response to receiving the messages.

In example embodiments, the data associated with the entities at the properties of the subscribers may be diagnostics data sent from one or more entities at the properties. In example embodiments, the data associated with the entities at the properties of the subscribers may be collected from an inspection report for the property of each subscriber. In example embodiments, the data associated with the entities at the properties of the subscribers may be provided by servicers that have previously performed repair services at the properties of the subscribers.

A more complete understanding of the disclosure will be appreciated from the description and accompanying drawings and the claims, which follow.

BRIEF DESCRIPTION OF THE FIGURES

The accompanying figures, wherein like reference numerals refer to identical or functionally similar elements throughout the separate views and which together with the detailed description below are incorporated in and form part of the specification, serve to further illustrate various embodiments and to explain various principles and advantages all in accordance with the systems and methods disclosed herein.

The accompanying drawings, which are included to provide a better understanding of the disclosure, illustrate embodiments of the disclosure and together with the description serve to explain the principle of the disclosure. In the drawings:

FIG. 5 illustrates an embodiment of a service provider portal, for a system for enabling a host to provide improved repair and maintenance services to a consumer homeowner;

FIG. 6 illustrates an embodiment of a service provider mobile app, for a system for enabling a host to provide improved repair and maintenance services to a consumer homeowner.

Figure 1A:
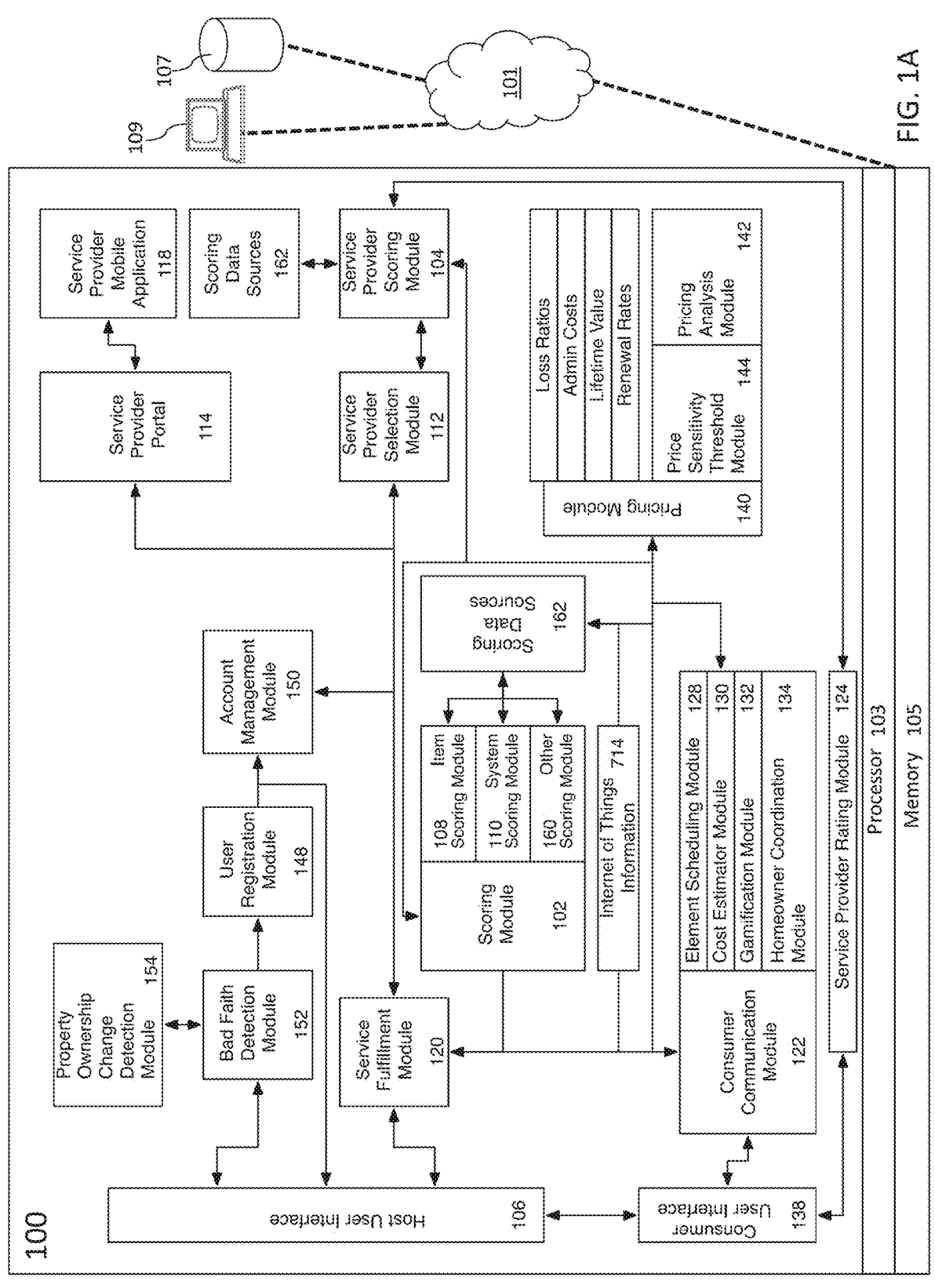
FIG. 1A illustrates an embodiment of an architecture, with various modules, for a system for enabling a host to provide improved repair and maintenance services to a consumer homeowner.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION

The disclosure will now be described in detail by describing various illustrative, non-limiting embodiments thereof with reference to the accompanying drawings and exhibits.

The disclosure may, however, be embodied in many different forms and should not be construed as being limited to the illustrative embodiments set forth herein. Rather, the embodiments are disclosed so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that embodiments include combinations of method steps and/or system components. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art having the benefit of the description herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The term "set" should be understood to include a set having a single member or having more than one member.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) disclosed herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

FIG. 1A illustrates a block diagram of major components of a system (referred to in some cases as the "host system" 100) for enabling a host to enable a consumer homeowner to obtain improved repair and maintenance services for various items in the home. In embodiments, consumers may pay a single price (monthly, annually, or the like) for a subscription that covers maintenance and repairs for a defined set of items and systems. As used herein, an "item," "system," "covered item," "covered entity," or "covered system" may be understood to include aspects of the property within which the home is located and various structures and systems of and around the home itself (e.g., roof, foundation, flooring, framing, windows, doors, walls, decks, patios, sidewalks, pools, spas, ceilings, plumbing, electrical systems, networks, etc.), furnishings (e.g., beds, couches, chairs, tables, lighting units, outdoor furniture, etc.), appliances/equipment (e.g., refrigerators, televisions, sound systems, home automation systems, stoves, dishwashers, washing machines, clothes dryers, ovens, vacuum cleaners, blenders, mixers, juicers, toasters, power tools, etc.), and other items that may need maintenance or repair over time. References and examples throughout this disclosure to particular items should be understood to encompass any other items or types of items, except where context indicates otherwise.

Referring to FIG. 1A, the functional modules of the host system 100 may employ various information technology elements, such as CPUs, memory, servers, networking and communications facilities, databases, and the like. The various modules may be deployed on the premises of the host or in the cloud, and may access local or distributed data sources, such as over one or more networks 101. The host system 100 may have a host user interface 106, which may be a single, integrated interface for multiple modules or may comprise various distinct interfaces for the various modules described herein. The various user interfaces described herein may be embodied on personal or laptop computers (including via web applications in a browser), notebooks, tablets, or smartphones (including via mobile applications downloaded on the user device 1116 or via a mobile browser). The host system 100 may include a wide range of modules that enable the host to facilitate provision of reliable home maintenance and repair services for a predetermined price, such as delivered according to a subscription. The modules may include a scoring module 102, which may involve a service provider scoring module 104, an item scoring module 108, and a system scoring module 110.

The modules may also include a service provider selection module 112, a service provider portal 114, a service provider mobile application 118, and a service fulfillment module 120. Service providers may rate the consumers to which they supply services via the service provider mobile application 118 and/or service provider portal 114. The modules may include a consumer communication module 122, which may include an element scheduling module 128, a cost estimator module 130, a gamification module 132 and a homeowner coordination module 134, one or more of which may populate information accessed by a consumer, such as through a consumer user interface 138.

The consumer user interface 138 may include a service provider rating module 124, which may facilitate taking input from consumers about particular service providers (such as on time arrival, quality of work, friendliness and the like), which may be used as input to the service provider scoring module 104. Service providers may include parties performing actual maintenance and repair services (either at the home or at remote repair locations), as well as parties that provide warranties, extended warranties, insurance, and other contracts and instruments, such as with respect to particular items.

The host system 100 may also include a pricing module 140, which may comprise a multi-vector pricing module, which may ingest, clean, normalize, process and analyze information about items, information about service providers, information about other factors (such as macroeconomic data) and the like and may include facilities for analyzing loss ratios, administrative costs, lifetime value of a consumer subscription, renewal rates and the like. The pricing module 140 may include a pricing analysis module 142, which may include or work in coordination with a price sensitivity threshold module 144.

The host system 100 may further include a user registration module 148 and an account management module 150. The host system 100 may also include a bad faith detection module 152, which may include or coordinate with a property ownership change detection module 154. The various modules may obtain data from a wide range of sources, such as the other modules and external data sources, such as sources relating to types of items, maintenance and repair history data sources, service provider listings and ratings, economic data (such as anticipated inflation rates and interest rates), warranty information (including extended warranty information) and the like. As more and more items become enabled with processors and communication facilities (such as in the Internet of Things (IoT)), information may be collected directly from the items or from databases that aggregate information published by or about such items.

While FIG. 1A shows the various modules on a single system, with a processor 103 and memory 105, optionally deployed in the cloud, such as via a server, and connected to remote databases 107 and computing systems 109, such as via internet/remote/networks 101, it should be understood that the modules and components could be arranged in a wide variety of configurations, distributed across different computing systems and the like, in accordance with various specific embodiments. The functional diagram of FIG. 1B should be understood to indicate connections and interfaces among the various modules, such as for the transmissions of outputs from a given module that serve as inputs to the other modules. These connections may be network connections or may be accomplished by other mechanisms, such as over an information bus of a dedicated system. The connections may be achieved by software or middleware interfaces, by the use of application programming interfaces (APIs), by data integration systems (such as for extraction, transformation, transport and loading of information between systems having distinct data types and using distinct protocols), and by the use of services, such as in services oriented architectures.

Each of these approaches may solve problems noted above, in particular the fact that data has historically been unavailable, or spread across so many distinct sources that it has been a practical impossibility for a single service provider to perform the kinds of analysis required to ensure effective matching of service providers to homeowners, to ensure consistent and efficient repairs and to perform accurate cost estimation and pricing analysis.

Figure 7:
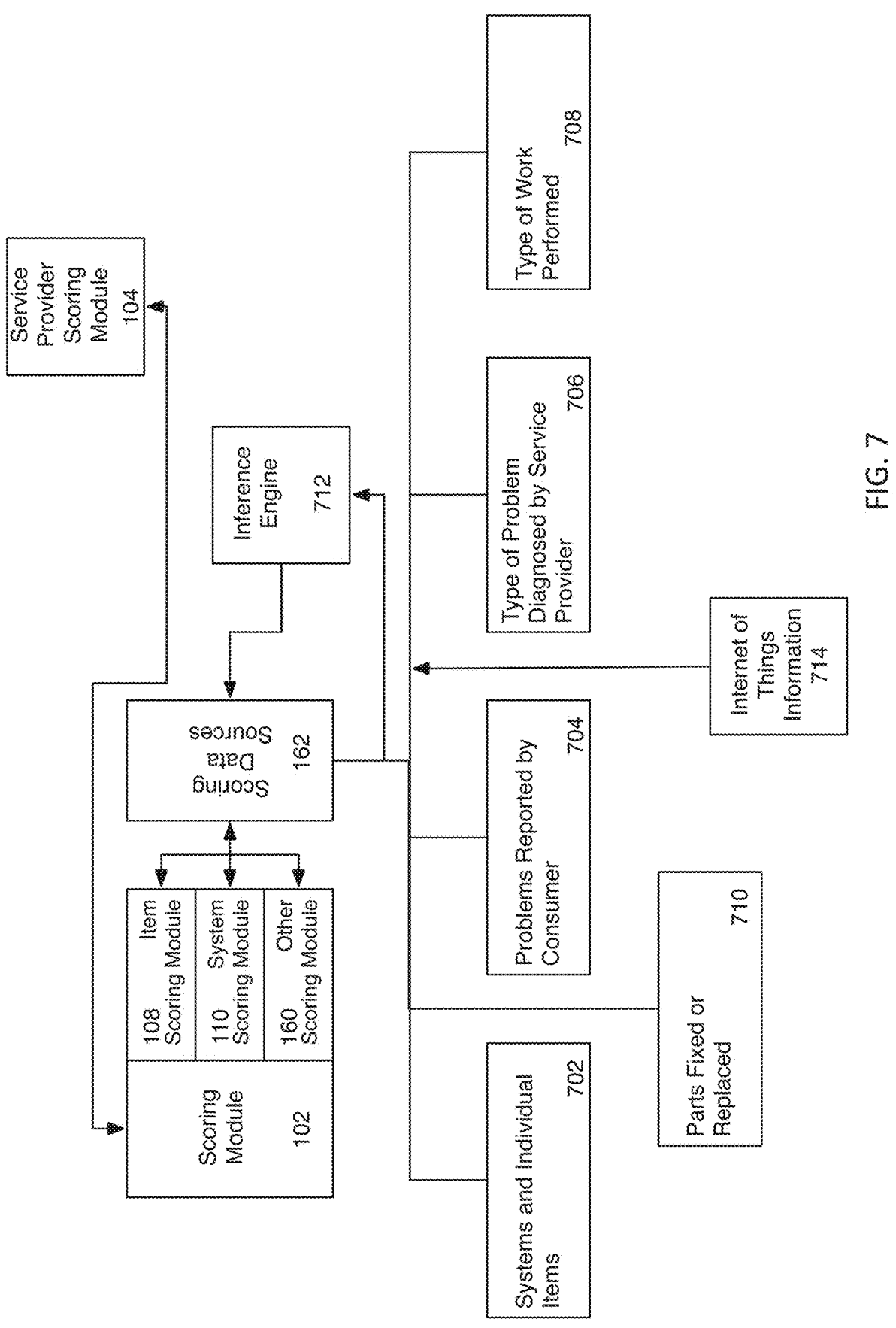
FIG. 7 illustrates an embodiment of a scoring module, with various scoring data sources, for a system for enabling a host to provide improved repair and maintenance services to a consumer homeowner.

The modules of the host system 100 may include the scoring module 102 for scoring various items based on various available data sources. Scoring may involve the service provider scoring module 104, the item scoring module 108, the system scoring module 110, other scoring module 160 and the like. Referring to FIG. 7, with respect to the item scoring module 108, system scoring module 110 and other scoring module 160, the host system 100 may collect information from scoring data sources 162 that indicates the systems (e.g., HVAC) and individual items 702 such as appliances in or around the home, such as the make, model, serial number, age and the like. In embodiments, this information may be collected directly from the items themselves, such as for IoT-enabled items that connect to the Internet and can indicate their presence, type, age, current condition and the like directly to the host system 100 or to any of the scoring data sources 162 that are used by the host system 100.

The host system 100 may also facilitate collection of information from scoring data sources 162 on the problems reported by the consumer 704, the type of problem diagnosed by the service provider 706, the type of work performed 708, and a listing of the different types of parts fixed or replaced 710 for each item or system. Once this information is collected, an overall quality score can be provided, or a sub-component score, using these various information sources, such as via the scoring module 102. With respect to the service provider scoring module 104, outcomes can be tracked to provide a service provider score that is based at least in part on the items and systems of a consumer's home. Commonly, quality scores in the industry have no segmentation. For example, ratings sites like Yelp or sites like Angie's List might give four stars to a service provider, but as a simple example, that service provider might be good at GE repair but bad at Viking repair. Tracking outcomes that relate to particular items and systems may facilitate more accurate scoring, including rating a service provider with respect to competencies that are specific to the items or systems of a particular consumer's home.

Where specific data about items in a home is absent, the host system 100 may also infer the presence, type, age and/or condition of certain items, such as using an inference engine 712, which may be a rules engine or the like that may take as inputs various data sources, such as the ones used as scoring data sources 162 and may also provide inferences that serve as scoring data sources 162. For example, an inference engine 712 may infer that a home is very likely to have certain kinds of items, such as a heating system, an oven, and a refrigerator, notwithstanding the absence of specific information. The inference engine 712 may infer the age of items, such as inferring that for a home that is less than ten years old, the heating system is likely to have the same age as the home itself.

The inference engine 712 may also infer the likely type of items, such as by using information from advertising data providers that indicate the most popular items in a particular region or information from other sources that indicate the favorite brands of a homeowner, such as based on the brands of other items owned by the homeowner (e.g., a BMW owner might be inferred to have a Viking™ stove in the absence of specific information, or the owner of an Amana™ stove might be assumed to own an Amana™ microwave oven). The inference engine 712 may be a simple rules engine, may apply various technologies for matching and correlation, including fuzzy matching, and may employ machine learning, such as to improve inferences based on outcomes of past situations. For example, inferences used to estimate the cost of a subscription to the host and to set the price in the pricing module 140 can be confirmed, or determined to be false, during the process of performing maintenance and repairs, such as by having a service provider or consumer log information about the actual items in the home, which can be compared to the inferences and, over time, used to improve the performance of the inference engine 712.

The modules of the host system 100 may also include a service provider selection module 112, a service provider portal 114, and a service provider mobile application 118. Selection of the service provider for a home maintenance or repair today is based primarily either on the cost or based on a pre-existing relationship (such as when the consumer turns to the same company that sold an appliance to provide a repair, even after a warranty period has expired). The problem is that these factors tend to drive down quality to a minimum standard (or perhaps below what should be the minimum standard). While some parties have started to look at quality as a selection criteria, the data collected by such parties is typically minimal. The host of the methods and systems disclosed herein can facilitate a very accurate quality score by requiring that a score or rating be captured by a consumer before the consumer can perform any other function, so that the host system 100 can have a very high percentage of quality scores.

Figure 4:
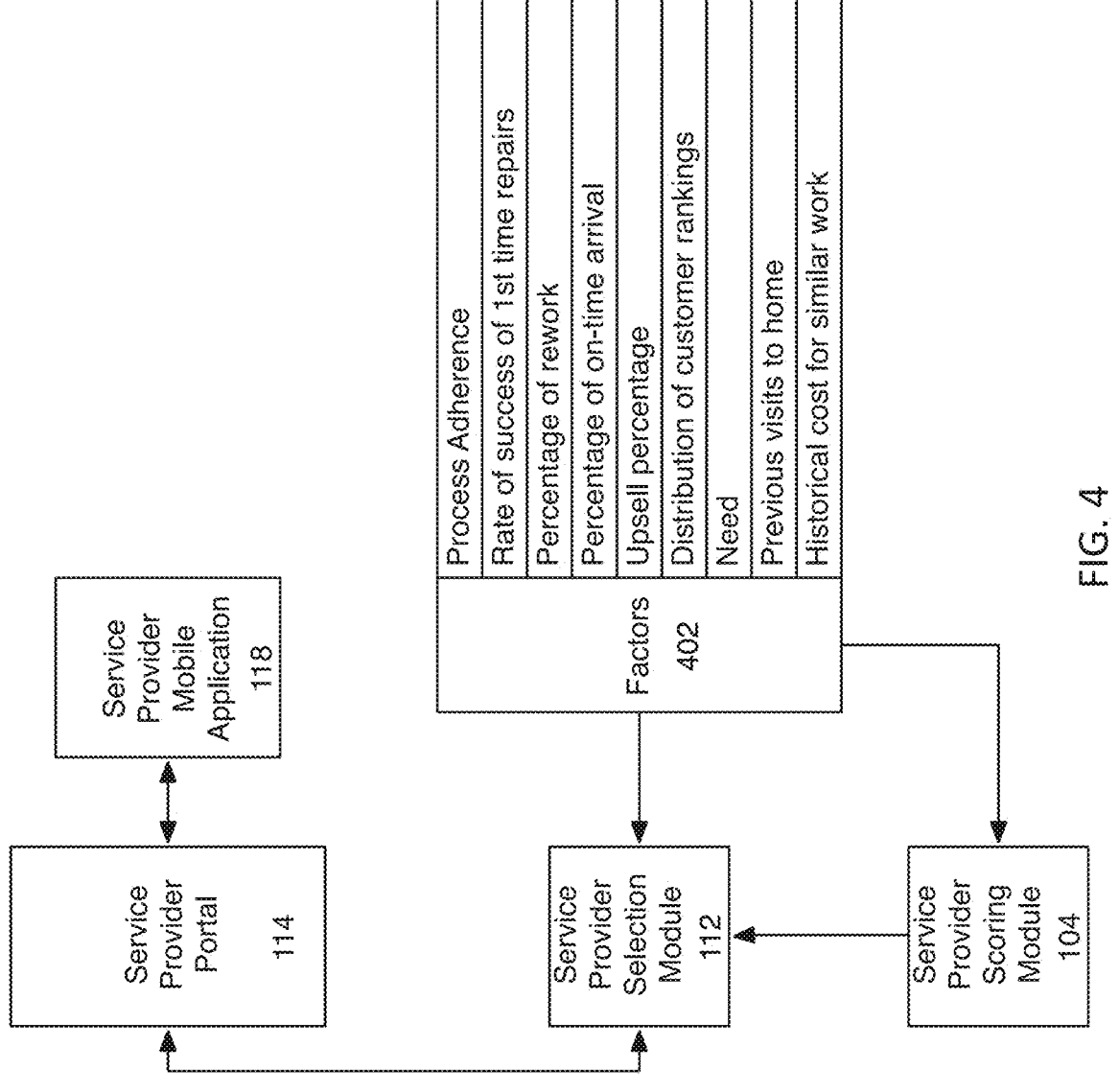
FIG. 4 illustrates an embodiment of a service provider selection module, with various factors, for a system for enabling a host to provide improved repair and maintenance services to a consumer homeowner.

Referring to FIG. 4, beyond cost and quality, much more sophisticated selection criteria may be used in the service provider selection module 112, including one or more factors 402 relating to process adherence 404, the rate of success of first time repairs 406, the percentage of rework 408, the percentage of on-time arrival 410, upsell percentage 412, the distribution of customer rankings 414, need 416, previous visits to the home 418, and historical cost for similar work 420. For example, with respect to process adherence, the system can consider whether the service provider has used the process that the host has requested. For example, for appliance repair, the host may request that the service provider do a triage call before going on-site. In the triage call, the service provider would determine what the problem was so that the service provider can collect a part from a parts distributor before going on-site. Such a process has a significant effect on first time fix rates (meaning the number of times a service provider can fix the problem on a first call without returning for a second call).

The host of the host system 100 can determine if a service provider was abiding by a defined process because the host system 100 may provide the service provider with a mobile website or service provider mobile application 118 where the service provider will report on the process steps in real-time. If the host observes unusual behaviors (e.g., the service provider clicks on all the steps completed all at once), then the host can know that the service provider is not properly reporting on the progress. In general, to obtain high quality ratings, a service provider would have a high first time fix rate and correspondingly low rework percentage. As to on-time arrival percentage, the host system 100 may solicit information about arrival from consumers and service providers and track the percentage of times the service provider arrived on-site at the appointment time or within the appointment window. A high quality rating would seek a high percentage of on time arrival. As to upsell percentage, the host may collect information and track whether the service provider was able to upsell additional products and services. As to distribution of customer rankings, the host may determine whether the service provider seems to have less patience for consumers based on the distribution of ratings of the consumer as compared to ratings of the same consumer by other service providers. As to need, the system may determine whether a particular customer that can tolerate a lower quality service providers or requires only those of the highest and/or may determine whether a particular customer is approaching a renewal date, where a higher quality service provider could increase the likelihood of renewal.

Similarly, the host system 100 may determine whether a particular consumer is a long-time customer that is unlikely to drop, or a customer that complains frequently and requires a higher quality service. As to previous on-site visits, the host system 100 may determine whether a particular service provider was previously on-site at a consumer's location, whether the consumer expressed a preference or need for the same service provider, and whether a customer is approaching their renewal date, where the same service provider would be appreciated and therefore increase likelihood of renewal. As to historical cost, data may be collected and analysis performed as to similar work done, such as with the same or similar makes and models, type of problems, types of repairs, age of products and the like. Service provider selection via the selection module 112 may account for these factors in various ways, such as by taking a simple score from the service provider scoring module 104 (which may account for various factors 402 relating to the service provider, as well as a wide range of other factors and vectors noted throughout this disclosure), using other scores from the service provider scoring module 104, applying one or more of the factors 402 directly to achieve selection (such as where a consumer has indicated a strong preference for a familiar provider, in which case weighting of a factor like previous visits to the home 418 may be increased, or made a determining factor), or applying a matching process, such as a fuzzy matching process or a matching process based on similarity (such as matching based on a metric of similarity, given a service provider's competencies with various items, such as particular brands of appliances, with the mix of items in a consumer's home, to find the service provider that, in the absence of a perfect fit, has the best match of competencies to the consumer's needs), and matching based on machine learning (such as by feeding the inputs of previous selections and the outcomes as rated by consumers, the host, or both into a neural network or other machine learning engine that, over time, refines a machine-based selection (or routing) of particular consumers to particular service providers based on a wide range of input factors of the type described throughout this disclosure).

In embodiments, the host system 100 may have visibility into a service provider's schedule and current location, allowing the host to do a real-time dispatch to a customer. Such real-time dispatching may use the schedule and location as other criteria for selection.

In embodiments, a service provider may access the service provider mobile application 118, which is a mobile application that may be accessed by a service provider owner, manager, or technician. Referring to FIG. 6, users can view scheduled appointments 602. Servicers may do a triage call before going on-site with a customer in order to increase likelihood of having the appropriate part on the truck or to estimate time required on-site. The mobile application may provide reminders 604 to the technician to do the call, initiate a call, allow the technician to collect information from the call, order a part required, or the like. As customers often like to be notified before the service provider comes on-site, the service provider mobile application 118 may be used by a technician to initiate notifications 606 such as a call to a consumer, for example thirty minutes before going on-site, may initiate a notification (e.g., mobile notification, text message, email) to the customer that the technician is thirty minutes before going on-site, or may provide GPS information to allow the consumer to see the technician on a map en-route, such as via a web application or mobile app that is distributed to the consumer.

The service provider mobile application 118 may be used by the technician or consumer to communicate photos or video of items, including ones relevant to problem through multimedia communication 608. For example, the service provider mobile application 118 may communicate information such as photos, recorded video, or real-time video, such as of an item, how it is working, what modes are failing, what defects are present, or the like, such as to help a technician determine in advance the likely time required for work to be done or the parts likely to be required. Such photo, video, or real-time video interaction could be used by the host, or by a warranty provider or subscription company, to determine if work would be covered by a warranty or subscription (e.g., for claims adjudication). In embodiments, the service provider mobile application 118 may be used by the technician, or by a consumer, to collect information about the systems and entities at the home through an information collection function 610. Such information could be text based or could comprise photos that are interpreted manually, through software (including OCR software) or through a service like Mechanical Turk™.

The service provider mobile application 118 may be used by the technician to generate work estimates 612 that estimate the work needed to be done after an on-site diagnosis. Such an estimate may be presented to the consumer on the technician's service provider mobile application 118 or via a separate consumer user interface, such as of a consumer mobile app, and then the consumer can accept or decline the work to be done via pushing a button or executing a signature on the mobile device. The service provider mobile application 118 may be used by the technician to indicate if the job is complete or if another visit is required through a job status function 614. The service provider mobile application 118 may be used by the technician to record if the technician has picked up or dropped off a part at a local parts distributor through a parts status function 616. The service provider mobile application 118 may be used by the technician to audio record a voice note 618 as to what work was done, rather than requiring the technician to type or write such information.

Referring to FIG. 5, the service provider portal 114 may be provided to a service provider, whereby the service provider may enter provider information 502. Provider information 502 may include contact information, calendar information (such as relating to availability), products serviced (brands and types of products) and zip codes serviced. The provider information may also include profile(s) for consumers to view (which may include information on one or more technicians, optionally including one or more photos of the technician, as well as information about which products and brands the technician services), agreements such as a click-wrap of the agreement between the service provider and the host, background check and/or drug check information, license information, insurance certificate/information (optionally via upload and including possible visual inspection by on-demand/subscription company or third party service, which may include something like Mechanical Turk™), and agreed upon contract rates and the like.

The service provider portal 114 may include reports 504 on accounts payable to the service provider. The portal 114 may solicit and collect technician ratings 506 to help a service provider understand the quality of its workers, which may be segmented by different types of work (e.g., a technician may be better at working on one brand of appliance versus another). Ratings for two technicians A and B are shown. The service provider portal 114 may include any other metrics 508 used by a company to determine which jobs get sent to that particular service provider or technician. Two metrics A and B for their respective technicians are shown.

In embodiments, the host system 100, including the portal 114 or the service provider mobile application 118, may support or facilitate permissions 510 such as user-level permissions. These permissions can provide different views on/access levels to the data by different service providers, owners, managers, and technicians/servicers, in examples. In embodiments the host system 100 may communicate, via the service provider portal 114 or service provider mobile application 118 how a service provider's metrics (including cost and quality) compare to other service providers. Three permission sets A, B and C are shown.

In some cases, homeowners are more likely to be interested in a subscription for home maintenance and repair services at particular times, such as when they buy the home, on or near anniversaries purchase of particular items (such as when warranties tend to expire), or when they have problems with the home. The host may solicit information from service providers, such as obtaining information on homeowners that have recently gone through a repair, even if the host system 100 is not involved, in order to market to such consumers. The service providers may be paid for such information, which may include a flat fee or on a contingent basis (e.g., not paid unless a homeowner purchases a product). The host system 100 may track when such information was submitted and by whom, so that contingency-based payments could be made appropriately.

Knowing when a technician will be on-site at a customer will allow the host to dedicate service staff at those times, such as to ensure that the technician can get questions answered immediately (e.g., whether a claim is covered by a warranty or subscription) while on-site to reduce costs to the host and the technician by avoiding call hold times or repeat visits to the customer. In embodiments, the host system 100 may compare the claims associated with one service provider versus others performing similar work, based on similar vectors (e.g., geography, systems and appliances, type of fix) to identify fraudulent claims or groups of claims.

Figure 3:
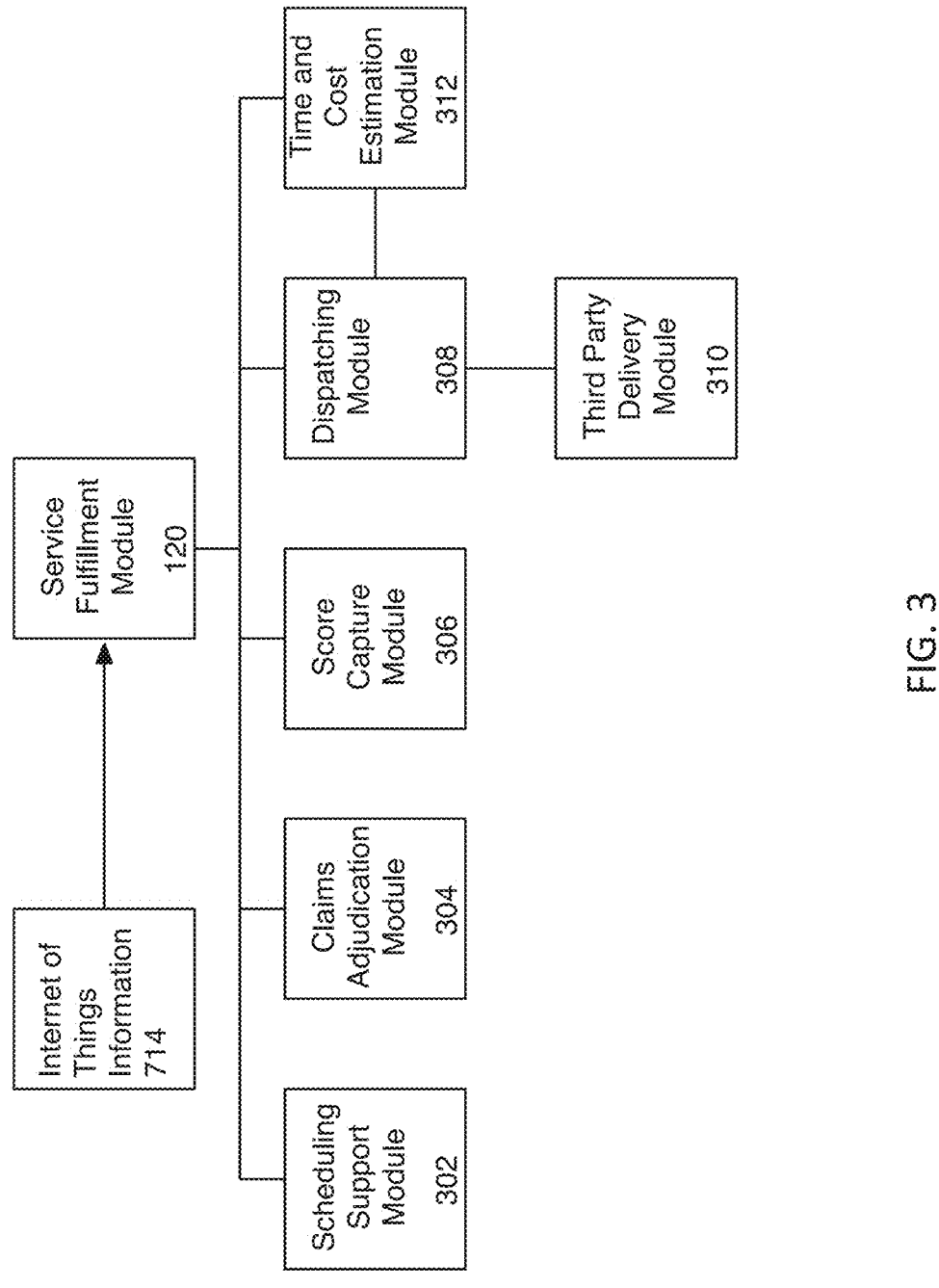
FIG. 3 illustrates an embodiment of a service fulfillment module, with various modules and sources, for a system for enabling a host to provide improved repair and maintenance services to a consumer homeowner.

The modules of the host system 100 may include the service fulfillment module 120, which may have various sub-modules, components, features and functions. Referring to FIG. 3, the service fulfillment module 120 may provide real-time scheduling support through a scheduling support module 302. Integration with service provider scheduling systems is challenging, because there are not standard systems in the industry for service providers to manage their schedules. Therefore, the host system 100 may have the service provider enter availability into an online system. Alternatively, the host wishing to schedule the service provider may manage inventory of available spots based on information provided by the service provider. Inventory of availability may be specific to the geography, because a service provider may have different technicians that may cover different geographic regions at different times of day or different days of the week. Inventory of availability may be configured to expire, such as by a certain duration before the appointment window (e.g., before a 2:00 pm deadline in order to schedule an appointment for the following day).

The service fulfillment module 120 may facilitate claims adjudication through a claims adjudication module 304, such by soliciting information, such as through a series of questions, to help determine if a claim is covered or not. The service fulfillment module 120 may capture a score through a score capture module 306, such as a net promoter score (NPS), which may be either an overall score or a score for a particular component of the service provider's services. For example, a consumer may enter a ranking for the service experience, indicating their level of satisfaction. This may be captured, for example, via email, text message, mobile application, or website (PC/mobile).

The service fulfillment module 120 may also include facilities for dispatching through a dispatching module 308, such as dispatching a parts distributor. For example, the host system 100 may allow for tracking what parts are needed by technicians in what locations, for tracking which parts have been ordered, picked up, dropped off, returned, or the like, and for tracking what payments are required and have been made. In embodiments, the service fulfillment module 120 or the host system 100 more generally may integrate with a third party delivery service through a third party delivery module 310, such as for parts delivery. A mobile application, such as the service provider mobile application 118 may be used to coordinate drivers who deliver parts.

The service fulfillment module 120 may facilitate time and cost estimation through a time and cost estimation module 312, such as by soliciting estimated times and prices from service providers. Over time, with more dispatch data, the host system 100 may estimate the time and cost of work based on analysis of historical transactions and other data. This estimation may be based on the information provided by the consumer (e.g., make, model, problem, geography). This estimation may be based on the information provided by the technician after a triage call in advance of an on-site visit. This estimation may be based on information entered by the technician after the on-site diagnosis.

The service fulfillment module 120 may also facilitate improved scheduling. Even if the host system 100 does not control the scheduling system of the service provider, the greater share of the schedule the host system 100 handles (by virtue of handling large number of service requests), the more control the host system 100 obtains over scheduling with respect to a given service provider. Normally, a servicer might schedule, for example, four appointments in each of two (or possibly three) windows per day. Where the host system 100 is permitted to schedule the first appointment of the window, it can determine if an actual appointment time has an effect on customer satisfaction. If the host system 100 schedules most or all of the appointments within a window, it can determine the most efficient routing, and it can use time estimation to reduce the appointment window (or provide an actual appointment time) for a consumer.

In embodiments, the host of the host system 100 may encourage others to help recruit consumers to use the system; for example, the host may pay commissions to those who sell subscriptions to others. People receiving commissions may include real estate agents (standard in industry today in 49 states), indirect distribution partners (e.g., real estate, insurance, title, mortgage companies), service providers (uncommon, but done by companies that directly employ their workers), or homeowners. For example, such homeowners could recruit other homeowners to sell and get further commissioned on the sales of those other homeowners they recruit. Commissions may be linked to premium levels or profitability to encourage selling to better consumers and avoiding bad risk. Commission programs could be reduced or eliminated in cases that turn out to involve selling too much bad risk.

In embodiments, the host may perform a lightweight or heavyweight inspection, done by an employee, third party, or by the consumer, and the host may collect a list of maintenance and/or repair work required to be done. The task list of things to be done may be available online to the consumer. The host may use such inspection data for the purposes of pricing a subscription product or recommending pricing, and/or implementing a maintenance program.

In embodiments, the host system 100 may involve integration with the Internet of Things (IoT), such as with various Internet of Things devices in the home, including thermostats, lightbulbs, or internet-enabled HVAC systems. Referring to FIG. 7, IoT information 714 may be used as a source of information for the host system 100, including the scoring module 102. Referring to FIG. 3, such IoT information 714 may also alert the host to a required maintenance or repair. Such IoT integrations may indicate a service record used for pricing product, predicting costs, or recommending a maintenance program. Such IoT integrations may be indicative of maintenance behaviors (e.g., if the efficiency indicated by a smart thermostat by the time required to heat/cool a space comparable to other homes may indicate lack of filter replacement).

The modules of the host system 100 may further include a consumer communication module 122, which may include an element scheduling module 128, a cost estimator module 130, a gamification module 132 and/or a homeowner coordination module 134, one or more of which may populate information accessed by a consumer, such as through a consumer user interface 138, which might be embodied in a web page for access by a browser, or provided via a mobile application, which might be the same as the service provider mobile application 118, or a distinct application directed just to consumers, such as homeowners.

Regular emails with consumers have been shown to increase renewals significantly for those who do not have a breakdown or similar problem that requires repairs (and therefore do not have a service experience). Additional engagement beyond email can increase renewals further. The host of the system 100 may have an inspection/maintenance schedule for a home, similar to a maintenance schedule a mechanic recommends for a car. The host may communicate maintenance or inspection elements on a regular basis to consumers, such as using the element scheduling module 128. Consumers would have a choice to perform maintenance themselves, not do it, or have a professional, such as service provider through the host system 100, do the work for them. A challenge is that many of these maintenance and inspection elements do not require much time, and it can be expensive to have a service provider go on-site. For example, service providers may commonly charge $150 per visit for a minimum of one hour's time. Approximately $85 of that $150 may comprise the cost of sending the technician from the previous location to the next location. In embodiments, the host of the host system 100 could offer a homeowner brief maintenance work (such as inspection of a clothes dryer's air flow) to be done for $150, or only $75 each if they get a neighbor to join for the same time, $50 for 2 other neighbors, etc. Thus, a homeowner coordination module 134 may increase frequency of engagement, lower customer acquisition costs, lower cost of maintenance, and lower loss ratios on claims.

In embodiments, consumers can send an email (if they have one) for a neighbor, select neighbors on a map (who may be subscribers, may not be subscribers, or have not already done such maintenance) to have a personalized postcard sent, or print a flyer/door-hanger to deliver directly. Such regular maintenance reminders may include estimated future cost of maintenance and/or repair for not doing such maintenance work. A cost estimator module 130 may be specific to the homeowner, such as based on the systems and appliances in the home. The host may create a point system and rankings to "gamify" such maintenance behaviors, such as using a gamification module 132. The host may show homeowners their performance compared to their neighbors, friends, or generally other similar homeowners. The gamification module 132 may provide increasingly difficult challenges before a consumer achieves major milestones, such as to encourage usage by homeowners to reach the next milestone. The gamification module 132 may include or interact with a loyalty or points system, such as one in which increased usage results in discounts, free services, improved commissions, or achievement of special levels of service.

The consumer user interface may include a service provider rating module 124, which may facilitate taking input from consumers about particular service providers (such as on time arrival, quality of work, friendliness and the like), which may be used as input to the service provider scoring module 104.

The host system 100 may also include a pricing module 140, which may comprise a multi-vector pricing module, which may ingest, clean, normalize, process and analyze information about items, information about service providers, information about other factors (such as macroeconomic data) and the like and may include facilities for analyzing various factors that affect the ability to estimate costs and set prices for subscriptions, such as loss ratios, administrative costs, the lifetime value of a consumer subscription of a given type, renewal rates and the like. The pricing module 140 may include a pricing analysis module 142, which may include or work in coordination with a price sensitivity threshold module 144.

Today, providers of home maintenance and repair contracts typically offer products with prices based on three vectors only: zip code, age of home, and a binary size metric as to whether the covered home is above or below a size threshold, such as 5000 square feet. Commonly, those vectors are used for pricing offerings that are pre-configured (e.g., the consumer is offered no choice in per-incident deductible (or "Service Fee"), category limit (e.g., no more than $1500 of claims would be allowed for the refrigerator), and offering type (e.g., appliance only, appliances and systems, or a premium offering that removes exclusions in less expensive offering levels). This is due in part to historical limits on available information, which is spread across many different data sources, difficulty integrating the available data sources, challenges in understanding the relevance of particular data and the like.

The present host system 100 solves a number of those challenges and enables use of many more vectors to determine costs, and in turn many more vectors to set pricing. In addition, this enables a much wider, and more customized, set of offerings for consumers. Vectors that impact how a host prices offerings, such as based on expected loss ratios, administrative costs, lifetime value ("LTV"), and renewal rates, may include payment timing (e.g., monthly versus annual payment selection); the service provider ranking of the consumer by a service provider; various real estate data elements (including without limitation any real estate data element one may extract from real estate sites such as Trulia™, Zillow™, Redfin™ and the like, or from sites of commercial real estate operations, such as property size, estimated property value, number and types of rooms, types of utilities, precise map location, and images of the exterior or interior of a property, including images that may show items that would be covered by a policy).

Additional vectors that impact how a host prices offerings may include any of various digital advertising targeting data elements (including, without limitation, any of the data elements tracked and/or supplied by advertising data providers such as Datalogix™ or Neustar™, such as data, e.g., transaction data, purchase data, survey response data, online behavior data, viewing data, demographic data, location data and the like, that is used by such providers to determine whether a particular household or individual is likely to exhibit a particular characteristic or belong in a particular demographic, psychographic, or similar segment). For example, customers identified by advertising providers as customers of Mercedes®, BMW® or other high end automotive brands that typically have comprehensive, long term service plans, may be attracted to more comprehensive versions of maintenance and repair offerings, may have higher end appliances and the like, which information may be used to customize offers, set prices and the like.

Other vectors that may be used include information about the systems and appliances inside the home (e.g., the make, model, age, manufacture date, installation date, service date and the like, as well as ratings from third party sources about those items, such as data from Consumer Reports® or similar sources about repair history); information about maintenance behaviors, including as indicated by the advertising segmentation data noted above; information about usage behaviors, including as indicated by the advertising data noted above; information about the type of utilities and systems in the home (e.g., type of heating, type of plumbing in the home (e.g., homes before mid-1970s are more likely to have copper plumbing versus PVC pipes), type of air conditioning system, sources of fuel (e.g. gas versus electric), and the like); location (which may be state, county, city, zip, neighborhood or more granular location; and water provider or type (e.g., some water districts have different water profiles (e.g., hard versus soft, basic versus acidic and the like). For example, different water profiles can have different effects on plumbing/water systems in the home. This feature would use a listing of homes, their water provider, and understanding of the water profile.

Other vectors may include the presence of a pre-existing condition. Pre-existing condition information may not be generally available, but the host may perform spot checks and correlate to various data signals, such as to seek indicators of the likelihood of preexisting conditions. For example, the age of items, the consumer's income or network may be indicative of the likelihood of a preexisting condition, as may other information, such as information indicating that the consumer has recently shopped for, but not purchased, an item for which the consumer is seeking coverage, which may indicate a defect or poor quality in the covered item. In embodiments the host may mandate a lightweight or heavyweight inspection for the home and aggregate such inspection data in a database to provide insight as to how certain inspection data leads to claims or conditions that drive costs. The host may also collect photos from consumers that may be indicative of preexisting conditions.

Other factors that may be considered may include the size of the home, such as on a sliding scale, as well as public data related to renovations done on the home (e.g., a 1920s home could have had plumbing redone very recently whereby the plumbing risk is much lower; such work may be detailed in public records on file when permits were requested).

In embodiments, the host system 100 may integrate with the systems of home inspectors to collect pre-existing conditions, required repairs/maintenance recommendations and the like, which may be used as factors in pricing and cost estimation, among other things.

In embodiments, the host system 100 may determine price sensitivity thresholds, such as using a price sensitivity threshold module 144, such as to determine the optimal price based on some or all of the factors/vectors noted above and elsewhere throughout this disclosure. Such price sensitivity thresholds may vary prices presented to different consumers along different vectors to maximize revenue (and thereby revenue growth), gross margin, EBITDA, or the like.

Using a pricing module 140, the host may analyze the effects that various factors/vectors noted above and throughout this disclosure are likely to have on various outcome vectors (e.g., expected loss ratios, administrative costs, long term value (LTV) of a consumer subscription, renewal rates, service provider ranking of consumers, and the like). The host may invest more in acquiring customers with positive input vectors, which may mean providing price discounts or incentives to acquire better customers.

In embodiments, the host system 100 may support coupon usage. A coupon code may be used by a homeowner to get a discount on an on-demand or subscription product. Such a coupon code may be a flat amount, percentage, or offer for a free gift (e.g., HVAC filter, home service). The presence of coupons may be considered in the pricing module 140 in determining its impact on the various outcome vectors noted above.

Figure 2:
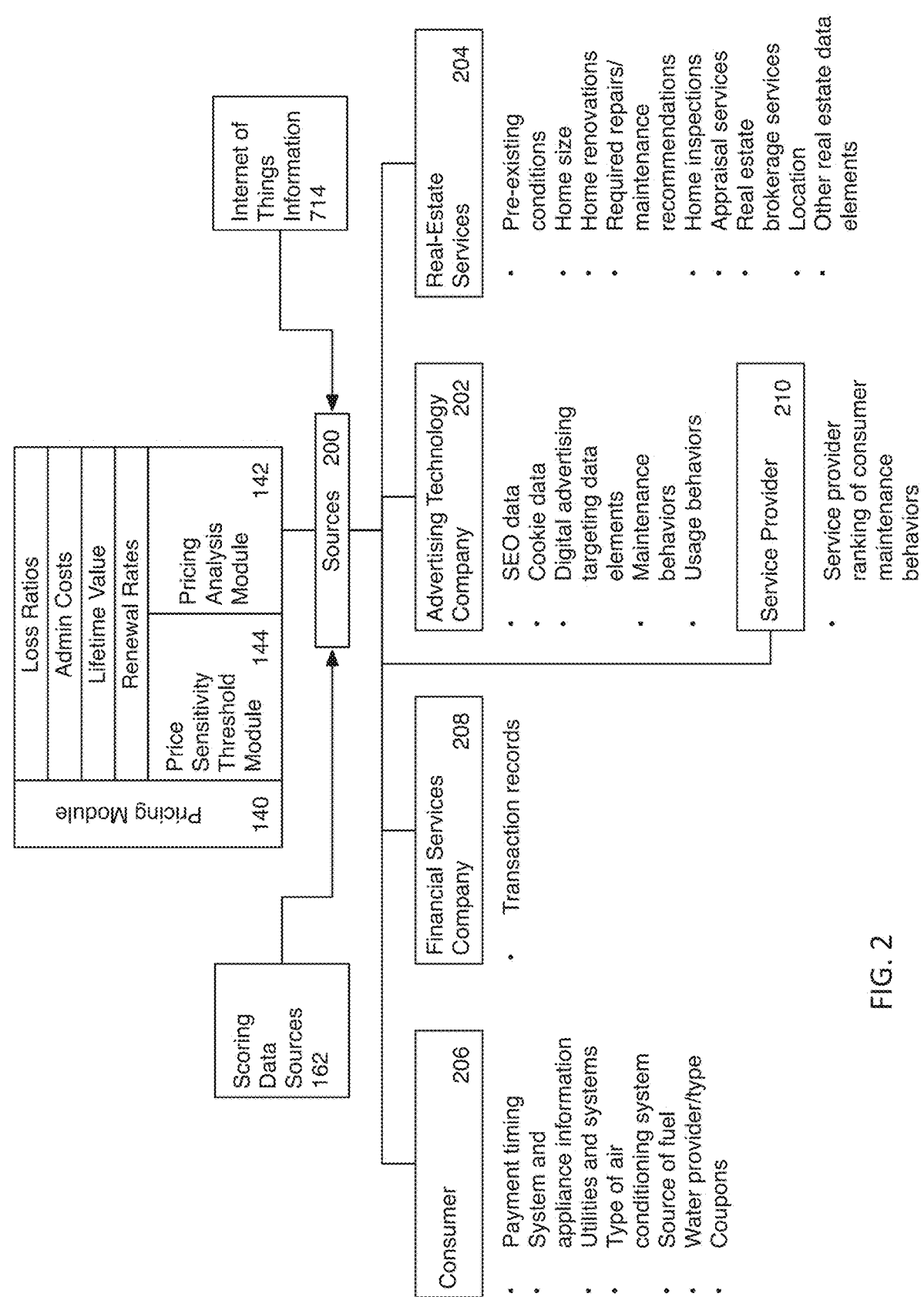
FIG. 2 illustrates an embodiment of a pricing module, with various modules and sources, for a system for enabling a host to provide improved repair and maintenance services to a consumer homeowner.

FIG. 2 shows additional detail for the pricing module 140. To obtain data about items, such as systems, appliances and the like, for use by various modules noted herein, including the pricing module 140, various sources 200 can be used. This may include information from an advertising technology company 202 that has placed cookies on one or more devices of the user when the user has visited a page (such as an owner's manual for an appliance) relating to the product. Also, item data may come from third parties who collect the data as a part of other services, such as real estate services 204, such as home inspections, appraisal services, real estate brokerage services, and the like.

Item data may also come from search engine optimization (SEO) and cookie data, such as from having observed users visiting a webpage containing content on such a system or appliance (e.g., owner manual). The data may also come from transaction data of a supplier of one or more items, or a financial services company 208 or similar provider that has transaction records for use of credit cards, debit cards and the like. Item data about systems, appliances and the like may also come from a consumer 206, who could be provided a discount or other incentive for providing such information. The data could be extracted from photographs or videos of a consumer's home, such as taken to document the items that will be covered. Such extraction may be accomplished in embodiments by automated extraction of relevant data, such as logos, model numbers, and the like that help identify a make, model and type of item.

Item data may also be sent from a service provider 210. In one example, the item data includes a ranking of consumer maintenance behaviors.

The pricing module 140 may also take IoT information 714 from the Internet of Things, such as information indicating the type and operating condition of a particular item, such as published by the item itself, either directly to the host system 100 or to one of the other data sources used as scoring data sources 162 or pricing data sources 200. The pricing module 140 may also take information from the various scoring data sources 162, including inferences generated by the inference engine 712 described elsewhere herein.

The pricing module 140 may have facilities for building new subscription services. For example, the host system 100, such as in cooperation with the pricing module 140, may calculate the cost and price of new subscription services based on frequency and cost of services provided to consumers outside of existing subscription services. The elements of a price/cost calculation may be segmented and calculated for any of the input vectors above.

Figure 1B:
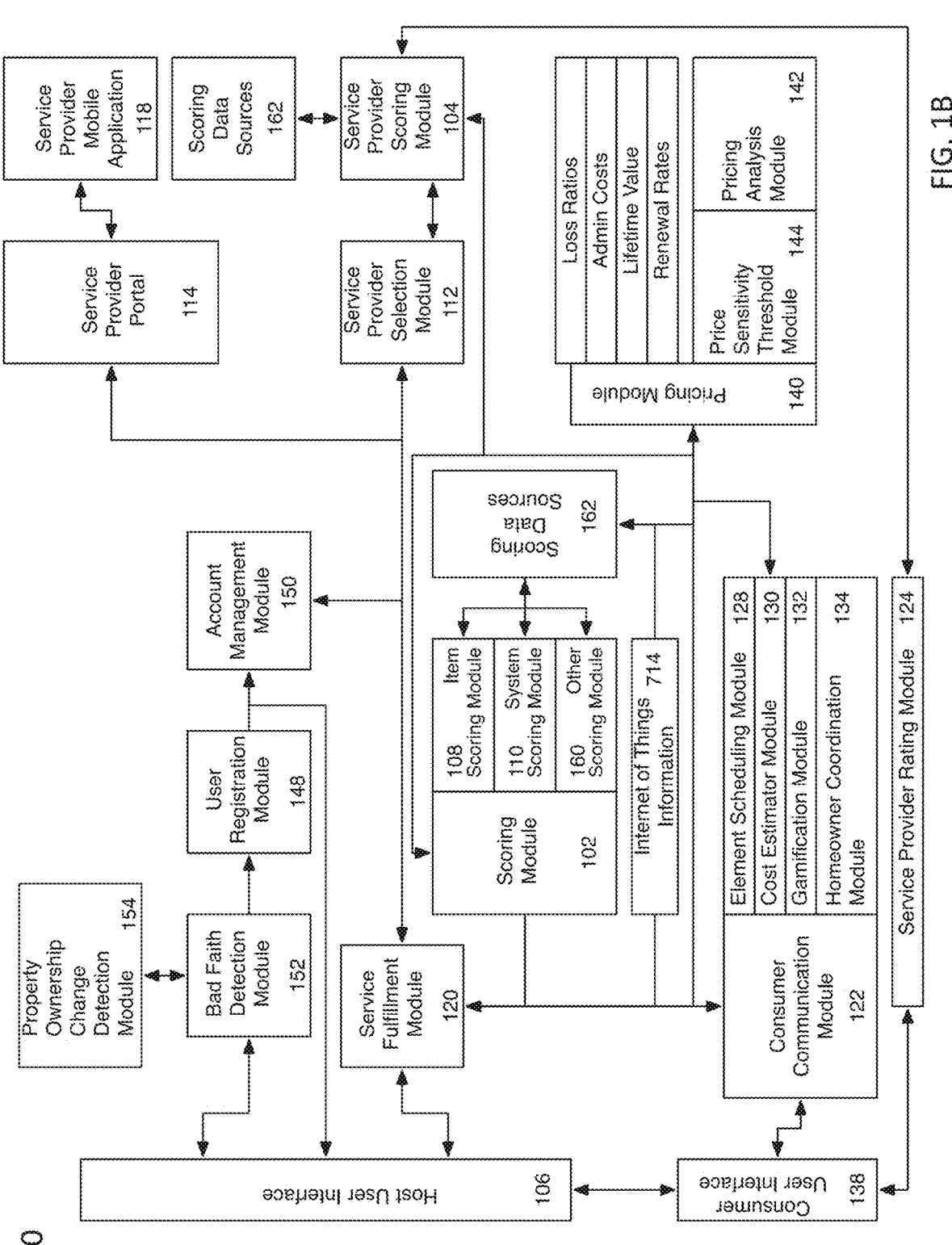
FIG. 1B illustrates a functional block diagram of various functions that are performed in the systems and methods described herein, including indications of information flows and interfaces among various functions.

Referring to FIG. 1B, the host system 100 may further include a user registration module 148 and an account management module 150. The user registration module 148 may solicit basic user information, as well as information relating to one or more of the many vectors/factors noted above and throughout this disclosure. For example, a homeowner may be asked to enter information about location, home size, number and type of appliances and the like. The user registration module 148 may facilitate selection of an offering (such as what type of coverage is desired and the desired payment structure) as well as entry of home address and billing address information, as well as payment information. The account management module may facilitate setting up billing, such as monthly or annual billing. The account management module may notify a consumer about upcoming renewals and allow changes to levels of offering. The account management module may also facilitate making payments to service providers for completed work.

Enabled by the account management module 150, a user of the module 150 may view/edit various information, such as profile information, payment information, subscription information, upcoming dispatches, historical dispatches, payments made (including parts, labor (optionally including either retail or wholesale labor rates)), and what portion of the payment (if any) was covered by the subscription. The account management module 150 may be used to schedule, cancel, reschedule jobs and to track the nature of the items in the home. In embodiments, the host system 100 may facilitate provision of various "concierge services," such as coordination of services for a consumer with service providers. An online interface may allow a consumer to add, edit, view, or cancel such concierge services.

In embodiments, the host system 100 may facilitate collections, such as collecting payments that may have been made to servicers, retrieving funds from third party insurers covering risk and collecting funds from consumers for services not covered by the subscription but provided to the consumers.

The host system 100 may maintain maintenance records. A maintenance record held by the host may be made available to the next owner of a home, so that the next homeowner knows when the next servicing is required. Such information is commonly lost in such transactions. A maintenance record held by the host may be made available to a prospective buyer of a home to help the seller facilitate a transaction with a buyer.

The account management module 150 may support credits for good behavior. Benefits may be offered for consumers with excellent maintenance records or little or no claims. Benefits may include increased caps, reduced copays, or free services.

In embodiments, the account management module 150 may support offerings for multiple properties. Consumers with rental properties or other secondary homes are highly likely to appreciate the services provided by the host. People who rent properties have predictable income and mortgage, but unpredictable maintenance and repair costs. The host may include features specifically for such homeowners, including keeping record of multiple properties, providing discounts for multiple properties, or providing interfaces to access information for different roles (e.g., renter, owner). Similarly, those caring for a senior citizen may require similar capabilities (e.g., allowing different roles for a financial caretaker versus a resident owner in the home).

In embodiments, the host system 100 may integrate with systems of insurers to provide information to help consumers qualify for discounts. For example, the host may check/adjust the water PSI going into the home and communicate such PSI to the insurer so that the insurer can determine the risk of pipes bursting.

The host system 100 may also include a bad faith detection module 152, which may include or coordinate with a property ownership change detection module 154. There are some customers that may seek to subscribe and then drop coverage after things get fixed. A waiting period, such as for thirty days (meaning no claims are covered within the first thirty days of acquiring coverage) may avoid some of this behavior, but is not likely to eliminate it completely. Companies today do not filter out customers that have previously acquired coverage and have immediately dropped coverage after getting something fixed. Some of these customers may even go so far as to change their name on a policy with the same address, or naming another person in the same household, to avoid detection. The host system 100 may, via the bad faith detection module 152 and process, check to see if the ownership of the property has changed hands, such as using the property ownership change detection module 154 to inspects relevant real estate records in public databases. If not, the host can raise the rates significantly or refuse to cover the customer to make sure the host is not offering subscriptions at a loss.

For those areas where the host does not charge for services on a subscription basis, the host system 100, such as using the pricing module 140, can provide services on an on-demand basis to begin to understand the risk associated with such costs. The host can then create subscription packages to cover such costs. Similarly, based on claims history, the host system 100 can help homeowners understand the failure likelihood and estimated costs associated with their homes. These estimates become more accurate the more data the host system can access about the home.

Embodiments may also facilitate on demand provision of maintenance or repair services. In such cases the host system 100 may collect the make and model of a system, appliance, or other item, such as by having the consumer enter the information, along with a zip code and problem description to initiate a flow. The host system 100 may provide for real-time scheduling of a service provider, collect address of the customer, collect payment information of the customer and/or confirm appointment time.

Figure 8:
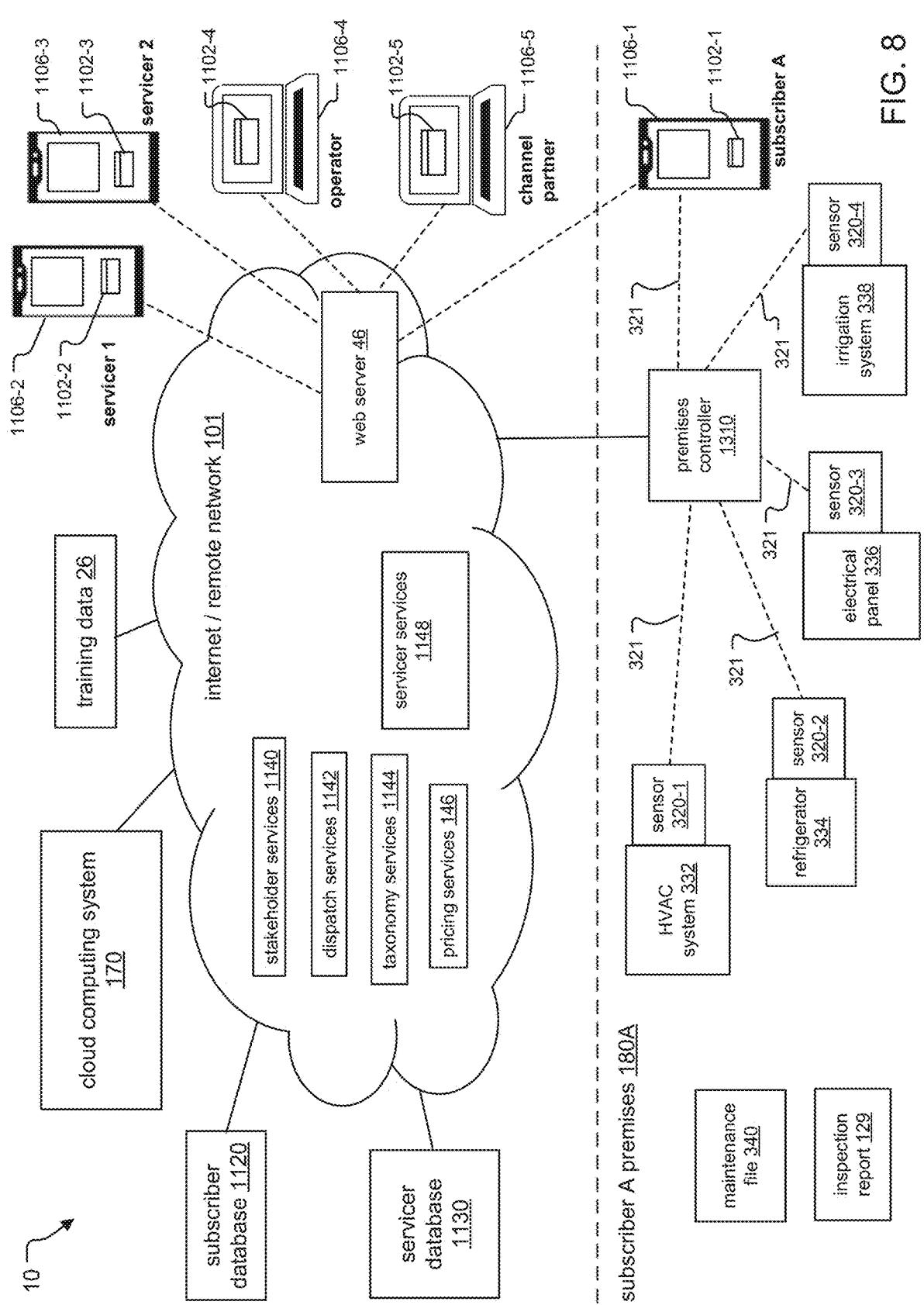
FIG. 8 is a schematic diagram of an example home services platform constructed in accordance with example embodiments of the disclosure.

In example embodiments, a home services system is disclosed herein. The home services system may be referred to as a home services platform in some example embodiments. FIG. 8 shows an example home services system (e.g., home services platform 10) according to example embodiments.

The home services platform 10 has various components. These components may include a cloud computing system 170, a subscriber database 1120, a servicer database 1130, and user devices 1106. Additional components may include training data 26 and at least one premises controller 1310 installed at each customer/subscriber premises. One exemplary subscriber premises "subscriber A premises" 180A is shown according to example embodiments. The components communicate with one another over a remote network 101 such as the Internet.

The home services platform 10 may also include various services and a web server 46, both of which are shown within the remote network 101 according to example embodiments. The services may augment the capabilities of the cloud computing system 170. These services may include stakeholder services 1140, dispatch services 1142, taxonomy services 1144, pricing services 146, and servicer services 1148.

Multiple user devices 1106 are also shown according to example embodiments. The user devices 1106 may be carried by or otherwise used by various stakeholders to access and/or configure various components of the platform 10. The stakeholders may include subscribers (such as homeowners), servicers, warranty providers, operators and channel partners, and the like among other examples.

Subscribers, as the name suggests, may be customers/clients of the home services platform 10. In embodiments, subscribers may use the platform 10 to obtain services to be provided in connection with their premises, such as relating to warranty coverage with respect to necessary repairs, and the like. These services may include diagnostic, warranty, repair and maintenance services, in examples. Premises refers to one or more properties owned or leased by the subscribers that may be included in a home services contract/home services policy that the subscribers may establish with owners/operators of the platform 10. These properties may include individual homes, multiple unit homes, apartments or condominiums ("condos") within an apartment building or condo complex, mixed use residential properties, commercial properties, and the like in examples.

In embodiments, a set of servicers may register with the platform 10 and carry out services requested by the subscribers or otherwise directed, such as by the platform and/or by an owner/operator of the platform. Servicers may include business entities with one or more individuals that are employed by the business entities (e.g., technicians, plumbers, electricians, carpenters, painters, insulators, cleaners, HVAC workers, roofers, movers, drivers, other business entities, and the like), individual technicians/laborers that operate as sole proprietors or contractors, and the like in examples.

An important feature of the platform 10 is its ability to automate the dispatching of servicers to subscribers' premises to perform warranty or repair claims that may be covered by the home services policies of the subscribers. Such claims may also be known as covered services claims (e.g., may also be referred to as covered claims). Automation may include automation of various parameters of service, including automated routing of service providers to and among visits, automated linking of a set of service provider to a set of jobs, automated setting of locations and/or times for a set of jobs, automated provisioning of necessary parts and supplies, and others.

In embodiments, automation may be facilitated by AI, such as by a robotic process automation system or agent that may be trained on a set of training data and/or that may be supervised or semi-supervised by a human operator. In embodiments, automation may be facilitated by deep learning, which may be improved by feedback on outcomes, such as outcomes involving service jobs.

The operators may configure, use, and manage the platform 10 and its components, such as to enable a set of repair and maintenance services to a set of subscribers under a set of home warranty agreements. Operators may or may not need to be owners of the platform 10 but in embodiments may contract with the owner(s) of the platform to access sets of features, components, services, modules and the like offered by the owner(s) of the platform to enable operators to provide repair and maintenance services.

The channel partners may also interface with the platform 10. The channel partners may register with the platform 10 and may provide value-added services to both the subscribers and the operators. In one example, the channel partners may engage with property tenants and owners to register them as subscribers and may manage interactions with the subscribers once registered. Channel partners may include providers of related services, such as real estate agency services, mortgage or other lending services, home inspection services, home, property, or casualty insurance services, marketing, sales, promotion services, other channel partners, other providers of related services, and the like.

The user devices 1106 may be computing devices with a processor and a memory, and one or more applications ("apps") 1102. The apps 1102 may be loaded into the memory by an operating system of each user device, and executable code of the apps in the memory may be executed by the processor. For this reason, the apps may be "executing on the user devices." Examples of user devices may be mobile smartphones, tablets, laptops and workstations, wearable devices, and the like in examples. As shown, the user devices 1106 may use wireless or cellular communications to access the web server 46 and the premises controller 1310 according to example embodiments.

More detail for the user devices 1106 is as follows. User device 1106-1 may be carried by an individual (e.g., "subscriber A") and may communicate with the premises controller 1310 and the web server 46. The app at the subscriber user device 1106-1 may also be known as a subscriber app 1102-1. User devices 1106-2 and 1106-3 may be carried by servicers 1 and 2, respectively, and their apps may also be known as servicer apps 1102-2, 1102-3 (e.g., service provider mobile application 118). User device 1106-4 may be accessed by an operator of the platform 10 and its app(s) may be known as operator apps 1102-4. User device 1106-5 may be accessed by a channel partner and its app(s) may be known as channel partner apps 1102-5.

Various components are also included within or at the premises of the subscribers. The components may include electromechanical systems installed at the properties, electronic systems and physical aspects of the properties. The electromechanical and electronic systems may allow stakeholders to remotely monitor operation of and view data collected by or for these systems (which may include onboard diagnostic data, telemetry data, data collected by one or more sensors within, on or proximal to a component, data collected by local network devices (such as switches, routers, gateways, IoT devices, other local network devices, and the like), data provided by one or more vendors or providers, and others, such as via various online data sources, data stored locally (such as in one or more local memory systems, such as an asset tag, memory of a device, memory of a local computing system, or the like) and data stored remotely (such as in a cloud or enterprise computing system), and possibly control these systems locally and/or remotely (e.g., which may include operator control by one or more interfaces, such as application programming interfaces, ports, channels, or the like, as well as autonomous control, such as by a local autonomous agent, a remote autonomous agent, or a combination). In contrast, the physical aspects may not necessarily provide these capabilities.

Examples of the electromechanical systems may include HVAC systems, alarm systems, thermostats, lighting systems, locks, sound systems, irrigation systems, tank-based and tankless water heaters, electrical and plumbing systems, and appliances, such as refrigerators, washers/dryers, dishwashers, stoves, space heaters, mixers, blenders, motorized plumbing systems, ovens, exercise equipment, toasters, and the like. The electronic systems may include home entertainment systems, networking systems (e.g., mesh networks, Wifi networks, Bluetooth networks, Zigbee networks, other networking systems, and the like), computer systems, other electronic systems, and the like in examples.

The physical aspects of the property may include structural elements of the premises and its surroundings, and physical connections to the electromechanical and electronic systems. These aspects may include a roof, exterior structures (such as exterior walls, decking, porches and the like) tures (such as exterior walls, decking, porches and the like) and foundation elements (below and above ground), doors, windows, chimneys, internal walls, support beams, floors and ceilings, insulation, electrical wiring and receptacles, and service lines, pipes, and conduits for water and the HVAC systems, in examples.

The components may also include subcomponents. The subcomponents may be typically elements or portions of the components that each provide a specific capability. In some examples, subcomponents may vary relative to other subcomponents or components in the extent to which they experience use, "wear and tear", or other damage. As a result, some subcomponents may require repair or replacement more often than others. Examples of subcomponents may include heating elements/"burners," sacrificial anode rods of tank-based water heaters, heating elements of furnaces that provide heat only for premises, filters for various systems, lighting elements (such as bulbs), other subcomponents, and the like.

One or more of the components at a subscriber's premises may be "covered" in the platform. In one example, a component at a subscriber's premises may be covered by the platform if it is referenced as being so in the home services policies of the subscribers. For this purpose, the covered component may be referenced with possibly a coverage level, such as a dollar amount range allowed for repair and/or replacement, and possibly a deductible amount, in examples. One or more system taxonomy labels and/or repair taxonomy labels may also be included within the home service plans and associated with each of the components/entities. In embodiments, a taxonomy for a set of components and corresponding services (e.g., repair services) may thus be embodied in a taxonomy that indicates various parameters for the components, including coverage parameters, deductible parameters, service parameters (e.g., available repairs and requirements for the same, maintenance requirements, and the like), and others. In embodiments, such a taxonomy may be stored in a graph structure, such as a directed acyclic graph, which may be stored in a graph database.

The system taxonomy labels and the repair taxonomy labels may be hierarchical. One or more labels have a "parent/child" relationship with a label at a level in the hierarchy either above or below the level of each label. Typically, each of the system taxonomy labels usually may have at least one sub-level or "child" label that identifies sub-components of each entity or property. In one example, the system taxonomy labels at a top-most level may generally describe an entity (e.g., HVAC system, roof, washing machine) while nested sub-levels/child levels provide aspects of or otherwise may provide more details of each parent label. In one example, an HVAC system taxonomy label may include next level/child level labels including a compressor, filters, heat exchanger, furnace type and the like.

The taxonomy may also include predefined costs and/or a range of predefined costs associated with one or more labels, at one or more levels within the hierarchy. Because the taxonomy is hierarchical, sub-labels of each label may further refine the costs/provide granularity for the cost (or range of costs) associated with a repair of an entity (repair taxonomy label) or for the cost of the entity itself (system taxonomy label). In one example, there may be multiple system taxonomy labels at a same level of the hierarchy for a washing machine appliance, such as "front loading washing machine" and "top loading washing machine." Each of these labels may have a fairly wide range of costs associated with them. Within each of these labels, different sub-level labels such as make, model, type (e.g., natural gas, propane or electric) may further refine the identity of the entity (e.g., the washing machine) and also include cost ranges that may further refine the cost ranges of the "parent" labels of each of the labels.

In a similar vein, the repair taxonomy labels may be hierarchical and each may have a cost and/or range of costs associated with each. As with the system taxonomy labels, the repair taxonomy labels that are highest in the hierarchy may be the most general and thus have a broader cost and/or broader range of costs associated with each. Each nested level of "child" labels may further refine the type or nature of the repair, and also correspondingly may further refine the cost and/or range of costs associated with each. Additional repair taxonomy labels may also be directed to the cost of services other than the labor cost to affect a repair, such as the cost to request a permit from a local city or town to perform a job, a separate inspection fee, or other miscellaneous fees.

In a similar vein, one or more of the subcomponents of the components may be covered. In example embodiments, the subcomponents may be covered individually or collectively as part of the component within which they are included or otherwise associated with.

As disclosed hereinabove, the list of components, subcomponents of the components, and physical aspects at properties of subscribers may be quite extensive and detailed, and each may have a different level of coverage (or none at all) per the home services policy for each subscriber. For this reason, all components, subcomponents of the components, and physical aspects at properties that are covered by a home services policy for a subscriber may also be known as "covered entities" of that subscriber.

In the illustrated example, the subscriber A premises 180A may include the premises controller 1310 as a component and may include other components. These other components may include, in this example, an HVAC system 332, a refrigerator 334, an electrical panel 336, an irrigation system 338, sensor 320-4, etc.

The other components may also include one or more subcomponents. In more detail, the HVAC system 332 may include sensor 320-1 as a subcomponent; the refrigerator 334 may include sensor 320-2; the electrical panel 336 may include sensor 320-3; and the irrigation system 338 may include sensor 320-4.

Each of the sensors 320 as subcomponents may detect and report information associated with operation of the component that the sensors may be attached to or included within. In one implementation, as shown, each of the sensors 320 may have "smart"/internet of things ("IoT")-enabled capabilities according to example embodiments. This information may include operational state, efficiency, and early indications of failure, in examples. The information may include data associated with the component as a whole, as well as data associated with individual subcomponents.

The premises controller 1310 may be configured to receive and collect the sensor data pushed from the sensors 320. The premises controller may then "push" the sensor data to the cloud computing system 170 via the remote network 101. In another implementation, the premises controller 1310 may request the sensor data or poll the sensors for their sensor data.

Also as shown, the subscriber A premises 180A may include a maintenance file 340 and an inspection report 129 according to example embodiments. There may be other examples of physical aspects at the premises that may require manual inspection by a servicer at the premises, or may be incorporated into an electronic component such as an electronic asset management device, in examples. In yet another example, the contents of the maintenance file 340 and the inspection report 129 may be included within the subscriber app 1102-1 and then may be forwarded over the remote network 101 to the cloud computing system 170 for storage at the subscriber database 1120. In embodiments, the inspection report may be embodied as a smart contract that may take the sensor data as a set of inputs, and/or the inspection report, or portion thereof, may be configured to exchange information with a smart contract.

The inspection report 129 may include an initial state of repair and condition of repair of the overall premises. Typically, the inspection report 129 may include an initial state of repair and condition of repair of each component, subcomponents, and other aspects of the premises at a time that the subscriber purchased or leased the property or date of initial subscription, and possibly for other subsequent times.

The home services platform 10 may generally operate as follows. Subscriber A may establish a secure login session with the cloud computing system 170. For this purpose, subscriber A may use the app 1102-1 on the user device 1106-1 to access the web server 46 and establish the login session with the cloud computing system. The app 1102-1 may present an interface such as a graphical user interface ("GUI") to the subscriber, within which the subscriber may enter their credentials (e.g., username and password). The app 1102-1 may send the credentials to the web server 46, which may then forward the credentials to the cloud computing system 170 for validation.

The cloud computing system 170 may then compare the received credentials for subscriber A to stored credentials for subscribers at the subscriber database 1120. The subscriber database 1120 may include one or more records for each subscriber. If the stored credentials for a record in the subscriber database 1120 match the received credentials, the cloud computing system 170 may establish a secure login session with the app 1102-1 at the user device 1106-1.

The validated subscriber (e.g., subscriber A) may then interact with the platform in various ways via the app 1102-1 and the web server 46. In one example, subscriber A may prepare and send service claim requests to the cloud computing system 170. Each service claim request may be for a warranty or repair service that subscriber A requests from the cloud computing system 70. The service claim request may be for a warranty or repair service to be performed at one or more premises of the subscriber. Additionally or alternatively, the subscribers may contact a service representative to create service claim requests on their behalf. In yet another example, some components of the platform 10 may be configured to automatically create service claim requests based upon information concerning the components and other aspects of the premises of the subscribers.

The servicers may also be pre-registered with the platform 10 to perform one or more tasks or "jobs" associated with each service claim request. The servicers may interact with the platform via the servicer apps. In the illustrated example, servicers 1 and 2 may interact with the platform 10 via servicer apps 1102-2 and 1102-3, respectively. Using the apps, the servicers may enter their credentials, and the cloud computing system 170 may compare the received credentials for the servicers to stored credentials for the servicers at the servicer database 1130. Validated servicers may then access resources and components of the platform 10 via the cloud computing system 70.

The service claim request may include details of the warranty or repair service that subscriber A may prepare and submit via the app 1102-1. For this purpose, in one example, one or more modules of the cloud computing system 170 may prepare a list of items for presentation at the app 1102-1, where each item may be a warranty or repair service that may be covered by the platform for subscriber A. The subscriber may then select one or more items from the list. The one or more modules of the cloud computing system 170 may also provide a list of one or more system taxonomy labels and/or repair taxonomy labels associated with each item. Additionally or alternatively, the subscriber may manually enter the description of the warranty or repair service to be performed manually, such as in a text edit field or dialogue box, and may choose one or more system taxonomy labels and/or repair taxonomy labels to associate with each item.

The cloud computing system 70 then may receive and process the service claim request. In one example, the cloud computing system 70 may determine whether the service claim request is covered, and may schedule a job associated with the service claim request for a servicer to perform. The cloud computing system may also assign a servicer from its registered servicers to perform the job.

The operators and the channel partners may establish login sessions with the cloud computing system 170 in a similar fashion as that described for the servicers and the subscribers. The cloud computing system 170 may use a combined operator and channel partner database for this purpose, or possibly a single database may be used to maintain records for each of the stakeholders (including the servicers and the subscribers). The cloud computing system 170 may provide each of the stakeholders with access to different data and/or components within the platform 10 based on predetermined rules and via different interfaces for each of the stakeholders.

More detail for the components of the platform 10 and its operation is included in the descriptions of FIGS. 9A through 9C, included hereinbelow according to example embodiments.

Figure 9A:
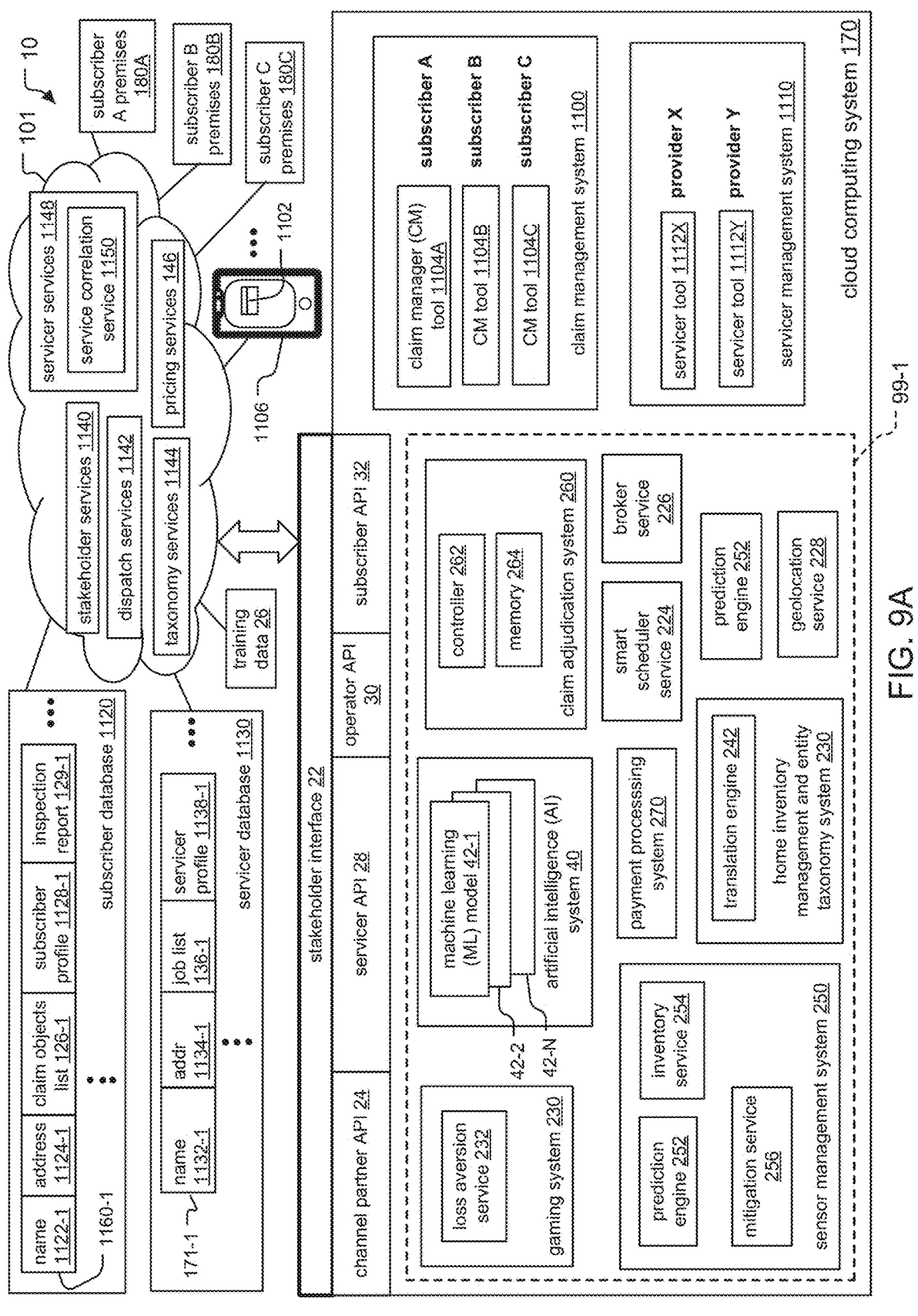
FIG. 9A is a first schematic diagram that provides more detail for components of the home services platform in FIG. 8, including indications of information flows and interfaces among various components according to example embodiments of the disclosure.
Figure 9B:
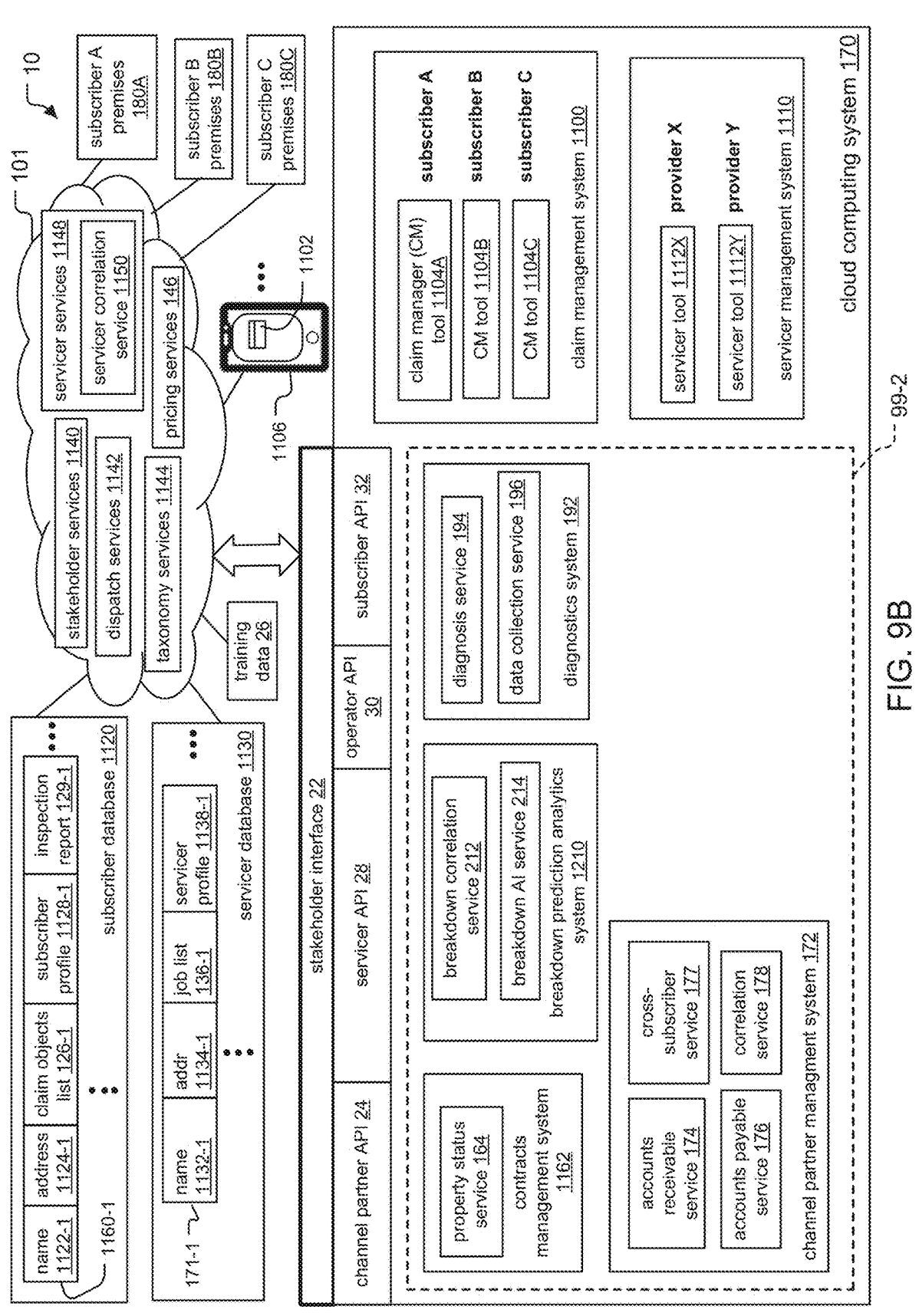
FIG. 9B is a second schematic diagram that provides more detail for components of the home services platform in FIG. 8, including indications of information flows and interfaces among various components according to example embodiments of the disclosure.
Figure 9C:
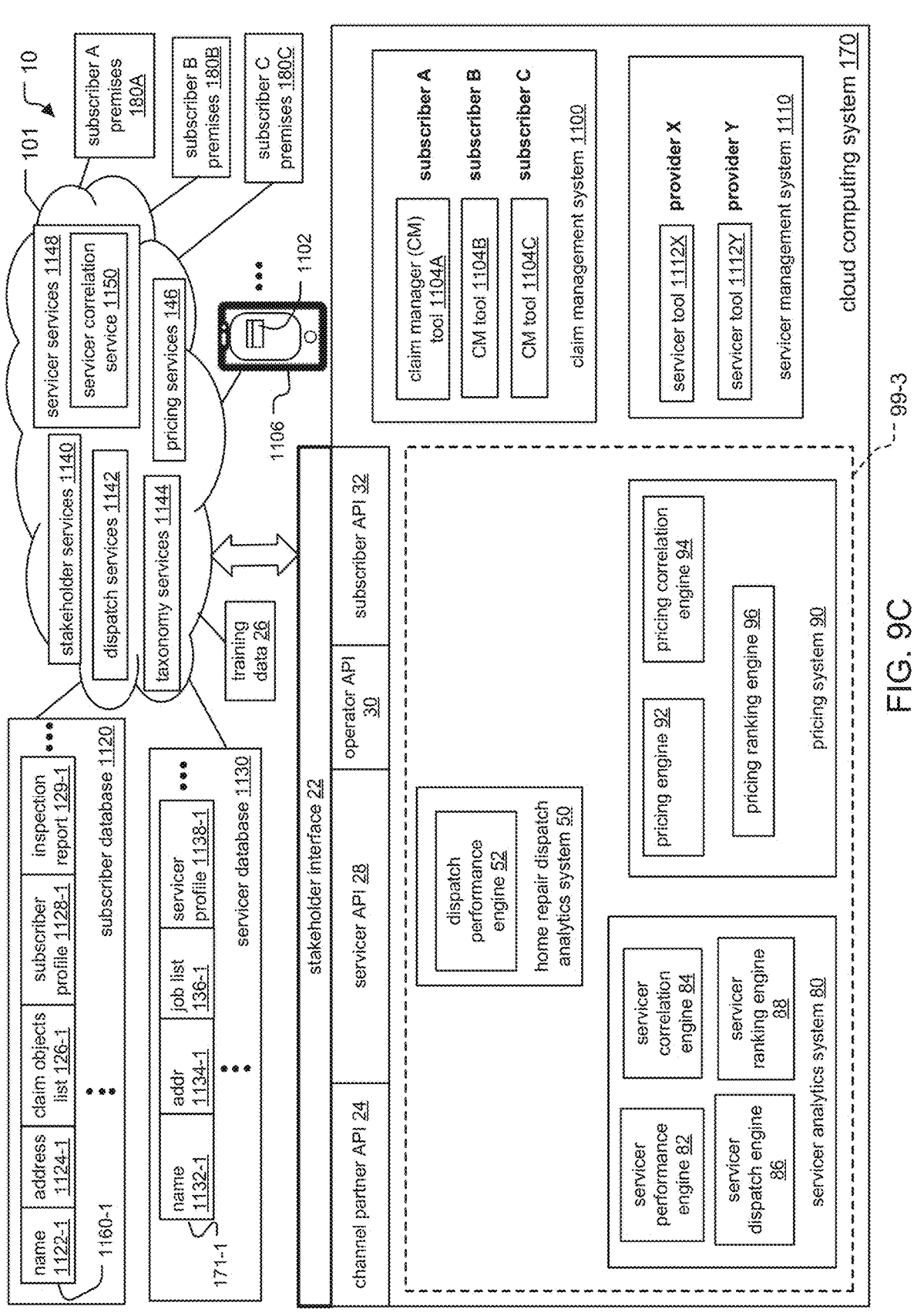
FIG. 9C is a third schematic diagram that provides more detail for components of the home services platform in FIG. 8, including indications of information flows and interfaces among various components according to example embodiments of the disclosure.

FIGS. 9A-9C show more detail for the home services platform 10 in FIG. 8 according to example embodiments. The figures also show premises of two additional subscribers B and C connected to the remote network 101 according to example embodiments. These subscriber premises may also be known as subscriber premises B 180B and subscriber premises C 180C.

In FIG. 9A, the cloud computing system 170 includes a stakeholder interface 22 that includes and exposes various stakeholder Application Programming Interfaces (APIs), a claim management system 1100, a servicer management system 110 and various modules 99 according to example embodiments. These modules 99 may be software, firmware, or hardware based.

The stakeholder APIs may include a channel partner API 24, a servicer API 28, an operator API 30, and a subscriber API 32. Each of the channel partners, servicers, operators, and subscribers may access the cloud computing system 70 via the respective API of the stakeholder interface 22. At the remote network, the servicer services 1148 may also include a servicer correlation service 1150. In example embodiments, the servicer correlation service 1150 may be used to compare pricing amongst servicers based on their experiences and/or types of repairs that they provide as described in the disclosure.

The modules 99 may include many different computing nodes, systems, services, and other resources. For this reason, only a portion 99-1 of the modules 99 is shown in the figure according to example embodiments. The modules

99-1 may include a gaming system 230, a sensor management system 250, an artificial intelligence (AI) system 40, and a home inventory management and entity taxonomy system 240. Additional modules 99-1 may include a payment processing system 270, a claim adjudication system 260, a smart scheduler service 224, a broker service 226, a prediction engine 252 and a geolocation service 228.

The modules 99-1 may include many different subcomponent computing nodes, systems, services, and other resources. In examples, as shown, the gaming system 230 may include a loss aversion service 232 according to example embodiments. The sensor management system 250 may include an inventory service 254 and a mitigation service 256. The AI system 40 may include a set of machine learning (ML) models 42. Multiple ML models 42-1 through 42-N are shown according to example embodiments. The home inventory management and entity taxonomy system 240 may include a translation engine 242. The claim adjudication system 260 may include a controller 262 and a memory 264.

The stakeholder services 1140 may provide various functions. In general, the stakeholder interface 22 may utilize and access information from the stakeholder services 1140 when communicating with the stakeholders. In one example, when the stakeholder APIs receive messages from stakeholders, typically sent from the apps 1102 of the user devices 1106 carried by the stakeholders, the stakeholder interface 22 may use the stakeholder services 1140 to determine which type of stakeholder (e.g., subscriber, channel partner, servicer, operator) may be sending the request. The stakeholder interface 22 may then forward the request to the appropriate stakeholder API. In another example, the stakeholder services 1140 may include an access control list of objects and components within the platform 10 that each stakeholder may access. In one implementation, an operator may update the access control information and capabilities of the stakeholder services 1140 in response to security objectives.

The claim management system 1100 may include a separate claim manager (CM) tool 104 or instance for each of the subscribers. CM tools 1104A, 1104B and 1104C for subscribers A, B and C are shown according to example embodiments.

The CM tool 1104 for each subscriber may be a combination of computing nodes, memory, and other resources. Each CM tool 1104 may provide a subscriber-specific view of claims requested by each subscriber (e.g., the service claim requests) and may create and manage local objects and resources based upon interactions with other components of the platform 10 in response to the claims. In this way, the CM tool 1104 for each subscriber may operate independently of the CM tools for the other subscribers, may hide data between subscribers, and may enable more efficient searching and sorting of subscriber-specific claim information at each CM tool 1104. In another implementation, the claim management system 1100 may manage all claim-related information for all subscribers collectively, without the separate CM tools for each subscriber.

In embodiments, the CM tool(s) 1104 may include a set of smart contract elements, such as ones that embody and automatically execute a set of rules, such as rules governing claim coverage, service provisioning, deductibles, pricing, and the like. In embodiments, such smart contract elements may be populated by the terms and conditions of a particular subscriber's policy, as well as by other elements, such as sensor data or other data collected from or about the subscriber's premises, data from service providers or other stakeholders, external data (such as data about weather, climate, power outage events, seismic events, in examples), and other data.

In a similar vein, the servicer management system 1110 may include a separate servicer tool 1112 or instance for each of the service providers. Two servicer tools 1112X and 1112 Y are shown according to example embodiments. The servicer tool 1112 for each servicer may be a combination of computing nodes, memory, and other resources. Each servicer tool 1112, in one example, may provide a servicer-specific view of jobs assigned to each servicer. The jobs, in turn, may each be associated with a claim in the claim management system 1100.

The servicer management system 1110 may also create a job object for each job assigned to a servicer. The job object may include various information associated with the job, including a list of the tasks to be performed by one or more servicers and the components involved, problems encountered by the servicers, and notes entered by the servicers regarding a condition of the components (both before and after performing service), in examples. The terms "job object" and "job" may be synonymous in the disclosure.

Various components of the platform and its stakeholders may also access the job to view and update its contents over time. In one example, the servicers may attach an invoice to the job upon completing the tasks included therein. In another example, various components of the platform 10 (or possibly stakeholders) may include, reference, or otherwise attach a trust score to the job and update the trust score upon completion of performance.

Each servicer tool 1112 may also create local objects and resources based upon interactions with other components of the platform 10. In this way, the servicer tool 1112 for each servicer may operate independently of the servicer tools 1112 for the other servicers, may hide data between servicers, and may enable more efficient searching and sorting of servicer-specific information created by and maintained at each servicer tool 1112. In another implementation, the servicer management system 1110 may not include separate servicer tools for each subscriber.

The subscriber database 1120 may include one or more subscriber records 1160. Each subscriber record may store information for a specific subscriber. In another implementation, the subscriber database 1120 may include a separate record for each property/premises of each subscriber. In this way, the platform 10 may manage multiple properties/premises of the subscribers more efficiently. One instance of a subscriber record 1160-1 is shown according to example embodiments.

Each subscriber record 1160 may include various fields. For record 1160-1, in one example, these fields may include a name 1122-1, an address 1124-1, a claim objects list 126-1, a subscriber profile 1128-1, and an inspection report 129-1. Also included may be stored credentials of each subscriber. Each record 1160 may generally include at least these fields, and optionally additionally fields.

The subscriber profile 1128 may include location information for the properties owned or leases by the subscribers and demographic information of the subscriber. The subscriber profile 1128 may include an age, gender, occupation, geolocation, cultural background, family status, demographic data, psychographic data, behavioral data (including usage data with respect to the platform, information about brand preferences (such as appliances), shopping data, and other data) in examples, among others. Other information may include an ID, a level of coverage selected, and possibly references to all claims (both covered and uncovered) created by the platform 10 for each subscriber. The subscribers may access and update their profiles 1128 using the subscriber app 1102-1.

The subscriber profiles 1128 may typically also include property information for each property at each premises owned or leased by each subscriber. The property information may include a square footage, an age, location, weather and climate information, type of premises, proximity information relating to other premises, and many other parameters.

The claim objects list 126 may be a list of claim objects for the subscriber. Each claim object may be created by the CM tool 104 for that subscriber. The CM tool 104 may create a claim object for each service claim request issued by each subscriber and may include information for and associated with each service claim request. In one example, the claim object may include a reference to a job for a servicer to perform. The job may be associated with the service claim request for which the claim object was created.

In a similar vein, the servicer database 1130 may include servicer records 171 for each servicer. The servicer record 171 may include various fields. For exemplary record 171-1, in one example, these fields may include a name 1132-1, an address 1134-1, a job list 136-1, and a servicer profile 1138-1. Also included may be stored credentials of each servicer. Each servicer record 171 may generally include at least these fields, and optionally additionally fields.

The job list 126-1 may be a list of jobs for the subscriber. Each job may be created by the servicer tool 1112 for that subscriber. The servicer tool 1112 may create a job (or a job object) for each job assigned to the servicer by the platform 10. The job may include information for and associated with performance of a service claim request/claim object. In one example, the job may include a reference to the associated service claim request/claim object.

The servicer management system 1110 may create the servicer profiles 1138 for servicers registered with the platform 10. For this purpose, in one example, each servicer may enter information for the servicer profiles via the servicer app 1102-2, 1102-3 and the servicer management system 1110 may create the profiles in response.

Each servicer profile 1138 may include business information for the servicer (e.g., entity, sole proprietor, contractor/1099) and demographic information of the servicer, which may include age, gender, location, and the like, as well as a set of servicer preferences and a set of servicer behavioral profiles. Servicer preferences may include preferences as to job types, anticipated job durations (e.g., a preference for jobs that may not require a high degree of physical endurance), job difficulty (e.g., a preference for a job that may not require crawling or kneeling, a preference for a job that may not require lifting), job locations (e.g., a preference for jobs during a day that may result in a total of less than a given threshold of driving distance or time, a preference for jobs near places where the servicer prefers to work), and others.

The servicer profiles may also include specific information about the types of jobs a servicer is authorized to perform and a skill or experience level of the servicer. In one example, the servicer profile may include license information or other certifications that qualifies a servicer to perform specific jobs, such as a plumber, electrician, or HVAC servicer. As to skill level, using plumbing as an example, the profile may include information indicating that a servicer may be a master, journeyman, or apprentice level plumber.

Such granularity within the information of the servicer profiles may allow the servicer management system 1110 or other systems of the platform 10 to not only select an authorized servicer for a job or a servicer with an appropriate skill level for a job, but also to gauge and minimize cost and risk based on these criteria. For example, an electrical repair service job may require a master electrician, at least one journeyman electrician, and an inspection from a local permitting official. However, the job may be of a nature such that the journeyman electrician does the majority of the work at the homeowner's/subscriber's property, while the master electrician may typically need to be present at the property only to verify that the work is done in accordance with electrical codes and trade standards, and to meet with the inspector.

In the electrical repair service job example, the servicer management system 1110 or other system of the platform 10 may first lookup the information in the job/the job type. Included within the job, or included within a job estimate object for the job, a hierarchical job taxonomy may include both system taxonomy labels and repair taxonomy labels that may identify the entities that are included in the repair job and information describing the repair/repair service to be performed, respectively. Based on this information, the servicer management system 1110 or other system may then select a set of authorized master electricians and a set of authorized journeyman or apprentice electricians based on the licensing and skill level information in their servicer profiles. The servicer management system 1110 or other system then may select a final authorized master electrician and a final authorized journeyman from the sets.

In example embodiments, the final selection of each authorized servicer may be based on various additional factors such as the distance of each servicer to the property, trust scores of the servicers within their servicer profiles 1138, and cost, in examples. As to cost, the servicer management system 1110 or other system may compare an hourly rate of each servicer included within their servicer profiles to the estimated cost of the job, or to a coverage limit in the subscriber's home protection plan for the job, in examples. Here, in example embodiments, the coverage limit may be job-specific, specific to one or more of the covered entities, or be an overall coverage limit for the subscription period of the home protection plan.

Servicer behavioral profiles may include behaviors observed based on the platform, such as behaviors that may reveal the preferences noted above (e.g., based on differences in types and locations of jobs accepted relative to other servicers), as well as others, such as behaviors involving time of day (e.g., faster job completion on morning jobs than on afternoon jobs, better on-time arrival for afternoon jobs, etc.), behaviors involving types of jobs (e.g., displaying significant degradation of performance after physically difficult jobs), behaviors involving types of customers (e.g., receiving higher quality ratings from customers that have a given set of demographic characteristics), or the like.

In embodiments, servicer preferences and behavioral profile data may be used to match servicers to jobs, may be used as a factor in rating the quality of a servicer, and may be used as a source of feedback or training of the servicer. The servicer profile 1138 may generally also include a list of all warranty or repair services that the servicers provide/are licensed to provide, and a list of the services that each subscriber may be authorized to perform by the platform 10. These lists may be the same list for both. The servicers may also update their profiles 1138 via their servicer apps.

The servicer profiles 1138 may also include: pricing/cost data including a dispatch cost, a claim cost, a travel cost, a materials or components cost (which may be based, for example, on costs in the area of the servicer for the types of materials and components required for a job); quality data including data derived from customer surveys, from data collected via the platform (such as relating to on-time arrival, time of job completion, rate of job completion, rate of complaints, cost/price relative to other servicers for similar jobs, appearance (including as captured by on-site cameras, and including servicer appearance, job site appearance, vehicle appearance, and appearance of completed work); a job acceptance rate; a service fee collection rate; and integrity data including an average out-of-pocket expenses amount charged, a relative amount of expenses charged to job cost, and/or a maintenance to repair ratio, in examples.

Additionally or alternatively, the servicers may access a list of outstanding jobs not currently assigned to a servicer. The lists may be presented by the servicer management system 1110 to the servicer apps 1102-2, 1102-3. The servicers may select one or more of the outstanding jobs and may commit to performing the jobs via the apps. For this purpose, the servicers may specify one or more date and/or time ranges, and the cloud computing system 170 may schedule performance of the job based on the servicer-supplied date and/or time ranges and may notify the subscribers. In this way, the servicers may assign themselves to jobs rather than the platform doing so.

Based on rules defined at the stakeholder services 1140 and applied by the platform, such as at the stakeholder APIs or other interfaces to the platform, various stakeholders may be able to access information concerning the other stakeholders. In one example, subscribers may be able to access a subset of the subscriber profiles of the subscribers to gauge whether the subscribers are trustworthy (e.g., by accessing a trust score, quality score, integrity score, or the like). The operators are typically able to access most details such as the profiles 1128, 1138 of the other stakeholders, while other subsets of stakeholders may have access to more limited information. For example, in certain embodiments, a subscriber may view an overall rating for a servicer, but may not view servicer preferences or behavioral data for that servicer. Similarly, in certain embodiments, a servicer may be able to view a subscriber's trust score, but not view other demographic or behavioral data about the subscriber.

In another example, the cloud computing system 70 may automatically approve an estimated cost entered by a servicer for each job. In still another example, once a job is approved and the servicer has completed performance of the job, the cloud computing system 70 may direct payment of the estimated cost, thus scheduling payment of the job.

More detail for the modules 99-1 and their operation is in the disclosure as follows. In embodiments, the gaming system 230 may provide gamification features of the platform 10, in the form of a set of home services warranty and repair gamification experiences that may be perceived by one or more stakeholders of the platform 10. For this purpose, in one example, the gaming system 230 may include a set of services that monitor and maintain activities of subscribers for gamification purposes. For this purpose, the gaming system 230 may track activities of subscribers such as subscriber A via the subscriber app 1102 and may provide incentives to subscriber A based on their activities. These incentives may include online coupons, sales promotions, and offers for reduced prices on goods and services offered by the channel partners. In another example, the loss aversion service 232 may send surveys and other feedback mechanisms to subscriber A via the app 1102-1 and may store the surveys and other feedback to the stakeholder services 1140 for review and analysis by the operators of the platform 10.

The sensor management system 250 may receive sensor data 321 sent from the sensors 320 of the components at the premises of the subscribers. In one implementation, the sensors 320 may format and send their sensor data 321 directly to the sensor management system 250.

In one preferred implementation, as shown at the premises of subscriber A in FIG. 8, the sensors 320 may send sensor data 321 in a raw format to the premises controller 1310 according to example embodiments. The premises controller 1310 may collect and buffer the sensor data 321, package and may format the sensor data 321 into messages that meet an underlying message size and format of a communications protocol of a communications link (e.g., wired, wireless, proprietary, cellular, etc.) between the controller 1310 and the sensor management system 250, and then may forward the messages over the link to the sensor management system 250. In embodiments, the sensor management system 250 may receive data from various sensor systems, including sensors embedded in equipment and components, sensors disposed on equipment or components, sensors in IoT devices (e.g., thermostats, cameras, and other smart devices), sensors in network devices (e.g., routers, mesh network nodes, switches, gateways, other network devices, and the like), sensors of wearable devices (such as ones worn by servicers, customers, and the like), other sensor systems, and the like.

The sensor management system 250 may send the sensor data 321 to or otherwise share data with (such as via a shared data repository) with the smart scheduler service 224. The smart scheduler service 224 may send a reference to the sensor data 321 to, or otherwise share it with, the prediction engine 252. The prediction engine 252 may then analyze or operate on the sensor data 321, such as to determine whether the components may be in need of repair or servicing, to predict when future faults may occur, to predict the cost of repairs, and/or to predict the type of repair that may be needed, and others.

For this purpose, the sensor data 321 may include a unique ID or code for each sensor and information that may include an age, state of repair, and state of operation of each sensor, in examples. The prediction engine 252 may compare the sensor data 321 to one or more models that link sensor data 321 to outcomes. In embodiments, models may be embodied in action tables or the like that include information for each type of sensor and a recommended action, if any, to perform, based upon the comparison. Example information provided in the action table for each sensor may include an alert message, a description of each sensor, possible problems associated with each sensor, the probability that a fix may be needed (e.g., high/medium/low), one or more actions to take, an approximate cost to fix, an approximate cost if complications arise, and an explanation of potential issues if no services are currently performed, in examples.

In embodiments, a model or action table may be based on a combination of sensor data 321, such as sensor data from a main sensor and a backup sensor that, if in agreement, trigger a validated conclusion, or trigger a set of different sensors (such as accelerometers and temperature sensors). The results of the triggering may be combined to draw an inference about a condition, such as that a moving part is causing excessive shaking or friction. In embodiments, the model may be used by the prediction engine 252 to make a prediction, such as using various artificial intelligence techniques described herein, which may include training on human-labeled data sets to recognize conditions or states, deep learning on outcomes (such as faults and corrections), supervised or semi-supervised learning, and the like.

Upon finding a matching alert message in the action table based upon the sensor data 321, the prediction engine 252 may include the contents of the alert in a message, may send the message to various stakeholders, and/or execute a set of actions in response. The actions to take may incorporate varying levels of urgency and an action type (e.g., recommendation or proactive execution). Example actions may include recommending scheduling of a service job on a next visit, recommending scheduling a visit within a time period (e.g., within the next two weeks), recommending an immediate service call, recommending an action pending a service call (e.g., stopping usage of a potentially damaged item to prevent further harm, replacing an element (e.g., a filter or battery, or the like), and/or recommending complete replacement of an item, among others. In yet another example, the actions may include automatic actions, such as automatically and proactively scheduling a service call, automatically sending an instruction to an item (such as an instruction to shut down a network-connected item pending service, automatically updating an item with a new instruction set, or the like), automatically ordering parts or materials for a service job, automatically triggering a claim, or others.

The sensor management system 250 may also utilize services of the prediction engine 252 to predict date ranges of failures of the components at the properties of the subscribers, based on the collected sensor data 321, and may notify the platform 10 and relevant stakeholders concerning the predicted failures.

When the action type is "proactive execution," the sensor management system 250 may configure the platform 10, in example embodiments, to automatically schedule a service visit. For this purpose, the sensor management system 250 may automatically prepare and send a service request to the claim management system 1100 to create a claim for a warranty or repair service based on the action and its action type. If the claim management system 1100 determines that the service request is a covered claim, the claim management system 1100 may instruct the servicer management system 1110 to create a job associated with the claim/service request and may assign a servicer to the job. The smart scheduler service 224 may then schedule the job to be performed at a time and date based on the subscriber and the servicer's schedules. In this way, the platform 10 may provide proactive creation of claims for warranty and repair services and proactive scheduling for one or more servicers to perform a set of jobs related to the claims, in each case based on the sensor data 321 sent from the subscriber's premises.

In embodiments, scheduling is performed by AI, which may be based on one or more models and which may be trained on a training data set, such as involving expert interactions with a scheduling system and/or a training data set of outcomes. A scheduling model may take into account a wide range of factors, including locations of jobs, profiles of customers and servicers, routing factors (including traffic), and the like, such that proactive job scheduling may be optimized to improve outcomes, including cost management outcomes, customer satisfaction outcomes, job completion outcomes, total customer value outcomes, and others. In embodiments a robotic process automation system may be used to schedule jobs, which may be initially trained on a set of interactions of experts with a scheduling system and may subsequently be improved by deep learning, supervised learning, and/or semi-supervised learning.

The servicer management system 1110, in one implementation, may assign one or more servicers to each job using the broker service 226. The broker service 226 may match the servicers to the service claim requests, and bind at least some of the matching servicers to jobs associated with the service claim requests to create the association between the jobs and the claims/service requests. In example embodiments, the jobs may include the at least one of the warranty service or the repair service to be performed in the claim objects for the service claim requests.

The broker service 226 may also set job volume commitments for a servicer, and may set a percentage and/or total number of jobs that may be assigned/bound to a servicer. The percentage and total number may be based on a date range (e.g., monthly, quarterly or yearly) or on a job type, in examples.

Operation of the broker service may include: manually setting job volume commitments made to the servicer; manually setting a percentage of jobs that should be designated to a particular servicer; and/or use of automated system (perhaps using artificial intelligence/machine learning (AI/ML) to optimize performance of the service network for cost, quality, and/or efficiency of jobs).

The smart scheduler service 224 may also access information associated with a recently scheduled job associated with warranty and repair claim at a property of a first subscriber, and schedule other jobs based on the information for the job at the premises of the first subscriber. In one example, the service 224 may identify other subscribers at properties within a vicinity range of the first premises. The servicer assigned to the job at the first premises may be scheduled to perform the job, may be actively performing the job but may expect to be at the first premises for a period of additional hours or days, or may have recently completed performance of the job but may still be at the first premises. The scheduler service 224 may then solicit or otherwise recommend that the other subscribers in the vicinity avail themselves of similar services while the servicer may still be at or near the first premises and may be available to perform new jobs.

In one example, one or more of the other subscribers may respond directly to the recommendation/solicitation rather than initiate their own service claim requests. The smart scheduler service 224 may then receive a message affirming the solicitation from the other subscribers, and in response, automatically prepare and submit a service claim request that may include the information from the job at the first premises. After the claim management system 1100 instructs the servicer management system 1110 to create a job for the claim and associate the job with the claim, the scheduler service 224 may schedule the job associated with the claim/service claim request with the same servicer, or with other servicers. The scheduling may be based upon the servicers' availability, the types of jobs they may perform or may be allowed to perform (as included within their servicer profile 1138), the extent of coverage of the subscribers, and the like. Scheduling may be undertaken based on a model as noted above, and may be include various parameters and metrics (e.g., trust scores, integrity scores, cost metrics, and the like), which may be maintained and stored for each servicer or other stakeholder.

When scheduling other jobs in the vicinity of the premises where the first job was performed, the scheduler service 224 may access the geolocation service 228. In example embodiments, the geolocation service 228 may locate other servicers in the vicinity of the first premises, and other subscribers in the vicinity of the first premises. For this purpose, the geolocation service 228 may reply with geography information including global coordinates, zip codes, and physical features in the vicinity (e.g., roads out of service, emergency conditions), in examples. The geolocation service 224 may include a routing service, such as one that factors in traffic (which may include crowdsourced information, information from mapping services, and/or information from the platform), weather conditions, and other factors that may impact the ability of a servicer to move from one location to another.

The scheduling provided by the smart scheduler service 224 may include one or more of the following capabilities:

a. A management system allowing servicers to set their availability and/or integration with a scheduling system of the servicer;

b. Direct visibility to the availability for selection by the subscriber;

c. Direct match to the time request of the customer to the availability of a servicer;

d. A process to inquire with service providers whether they may meet the day/time requested by the subscriber;

e. A set of scheduling rules, such as round robin (which may schedule servicers in turns), "jump ball" (e.g., the first servicer to respond gets priority), and weighted (e.g., ranking based on multiple factors, including order of response, ratings, turn-taking, etc.), and other scheduling rules;

f. Rebalancing the order, such as of a round robin, to achieve the desired distribution of jobs to achieve optimal cost, quality, and efficiency, or to possibly distribute or otherwise direct one or more jobs to a particular servicer to fulfill a job volume commitment to the servicer; and/or g. Delaying or moving from one servicer to another in a round robin to increase the likelihood of job acceptance to achieve optimal cost, quality, and efficiency. In embodiments, an artificial intelligence system may be trained, such as on a training set of expert interactions and/or based on outcomes, to adjust a set of scheduling rules, such as to achieve a desired distribution of jobs and/or to optimize a distribution of jobs in order to achieve a further outcome, such as one based on a metric of total customer value, a metric of total cost, a metric of operator profitability, a metric of customer satisfaction, and/or a combination of the above. This may include adjusting the weights of a set of parameters in a scheduling rule, such as to rank order a set or servicers for a job. AI techniques noted throughout this disclosure may be used, including robotic process automation, deep learning, supervised learning, semi-supervised learning, other AI techniques, and the like.

In still another example, the platform 10, via the smart scheduler service 224, may schedule same-day service appointments for its servicers. Same-day service is often highly desirable for customers, but very difficult to obtain, as jobs may arise suddenly as a result of a fault in an item, but all servicers may be unavailable as they are performing other jobs, or servicers may only be available at high "emergency" rates. For this purpose, the smart scheduler service 224 may predict, such as using the prediction engine 252 described elsewhere in this disclosure, the number of jobs of a given type that are likely to be required for a given area, the number of jobs that are likely to be undertaken by each servicer, and the like. The smart scheduler service 224 may then match a set of servicers to a set of jobs and obtain confirmation from a servicer that the servicer will be assigned to a job, in advance of the initiation (or even awareness) of the specific job.

The smart scheduler service 224 may also obtain confirmation from a servicer for a number of jobs that are reserved in advance for that servicer. The confirmation may also include an indication of the days and times for each job. By scheduling jobs in advance of their emergence, the smart scheduler service 224 may generate an "inventory" of available servicer jobs of various types across a service area, from which the smart scheduler service 224 may draw servicers in order to fulfill emergent needs, such as same-day service needs. Additionally, the smart scheduler service 224 may use the inventory at the day of the service, pre-purchase such inventory in varying levels over time, adjust any requested reserved inventory based on any "waste" (i.e., unused jobs that were prepaid), and use a yield optimization algorithm to determine how many service appointments to reserve in advance to minimize wasteful expense but maximize the number of subscribers receiving same day service.

In embodiments, the optimization algorithm or model may use various AI and machine learning techniques noted herein and may operate on a model that may include the various parameters of the prediction engine for predicting the need for a service job, and may be optionally aggregated across an area to yield a prediction of the number and type of service appointments that may be required. Over time, the optimization algorithm may be trained upon outcomes of a large number of service jobs, such that an optimal inventory may be maintained, factoring in the benefits of same-day service and the cost of maintaining sometimes unused inventory. In embodiments, this may be referred to as an advance inventory scheduling agent of the platform.

The inventory service 254 may receive an initial list of inventory data from operators of the platform 10. The inventory data may include information concerning the components (and their subcomponents) and the other aspects of the premises, the contents of the maintenance file 340 and the inspection report 129 at a particular point in time. In response to receiving sensor data 321 for new components at the premises of a subscriber, or updates to existing components, the inventory service 254 may notify the operators of the platform to update the inventory data in response. In another example, changes to the maintenance file 340 and/or the inspection report 129 may trigger the inventory service 254 to notify the operators. Additionally or alternatively, the subscribers, via their subscriber apps 1102-1, may also access an inventory section of the GUI and manually enter new information or update existing information regarding the components, subcomponents, and other aspects at the premises of the subscribers.

The mitigation service 256 may be used to minimize dispatch cost once a servicer assigned to a job is scheduled and dispatched to the premises of the subscriber to perform the job. In example embodiments, the mitigation service 256 may access the sensors 320 and report the sensor data 321 to the servicer on site via the servicer app 1102-2/1102-3. The real-time update of the sensor data 321 may help minimize dispatch cost.

The home inventory management and entity taxonomy system 240 may include a set of services which may provide labels for the components and other aspects of the premises of a subscriber. These labels may include system taxonomy labels and repair taxonomy labels, in examples. Various components of the platform may use the home inventory management and entity taxonomy system 240 to determine which labels to use/associate with an item. In this way, the same labels or identifiers may be used throughout the platform 10 and by the stakeholders when interacting with the platform. In examples, the labels may be in the form of a structured data representation of the components. More than one label may be associated with or assigned to a component within the premises.

More detail for the system taxonomy labels is in the disclosure as follows. The system taxonomy labels may include a primary system taxonomy label that may identify each component or other aspect at each premises; a secondary system taxonomy label that may identify a subcomponent of each component or other aspect; and a diagnostics label associated with symptom information obtained for component and/or other aspect at the premises.

The translation engine 242 may receive unstructured data from various components of the platform 10, may format the data into structured data, and may assign associated labels to the structured data. In one example, the structured data may utilize a JavaScript Object Notation (JSON) format. The unstructured data may include: data scanned from barcodes attached to components and other aspects at each premises; data entered by the subscribers in the subscriber app 1102-1 when submitting service claim requests; sensor data sent from one or more sensors 320; and a description of repair entered by a servicer assigned to a job at a premises. In one example, the sensor management system 250 may access the translation engine 242 to pre-format the sensor data 321 received from the sensors before communicating with the smart scheduler service 224, the claim management system 1100, and/or the servicer management system 1110, in examples.

In one example, during the creation of a service request, the subscriber may either enter detail for the problem(s) associated with the claim at the app 1102-1, and/or may be presented with a list of known problems and potential issues by the web server 46 via the app 1102-1. The known problems and potential issues may be specific to the components and other aspects at the premises for an individual subscriber, or may be a master list of all known problems and potential issues for all components managed by the platform 10 for all subscribers. The subscriber may select one or more known problems and potential issues from the list, and the app 1102-1 may send a message that includes information regarding the selection to the home inventory management and entity taxonomy system 240.

The home inventory management and entity taxonomy system 240 may respond to the message by sending either a limited list of labels that may be tailored to the selection, or may send all labels via the web server 46. At the app 1102-1, the subscriber may then associate one or more of the labels with the one or more known problems and potential issues. In another implementation, the association of the labels to the one or more known problems selected by the subscriber may be performed automatically by the home inventory management and entity taxonomy system 240 and presented to the subscriber at the app 1102-1.

It may also be appreciated that when other stakeholders interact with the platform via their respective apps 1102, the home inventory management and entity taxonomy system 240 may provide tailored lists of items to select with associated labels. In this way, all components of the platform 10 and all stakeholders may have a common and standardized way of identifying problems and issues in the service claim requests, identifying solutions/repairs in jobs associated with the service claim requests, and for performing various actions using the labels. These actions may include determining whether the claims are covered, how much to charge for the job, whether an estimated cost for a job entered by a servicer is appropriate, and whether to pay an invoice submitted by a servicer assigned to the job that has completed performance of the job, in examples.

The home inventory management and entity taxonomy system 240 may also analyze inspection report 129 created for each property, and in conjunction with the smart scheduler service 224, schedule warranty or repair services at each property based upon the analysis of the inspection report data 129. The system 240 may automatically prepare and send a service request to the claim management system 1100 to create a claim for a warranty or repair service based on the analysis of the inspection report(s) 129.

The claim adjudication system 260 may generally operate as follows. The memory 264 may store non-transitory computer instructions for execution by the controller 262, and the controller may be configured to execute the non-transitory computer executable instructions to cause the claim adjudication system to perform a series of tasks. The controller 262 may listen for and receive a service request sent by a subscriber of the platform for a property of the subscriber, where the service request may relate to at least one of a warranty service or a repair service. The controller 262 may then match the service against coverage information of a home services policy for the subscriber.

Upon finding a match, the claim adjudication system 260 may conclude that the claim is covered, resulting in a covered services claim. The controller 262 may then access a job that the platform 10 associates with the covered services claim and may assign to a servicer. The job may include one or more problems or issues identified by the servicer at the property, a course of action to address the one or more problems, and an estimated cost. Then, the controller 262 may determine whether the estimated cost meets predefined cost criteria, and based upon the determination, may either accept the cost estimate to approve the job or mark the job for manual approval.

In one example, the cost criteria may be a range of costs allowed for all jobs assigned to a particular servicer. In another example, the cost criteria may be a range of costs allowed for a specific job type for all servicers. In still another example, the cost criteria may be a range of costs allowed for a specific job type matching a job type of the approved job for the servicer. In example embodiments, the job type may be defined by an associated repair taxonomy label.

In yet other examples, the cost criteria may include a range of costs derived from previously approved jobs of a same type as the job associated with the covered services claim, and may include a minimum trust score calculated for the servicer.

In one example, in general, the claim adjudication system may adjust the cost estimate based upon a trust score calculated for the servicer or a dispatch type of the job. In another example, when the set of cost criteria includes a range of costs allowed for a specific job for a particular server, the claim adjudication system may adjust the range of costs based upon a trust score calculated for the servicer or a dispatch type of the job.

The trust score of a servicer may indicate a level of trust that subscribers or operators of the platform 10 have placed in each subscriber over time. As the level of trust in a servicer increases, the more likely it is that the platform 10 may approve performance of jobs by that servicer. In addition, servicers with higher trust scores may be awarded more lucrative jobs and jobs of larger scope and duration.

The trust score may be calculated based upon any combination among a number of metrics or factors that may indicate the level of trust of a servicer, an exemplary list of which is included below:

a. Consistency of costs, e.g., whether, in a plot of the estimates provided by the servicer on a curve for the particular repair items taxonomy, the curve is wide (indicating high volatility) or narrow (indicating strong consistency), b. Whether the estimates are generally closer or farther away from their ACD (average cost per dispatch) or ACC (average cost per claim) targets either generally or for the repair items taxonomy (consistency of estimates may be used as a basis to adjust cost upwards, while the inverse provides a basis to adjust estimates downward), c. Quality scores, such as ones provided by the customer regarding the service provider, ones provided by the operator, ones provided by marketplace ratings, and the like, d. Time to provide the estimate after the diagnostic visit (either for that particular visit or for the servicer generally), e. Length of time in partnership (the longer may tend to indicate a better partner, all other things being equal), f. Whether a servicer has been previously determined to be a "preferred" servicer, g. Whether a servicer provides broad services for their job trade, as opposed to a servicer who does not perform certain types of jobs or does perform installations, h. Recall rate of a servicer (e.g., the ratio of jobs where a recall was required, the higher being a negative signal), i. Second opinion rate (the ratio of jobs where a second opinion is required, higher being a negative signal), j. Denial rates (e.g., whether the servicer is towards the middle of a bell-shaped curve for a particular part of the repair items taxonomy), k. Maintenance to repair ratio (e.g., was a repair required for an HVAC tune-up), e.g., whether the repair ratio is towards the middle of a bell shaped curve (which may be preferred to outliers) for a particular type of maintenance, l. Out of pocket costs, e.g., whether the average out of pocket expense for the customer for particular type of job (relating to the above-referenced repair items taxonomy) is towards the middle of the bell-shaped curve, m. Scheduling (e.g., how quickly does a servicer accept a job in a scheduling process? If the selection process is round robin, how frequently are the servicers accepting jobs? If a servicer is responsible for scheduling, how quickly do they schedule with the subscriber and how soon does the job occur after the scheduling process commences?), n. Job/Dispatch Acceptance Rates: a percentage of Jobs that a Service Provider Accepts, Declines or Times Out, o. Average Time to Appointment Acceptance: Average time from job/dispatch request to Acceptance (contingent on accepted jobs)

q. Average Time to Appointment Date: Average Time from Job/Dispatch Request to First Appointment Date r. Average Time to Estimate Submission: Average time from appointment window end to when the platform receives job estimate information for approval decision s. Average Time to Job Completion: Overall Start to Finish time from Dispatch Request to Job completion Status Finalized t. 5-star Rating: 5 star rating given by customer when job is completed u. Average Cost per Dispatch (ACD): Average Cost per job/dispatch using covered costs v. Average Cost per Claim (ACC): Average Cost per Claim, which includes multiple dispatches w. Recall percentage and Cost: % of Total jobs/dispatches that are designated as recalls as a percentage of total plus cost x. Warranty Paid Replacement percentage: a percentage of Replacement jobs/dispatches as a percentage of total paid by warranty y. Customer Paid Replacement percentage: a percentage of Replacement jobs/dispatches as a percentage of total paid by customer z. First Time Fix percentage: a percentage of jobs/dispatches that may be resolved during a first trip to the home or property aa. Average out of pocket (OOP) Cost and percentage: tracking of out-of-pocket costs per job by average and on a percentage basis. Used to mitigate risk of bad behaviors in this area bb. Platform Usage: a percentage of job/dispatches where Estimates are entered via native app, web portal, or phone call to platform cc. Auto Approval percentage: a percentage of jobs/dispatches that are auto-approved dd. Platform payment time: Average time from Job Completion Status to Payment Date by the platform ee. HVAC Maintenance to Repair Ratio: a percentage of HVAC tune-ups that result in a repair to the system ff. Transfer away percentage and Cost: a percentage of jobs that were needed to transfer the job to another servicer and the associated cost gg. Call for Status: a percentage of claims where the customer called for a status hh. Renewals: a percentage of customers that renewed having experienced that servicer ii. Emergency Incidence & Cost: a percentage of claims where the servicer took an emergency call and the average cost of such emergency work In one implementation, the platform 10 may select servicers or optimize distribution/delegation of jobs to servicers based upon their trust score, typically in an automated fashion. In another implementation, the platform 10 might define or set a trust score value (e.g., as a percentage) for a particular job, or possibly even define an absolute number of jobs for a particular servicer based the servicer's ability to meet or exceed a target trust score.

The claim management system can use different operational models for determining criteria used in its system, such as determining the trust scores of the servicers. These operational models include using machine learning, predefined rules/a rules based system, and possibly predefined or manually set thresholds. Regardless of the operational model used, the trust scores may differ based on the repair item taxonomy, meaning that the system may automatically approve a particular type of job for specific servicers.

In one implementation, the controller 262 may notify the platform 10 to pay the covered services claim using the estimated cost of the associated job when at least performance of the job is completed by the servicer. Typically, the servicer may remain at the property at a time when the controller notifies the platform to pay the covered services claim. The controller 262 may also notify the platform 10 to pay a servicer invoice included within the job or otherwise associated with the job. In example embodiments, the servicer invoice may be submitted by the servicer via the servicer app 1102-2/1102-3 executing on the servicer user device 1106-2/16-3 that may be in communication with the platform 10. Prior to determining whether the estimated cost meets the predefined cost criteria, or in place of the estimated cost provided by the servicer, the claim adjudication system 260 may pass the estimated cost for the job associated with the covered services claim as input to a trained machine learning model 42 within the AI system 40. In response to the input, the AI system 40 may produce a predicted cost value as output, and the claim adjudication system 260 may use the predicted cost as the estimated cost. For this purpose, in one example, the machine learning model may be previously trained using training data 26 that may include a previously approved jobs of a same type as the job.

It may also be appreciated that one or more ML models 42 may be trained with various information included within the training data 26. In examples, the training data 26 may include one or more of the following sets of information: sensor data 321, contents of maintenance files 340 and inspection reports 129 from multiple subscribers; information entered into jobs by servicers assigned to the jobs, for possibly all servicers and their jobs; and information within the service claim requests when the subscribers (or possibly when other stakeholders or components of the platform 10) initiate claims. These combinations of data sets included within the training data 26 for training one or more ML models 42 may be used to obtain an optimal automated adjudication rate combined with an optimal loss-to-premium ratio (or gross margin).

In one example, each service request may include a description of the at least one of the warranty service or the repair service to be performed at the property, one or more taxonomy of repair labels associated with the at least one of the warranty service or the repair service, and a system taxonomy label that may identify a system or aspect of the property that may be a subject of the at least one of the repair service or the warranty service.

Preferably, the coverage information of the home services policy may at least include a description of covered repairs and one or more taxonomy of repair labels associated with the covered repairs, one or more covered entities of the property, and one or more system taxonomy labels associated with the one or more covered entities.

Typically, the one or more problems identified by the servicer at the property may be associated with one or more taxonomy of repair labels and/or one or more system taxonomy labels, and the one or more taxonomy of repair labels and/or one or more system taxonomy labels are included within the job.

In one example, the matching service request may be obtained when a level of matching between one or more taxonomy of repair labels in the service request and one or more taxonomy of repair labels in the coverage information of the home services policy for the subscriber may meet a minimum matching score. In yet another example, the matching service request may be obtained when a level of matching between one or more system taxonomy labels in the service request and one or more system taxonomy labels in the coverage information of the home services policy for the subscriber may meet a minimum matching score.

Other considerations and actions may also impact operation of the claim adjudication system. An exemplary list of these other considerations is included below, each of which may be undertaken by automation, such as robotic process automation, a rule-based system, a machine learning system, or the like, using techniques described herein:

a. Checking if a symptoms taxonomy matches a diagnosis taxonomy;

b. Identifying a symptom, such as by requesting that the subscriber perform various diagnostic steps at the premises (e.g., turning on or off a system/entity/component, plug in or unplugging, adjusting a thermostat);

c. Checking if a diagnosis taxonomy matches a repair taxonomy;

d. Checking if a terms of coverage taxonomy matches a repair taxonomy (e.g., coverage to make modifications to the home for a replacement of a water heater), matches a type of component or subcomponent of the home (e.g., HVAC geothermal, HVAC SEER limitation, residential vs commercial, refrigerant type), matches a type of failure (e.g., wear & tear vs abuse), matches whether the component or subcomponent was working vs not working (e.g., known pre-existing issue for component or subcomponent) and the like;

e. Applying a lower threshold of adjudication review to different types of dispatches (e.g., recalls and second opinions may be automated, while others may be manually adjudicated);

f. Automated checking, e.g., for a claim, whether the component or subcomponent is under a manufacturer's warranty as indicated by serial number. If so, the claim may not be covered by the home warranty, but the claim adjudication system 260 may automatically manage the service experience and direct the claim back to the manufacturer;

g. Procurement automation after the approval has been provided, e.g., where the owner of the platform 10 may typically procure the replacement component or subcomponent of the home or other property, based on a dollar amount threshold obtained by its associated repair items taxonomy. This may include automated integration with a distributor and manufacturer of parts or equipment. This may include manually purchased parts or equipment. Integrations may communicate back the estimated time of arrival to the subscriber and/or servicer;

h. Checking that there is an appropriate matching of systems and compatible parts;

i. Checking that a procured part is compatible with the component or entity that is being repaired or serviced, with either real-time feedback to the technician or other servicer indicating that the selected part is incompatible, and/or only showing parts that would be compatible;

j. Where there is not a clear singular data source for systems and compatible parts, automatically compiling and aggregating data universally or specifically to the components of the subscribers;

k. Checking the age of the home services policy;

l. Checking the payment status of the home services policy;

m. Checking. whether the components indicated in the service requests and/or associated jobs pose a high risk; and/or n. Checking whether the servicers are business entities that employ one or more technicians that perform the jobs. In embodiments, cost estimates and trust scores may be adjusted based upon an individual technician level rather than a servicer level.

In general, the home protection plan may be a consumer product that financially covers the costs associated with repairing and replacing one or more entities of the subscriber's home or property. Depending on the contents of the home protection plan, this cost may be covered in whole, in part, or not at all. In examples, a repair may be partially covered because the customer has already reached coverage limits for either the specific repair or job, coverage limits for the entire home protection plan, or because a portion of the work is not covered under terms of coverage in the plan. For example, a repair to an entity such as a toilet that would ordinarily be covered in whole, may actually be covered only in part if the repair also requires structural modifications to the home that are not covered (e.g., replacement of rotting wood floorboards beneath the toilet).

In another example embodiment, a claim adjudication system 260 of the platform 10 is disclosed. In the claim adjudication system 260, a subscriber may enter information regarding a problem with one or more entities in their home. For this purpose, the subscriber may enter a description of the problem in the app 1102-1 running on their user device 1106-1. A repair of the problem may be covered in whole or in part by the subscriber's home protection plan, or not be covered at all. In response to the data entry by the subscriber, the app 1102-1 may create a service request that includes the information entered at the app 1106-1 and may send the request to the claim adjudication system 260.

When a repair service is requested by the subscriber, the system 260 may create a job object ("job") associated with the repair service. When the repair service is covered by the home protection plan for the property of the subscriber, the job associated with the repair service request may also be known as a "covered job." Servicers affect the repair requested by the subscriber by performing the job (or covered job) associated with the repair service request.

The claim adjudication system 260 may receive the request for repair service, and may automatically adjudicate the request. For this purpose, in one example, the system 260 may associate a job with the service request and designate an appropriate servicer to perform the job. Here, the system 260 may schedule an appointment for the servicer, or may even automatically dispatch the designated servicer to the home of the subscriber (especially if the repair is of a serious or dangerous nature, such as repairs to natural gas or propane plumbing and appliances). Such a capability may provide a first-time fix and minimize subsequent servicer visits to the home to affect the repair, also known as "truck rolls."

Additionally and/or alternatively, the claim adjudication system 260 may also pre-authorize or automatically enable the servicer to perform the repair service at the home, without the servicer requiring manual approval to perform the repair.

The claim adjudication system 260 of the home services platform 10 may include a controller 262 and a memory 264. The controller 264 may store non-transitory computer instructions in the memory 264 for execution by the controller 264. The controller may be configured to execute the non-transitory computer instructions to cause the claim adjudication system 260 to receive a service request for a property of a subscriber, where the service request may relate to at least one repair service possibly covered by a home protection plan for the property of the subscriber, and to receive a designation of a servicer to perform a job at the property of the subscriber, based upon one or more problems identified by the subscriber in the service request. The claim adjudication system 260 may also receive a job estimate object for the job from the servicer that includes the one or more problems identified by the subscriber and an estimated cost prepared by the servicer to address the one or more problems. The controller 262 may also determine whether to approve performance of the job in whole or in part by the servicer based upon coverage limits in the home protection plan for the job, and based upon the estimated cost being less than a threshold allowed cost for the job. The claim adjudication system may also determine whether to approve performance of the job in whole or in part by the servicer based upon coverage limits in the home protection plan for the job. In one example, the estimated cost may include detail(s) associated with parts, labor, and equipment.

Typically, the designation of a servicer may be provided by the platform 10. For this purpose, in one example, the platform 10 may designate a servicer by recommending a set of servicers and then selecting a servicer from the set based on various criteria.

In one example embodiment, the subscriber may initiate the service request. For this purpose, the subscriber may access the app 1102-1, may identify one or more problems at the subscriber's property, and may enter the one or more problems into the app 1102-1. The app 1102-1 then may create the service request from the one or more problems and send the service request to the claim adjudication system 260. The controller 262 may receive and processes the service request. As a result, the service request may be sent by an application ("app") accessed by the subscriber that executes on a user device, and the app may create the service request from the one or more problems identified at the property that the subscriber entered into the app.

Typically, the job estimate object at least includes a diagnosis of the one or more problems prepared by the servicer. In one example implementation, the claim adjudication system 260 may notify the servicer at the property of the subscriber as to the whether the job is either rejected or approved in whole or in part, and if the job is approved in whole or in part, the servicer may perform the job.

The servicer may perform the diagnosis of the job and prepare the estimated cost for performing the job. For this purpose, the servicer may typically access the servicer app 1102-2 running on their user device 1106-2. The servicer may also select one or more repair taxonomy labels and system taxonomy labels presented by the app when entering details of the diagnosis and the estimated cost into the servicer app 1102-2. Here, the repair taxonomy labels may identify the entities that are included in the job, while the repair taxonomy labels may include information describing the repair service associated with the job.

Once the servicer has completed entering the information associated with diagnosis and estimated cost for the job, the servicer app 1110-2 may create the job estimate object for the job. The job estimate object may include the information associated with diagnosis and estimated cost for the job, and anything else entered by the servicer. Additionally and/or alternatively, the job estimate object may be in the form of a template with pre-filled information. In one example embodiment, once the servicer selects the one or more taxonomy labels for entering details of the diagnosis and/or estimated cost, the servicer app 110-2 may create a new job estimate object with either blank or pre-filled information based upon the servicer selection of the labels. The servicer app 1110-2 may send and/or present the information of the job estimate object to the servicer. The servicer app may then send the completed job estimate object for the job to the controller 262 of the claim adjudication system 260.

The claim adjudication system 260 may receive the job estimate object for the job, and may then determine whether to automatically adjudicate the job/the repair service, based upon the job estimate object for the job. For this purpose, in one example implementation, the claim adjudication system 260 may include a set of rules and may compare the contents of the job estimate object to the rules. During the comparison, the claim adjudication system 260 may rely upon a set of estimate building blocks. These estimate building blocks may include one or more of the following:

a. home protection plan age: a newer policy may merit greater review vs. an older policy;

b. payment status of plan: an indication that the plan is in relatively good standing (e.g., are there any failed credit card transactions, invoices not paid, or an unpaid escrow payment from a closing process of a sale of the home?);

c. coverage within plan: does it cover the entities included in the job estimate object?;

d. property size: there may be different estimated cost thresholds for different size homes or homes within different square footage ranges;

e. pricing: does the cost associated with affecting the repair of the entities fit within the predefined cost ranges for that level of the taxonomy?

f. taxonomy limits: does the cost associated with affecting the repair of the entities exceed coverage limits for the entities or elements of the taxonomy?

g. high risk dispatch: For example, has the subscriber been deemed to be high risk either manually by a servicer or an agent of the system, in an automated way based on rules or machine learning? A high risk subscriber may be determined based upon factors such as a number of service requests, either within a recent time period or over the home service plan period, and/or a frequency, severity, or percentage of denied claims for the subscriber or the property;

h. dispatch type: examples may include a first dispatch, a recall, a second opinion, and/or secondary work i. servicer status: E.g., new, trial, preferred, authorized, emergency, do not use, on hold j. Servicer Auto Approval Limits k. one or more of the repair taxonomy labels and/or the system taxonomy labels at a given level of the taxonomy l. coverage status of the home protection plan, including: active, inactive, cancelled, pending, suspended, transferring, and/or waiting m. estimate questions, including: location of entity in the home (or location of subcomponent of a component entity); entity criteria where applicable, such as make/model, age, tonnage, SEER Rating, whether under manufacturer warranty, refrigerant type, number of cooling systems at the home, whether the air filters of HVAC system are clean, whether servicer is able to service this issue, whether servicer may affect repair within expected time frame for job (e.g., based on repair label taxonomy), whether the problem was caused by normal wear and tear, whether the failure occurred after the start date of the home protection plan, whether inventory and/or replacement parts must be ordered, cost of labor to date owed to servicer if servicer diagnoses the problem and is unable to proceed with the repair (e.g., due to scope of repair change, unanticipated complexity, need of more experienced servicers or servicers with higher licensing requirements, in examples), and whether there may be out of pocket costs associated with a request based on the home protection plan coverage.

In another example implementation, the claim adjudication system may determine a predicted cost of the job from one or more stored jobs of the same type. If a variance between the predicted cost and the estimated cost is below a threshold value, in one example, the claim adjudication system may approve the job in whole.

The controller 262 of the claim adjudication system 260 may also determine whether to approve performance of the job in whole or in part by the servicer based upon one or more of:

a. the estimated cost being less than a threshold allowed cost for the job;

b. a range of costs allowed for all jobs assigned to a particular servicer;

c. a range of costs allowed for a specific job type for all servicers; and d. a range of costs allowed for a specific job type matching a job type of the approved job for the servicer, in examples. The controller may also be configured to adjust the range of costs based upon a trust score calculated for the servicer.

In yet another example implementation, the claim adjudication system 260 may be configured to adjust the estimated cost based upon a dispatch type of the job. The controller 262 may also notify the platform 10 to pay the covered job in whole or in part by using the estimated cost of the associated job when at least performance of the job is completed by the servicer.

It may also be appreciated that when the controller 262 approves performance of the job in whole by the servicer, the controller 262 may also notify the platform 10 to pay a claim associated with the service request while the servicer remains at the property. Typically, the servicer may automatically generate the invoice if the work performed for a job is complete and matches the work in an estimate for the job.

In another example implementation, the controller 262 may notify the platform 10 to pay a servicer invoice associated with the job. For this purpose, in one example, the servicer invoice may be submitted by the servicer via the servicer apps 1102-2, 1102-3 executing on the servicer user devices 1106-2, 1106-3. The servicer apps 1102-2, 1102-3 may be in communication with the platform 10. In other examples, the controller 262 may determine whether to approve performance of the job in whole or in part by the servicer based upon either a range of costs derived from previously approved jobs of a same type as the job, or based upon a minimum trust score calculated for the servicer.

In another example implementation, the controller 262 may pass the estimated cost for the job as input to a trained machine learning model to obtain a predicted cost value as output. For this purpose, the controller 262 may use the predicted cost value as the estimated cost. Here, in one example embodiment, the trained machine learning model was previously trained using training data that includes previously approved jobs of a same type as the job. In another example, the input passed to the trained machine learning model may further include contents of an inspection report of the property for the job, where the trained machine learning model was previously trained using training data that may include inspection reports of properties for previously approved jobs of a same type as the job.

The service request may also include information in addition to the one or more problems identified at the property of the subscriber. In examples, this information may include one or more of: a description of the at least one repair service to be performed at the property; one or more taxonomy of repair labels associated with the at least one repair service; and/or a system taxonomy label that identifies a component or aspect of the property that is a subject of the at least one repair service.

The home protection plan of each subscriber may also include various information. This information may include: a description of covered repairs and one or more taxonomy of repair labels associated with the covered repairs; one or more covered entities of the property; and/or one or more system taxonomy labels associated with the one or more covered entities, in example embodiments.

It may also be appreciated that the one or more problems identified by the subscriber may be associated with at least one of one or more taxonomy of repair labels, or at least one of one or more system taxonomy labels. For this purpose, in one example embodiment, the at least one of the one or more taxonomy of repair labels or the at least one of the one or more system taxonomy labels may be included within the job estimate object.

Additional detail for the service request is a as follows. In one example, the service request may be verified by the system 260 when a level of matching between one or more taxonomy of repair labels in the service request and one or more taxonomy of repair labels in the home protection plan for the subscriber meets a minimum matching score. In another example, the service request may be verified by the system 260 when a level of matching between one or more system taxonomy labels in the service request and one or more system taxonomy labels in the home protection plan for the subscriber meets a minimum matching score.

In another example embodiment, a home services system 10 may include a claim management system 1100 and a claim adjudication system 260. In more detail, the claim management system 1100 may be configured to receive service requests from subscribers of the home services system 10, in association with properties of the subscribers. Here, each service request may relate to at least one repair service possibly covered by a home protection plan for the property of each subscriber. The claim adjudication system 260, in turn, may be configured to: receive the service requests sent from the claim management system 1100; assign servicers to perform jobs at the properties of the subscribers based upon one or more problems identified by the subscribers in the service requests; receive job estimate objects for the jobs from the servicers; and determine whether to approve performance of the jobs in whole or in part by the servicers, based upon coverage limits for each job in the home protection plan of each subscriber. In one example implementation, the job estimate objects may include the one or more problems identified by each subscriber and an estimated cost to address the one or more problems.

In another example embodiment, a computer implemented method or process for a claim adjudication system 260 in a home services platform 10 is disclosed. The method or process may receive a service request for a property of a subscriber, the service request relating to at least one repair service possibly covered by a home protection plan for the property of the subscriber. The method may also receive a designation of a servicer to perform a job at the property of the subscriber, based upon one or more problems identified by the subscriber in the service request. The method may also receive a job estimate object for the job from the servicer that includes the one or more problems identified by the subscriber, and an estimated cost prepared by the servicer to address the one or more problems. The method may additionally determine whether to approve performance of the job in whole or in part by the servicer based upon coverage limits in the home protection plan for the job.

While the claim adjudication system 260 may provide automated adjudication, the claim adjudication system 260 may support and interface with manually adjudicated claims. For this purpose, in one example, a list of previously manually adjudicated claims may be passed as input to a machine learning model to determine if an automated model may be predictive. Other inputs to the machine learning model may include information regarding the entity under repair or maintenance (e.g., type, make, model, age), symptom, diagnosis, course of action, estimate, final invoice, servicer comments, servicer submitted photos, and/or information on the servicer such as the information within the servicer profile of the servicer.

The claim adjudication system 260 may also determine the variance of manually adjudicated claims because such variance may be financially sufficient to run those claims on an automated basis.

It may also be appreciated that the claim management system 260 may manually designate a servicer as being "preferred" or "not preferred," and the system 260 may also manually set the trust score. A preferred servicer or a servicer with a sufficiently high trust score may qualify the servicer for automated adjudication.

In another example implementation, the claim adjudication system 260 may automatically adjudicate claims based on one or more of the following criteria in the disclosure. In examples, the system 260 may simply approve every claim below a specific dollar amount, approve every claim based on its job type or taxonomy label (e.g., regardless of the servicer designated for the job), and/or possibly approve every job for a particular servicer (e.g., regardless of the job or taxonomy label). In another example implementation, the claim adjudication system 260 may automatically approve performance of a job for a pre-determined amount of cost to be paid by the platform 10 and the balance paid by the subscriber. For this purpose, in one example, the pre-determined amount of cost that the platform 10 pays for performance of a job may be job-specific.

In yet another example implementation, the claim adjudication system 260 may approve a job and instruct the platform 10 to pay for the replacement cost of a part (and the associated labor) when the part is no longer manufactured or available.

In still another example implementation, the claim adjudication system 260 may approve a fixed payment to servicers after job performance. In one example, this fixed payment may be paid hourly and the rate may be either tailored to the type of job or may be the same for all jobs. In another example, the fixed payment may be a flat fee regardless of the time spent performing the job. In these examples, the payment information may be included within the taxonomy/at a level of the taxonomy for the specific repair taxonomy label and/or system taxonomy label.

Yet other example implementations may also be possible that correspond with different business models. In one example embodiment, subscribers may contract directly with servicers and the servicers may perform the jobs. The servicers may then submit invoices and send the job estimate objects for the jobs via the servicer app 1102-2 to the platform 10. In this example, the platform 10 may typically pay a portion of the invoice based on predefined cost limits for each type of work included in the home protection plan, and the subscriber may pay the balance. In another example, the subscribers may also contract with the servicers, but may not be subjected to the predefined limits based on the type of work performed. Here, if a more costly replacement of a system is required, in one example, the subscriber may select a "rent-to-own" form of payment. This structure may be designed to eliminate or minimize servicer incentive to upsell unnecessary replacements. Such a structure may be suited to rural areas where there is insufficient density of servicers and/or jobs to build a trusted service network.

In yet another implementation, the claim adjudication system 260 may consider maintenance history of the subscriber's home and property during the process of determining whether to adjudicate the service request. In one example, a service request to repair the subscriber's HVAC system may be flagged for manual review and not automatically adjudicated, if a recent full-system maintenance were performed on the HVAC system. In another example embodiment, the claim adjudication system 260 may be more likely to automatically adjudicate a new service request (or at least review the request with less scrutiny) for an existing subscriber with a good maintenance track record. Examples of a good maintenance track record may include a history of frequent preventative requests for one or more systems, or otherwise subscribe to maintenance packages including scheduled filter replacement maintenance packages for HVAC systems, in examples.

There are different phases of automated adjudication sophistication that may include:

a. Servicer level threshold (e.g., manually set by agents of the platform);

b. Servicer & repair items taxonomy thresholds (e.g., manually set by agents of the platform);

c. Servicer, repair items taxonomy, estimate questions thresholds (e.g., manually set by agents of the platform); and d. Servicer, repair items taxonomy, estimate questions thresholds (e.g., automatically set by the platform).

There may also be factors such as pricing or procurement that may discourage automated adjudication to not automatically adjudicate repair service requests. With regards to price, it may be appreciated that an AI/ML system may optimize for cost sensitivity (e.g., testing servicers to see how much they would reduce the price to get an automated approval), approve requests priced favorably and reject those not priced favorably in an effort to encourage behavior based on competitive marketplace pressures, and possibly automatically increase thresholds for servicers that had more favorable price-related metrics (e.g., higher volume, good integrity/trust level metrics, good pricing, etc.).

With regards to procurement, an AI/ML system may automatically determine (and initiate) procurement to be performed by operators of the platform or the servicer, based on the repair items taxonomy, parts/equipment, and whether such part/equipment is specialty or not.

FIG. 9B shows substantially the same components as in FIG. 9A according to example embodiments. However, the figure shows additional modules 99-2 that may not be shown in FIG. 9A according to example embodiments. The modules 99-2 may include a contracts management system 1162, a breakdown prediction analytics system 1210, a diagnostics system 192, and a channel partner management system 172.

The contracts management system 1162 may include a property status service 164. The breakdown prediction analytics system 1210 may include a breakdown correlation service 212 and a breakdown AI service 214. The diagnostics system 192 may include a diagnosis service 194 and a data collection service 196. The channel partner management system 172 may include an accounts receivable service 174, an accounts payable service 176, a cross-subscriber service 177, and a correlation service 178.

More detail for the modules 99-2 and their operation is in the disclosure as follows. The contracts management system 1162 may include a set of services that may create home maintenance contracts including terms of service. The terms of service are typically initially based upon factors including property square footage, age of the property, location of the property and level of coverage selected by the subscribers. The set of services may adjust the terms of service in response to additional input concerning the property provided by one or more other services of the platform 10.

For this purpose, in one example, the property status service 164 may collect data concerning status of each property from one or more data sources and may send the data to contracts management system 1162 for purposes of adjusting the terms of service of the home maintenance contracts. In example embodiments, the additional input concerning the property/the one or more data sources may include: contents of inspection reports 129 for each property that may include a list of each entity at a property, and a state of repair and a maintenance record included in a maintenance file 340 at or associated with each premises.

The breakdown prediction analytics system 1210 may include a set of services that obtain and analyze information associated with components, subcomponents, and other aspects of properties of subscribers. These components, subcomponents, and other aspects may be covered entities or not covered entities.

The breakdown prediction analytics system 1210 may use the analyzed information to predict and prevent breakdowns of the components, subcomponents, and other aspects of properties of the subscribers. The information obtained by the breakdown prediction analytics system 1210 may include a make, model, and age of each component/subcomponent/other aspect.

The breakdown correlation service 212, in one example, may correlate maintenance or repair services performed on components at properties with breakdown frequency of the components. The results of the correlation may be used to predict a time of breakdowns, identify types of the breakdowns, and estimate a cost to repair or to replace the components.

The breakdown AI service 214 may train one or more machine learning models with training data 26. In example embodiments, the training data 26 may include breakdown data of components at properties obtained from subscribers. The breakdown AI service 214 may apply information concerning a specific component at a property as input to the trained machine learning model and obtain a predicted breakdown for the specific component as output of the trained machine learning model.

The diagnostics system 192 may include a diagnosis service 194 and a data collection service 196. The data collection service 196 may collect diagnostics data from the components at premises, and the diagnosis service 194 may diagnose problems and issues at the premises based upon the collected data. Additionally, the diagnosis service 194 may pass a reference to the collected diagnostics data to the prediction engine 252. The prediction engine 252 may then predict breakdowns of the components based upon the diagnostics data and may proactively schedule warranty and repair services at the properties, via the scheduler service 224, based upon the diagnostics data.

The diagnosis data may include image files of the components/subcomponents and other aspects of the premises, captured by servicers or subscribers; audio files of mechanical and electrical components captured during their operation; and sensor data 321 including fault codes, a runtime value, an efficiency value, and a filter replacement date sent from sensors attached to the components, in examples.

Additionally or alternatively, the diagnosis service 194 may diagnose problems and may issue at the premises based upon contents of the inspection report 129 at or otherwise obtained from the premises. For this purpose, the diagnosis service 194 may suggest a course of action to be performed by a servicer to address each problem, based upon the diagnosis, and may match the course of action to be performed to a dollar amount that the servicer may be authorized to spend to address the problem.

The channel partner management system 172 may typically interface primarily with the subscribers. The channel partners may provide services such as advertising and sales promotions, gamification, establishing and maintaining accounts of subscribers and billing, in examples.

The accounts receivable servicer 174 may bill the subscribers in response to receiving invoices prepared by the servicers. The servicers may prepare and include the invoices within the job, upon completion of the job. The cloud computing system 170 may extract the invoices from the jobs and may forward the invoices to the channel partners. The accounts payable service 176 may pay the invoices in the jobs.

The cross-subscriber service 177 may obtain information for one or more other subscribers when the channel partners are viewing and managing information for a specific subscriber. While access to many details of the subscribers are restricted, the channel partners may access some data across multiple subscribers for purposes such as marketing research, customer retention, and trials of new services, in examples. The correlation service 178 may be used to compare information across multiple subscribers and to identify trends, in examples.

FIG. 9C shows substantially the same components as in FIGS. 9A and 9B according to example embodiments. However, the figure shows additional modules 99-3 that may not be shown in FIGS. 9A and 9B according to example embodiments. The additional modules 99-3 may include a home repair dispatch analytics system 50, a servicer analytics system 80, and a pricing system 90.

The home repair dispatch analytics system 50 may include a dispatch performance engine 52. The servicer analytics system 80 may include a servicer performance engine 82, a servicer correlation engine 84, a servicer dispatch engine 86, and a servicer ranking engine 88. The pricing system 90 may include a pricing engine 92, a pricing correlation engine 94, and a pricing ranking engine 96.

More detail for the modules 99-3 and their operation is in the disclosure as follows. At the home repair dispatch analytics system 50, the dispatch performance engine 52 may update service information within the jobs assigned to the servicers and possibly the servicer profiles 1138. In one example, the dispatch performance engine 52 may update a variable payment rate value within a job, in response to analysis of job performance of the servicer by the dispatch performance engine 52. The term 'variable payment rate' is to refer to the ability that an underlying, established payment value may be dynamic, as it may be updated based on various factors. Therefore, the functionality is built into the term 'variable payment rate.' Use of the term 'payment value' in lieu of 'variable payment rate' is for the purpose of allowing the 'variable payment rate' to be discussed in terms of the factors used to update it, without introducing any redundancy.

At the servicer analytics system 80, the servicer performance engine 82 may update service information within the jobs assigned to the servicers and possibly the servicer profiles 1138. In one example, the engine 82 may update a variable payment rate value within a job, in response to analysis of job performance of the servicer by the analytics system 80.

The analysis performed by the servicer analytics system 80 is based upon service provider performance metrics in one or more jobs assigned to same servicer. These service performance metrics may include: cost metrics including a dispatch cost and a claim cost; quality metrics including a customer ranking created from one or more customer surveys, a job acceptance rate, a service fee collection rate, and a task-specific service repair rate; and integrity metrics including a maintenance to repair ratio, and an out of pocket expenses value charged to the subscriber.

One example of a task-specific service repair rate is as follows: "25% of HVAC system tune-ups typically are completed in a single service visit". Rates that exceed this are suspect and may be factored into an overall score for each service provider. The dispatch cost, in contrast, is typically associated with a task-specific number of service visits, or "truck rolls" required by a servicer to effect/complete a repair identified in each job.

It may be appreciated that because the jobs (and the information within them) are time-stamped, the service performance metrics may also be correlated and analyzed over time. Such analysis may be used to determine or predict trends in servicer behavior and performance, in examples.

The servicer dispatch engine 86 may be utilized in conjunction with the broker service 226 to match service providers to jobs. In example embodiments, the servicer analytics system 80 may analyze various information regarding servicers, and the servicer dispatch engine 86 may send the results of the analysis to the broker service 226. Using the results of the analysis, the broker service 226 matches the servicers to jobs. The information regarding the servicers may include: logistics information including availability of the servicer and proximity of the servicer to the premises at which each job is to be performed; certification/licensing data of each service provider stored in the servicer profile 1138 for each servicer that may pre-qualify or reject the servicers; a ranking score (e.g. trust score) stored in each job performed by each servicer; and cost information including a variable payment rate stored in each job.

Using the servicer correlation engine 84, the servicer analytics system 80 may also compare performance metrics for a particular servicer across one or more other servicers. Based on the comparison, the servicer ranking engine 88 may calculate or update the ranking score/trust score for a servicer. The servicer correlation engine 84 may then track information for each servicer over time (such as the trust score) and may compare how the trust score for a given servicer over a time period has changed versus trust scores of other servicers.

Additionally or alternatively, the servicer correlation engine 84 may also use factors to compute and monitor trust scores such as type of servicer (company with multiple technician employees or sole proprietor/contractor technician), complexity of job, age of the components serviced, presence or lack of service history, age and condition of the premises, type of component, make/model of component and whether the component is commonly sold and whether replacement parts are readily available; and cost to replace the component, in examples.

The broker service 226 may match the servicers to the jobs by comparing the information of the servicer profile objects for the servicers to the information of the claim objects for the requested services, calculates a matching score based on the comparison, and selects servicers with matching scores above a threshold level as the matching servicers.

The broker service 226 may also filter the matching servicers based upon quality metrics within each of the servicer profile objects for the servicers.

In one implementation, the broker service may bind at least some of the matching servicers to the jobs by: sending solicitation messages to the matching servicers to perform the service claim requests; identifying servicers that respond affirmatively to the solicitation messages; instructing the servicer management system to create servicer work objects derived from the servicer profile objects of the identified servicers; and linking the servicer work objects to the claim objects for the requested claims. In examples, the scheduled times may be same-day times in relation to performance of the at least one of the warranty service or the repair service.

The prediction engine 252 may also predict date ranges of failures of covered entities at the properties of the subscribers based upon data associated with the covered entities collected and stored by the platform for each of the properties as follows. The prediction engine 252 may send information including the predicted date ranges of failures of the covered entities at the properties in messages to the claim management system. The claim management system 1100 may be configured to create internal claim objects for internal claims in response to the messages received from the prediction engine. The broker service 226 may match the servicers to the internal claims, and the broker service may bind at least some of the matching servicers to the internal claims. The scheduling system/smart scheduler service 224 may then schedules times for the bound servicers to perform at least one of the warranty service or the repair service identified in the claim objects for the internal claims.

The pricing system 90 may calculate pricing for the jobs associated with the service claim requests. For this purpose, the pricing correlation engine 94 may analyze one or more of the following factors: physical characteristics of the property, including square footage; a level of coverage selected by the subscriber; jobs previously performed by each subscriber; contents of the inspection report 129 and/or maintenance file 340, in examples. In response to the analysis, the pricing system 90 may calculate an estimated cost for each job.

Additionally or alternatively, the pricing correlation engine 84 may also compare the estimated cost that it calculated for a job, to jobs that were previously adjudicated by the claim adjudication system 260. The jobs may be typically related, meaning that the jobs are of a same type/typically are associated with many of the same (or identical) repair taxonomy labels and system/entity taxonomy labels. Based on the comparison, the pricing system 90 may upwardly or downwardly adjust the estimated cost. Also based on the comparison provided by the pricing correlation engine 84, the pricing ranking engine 96 may calculate or update the ranking score/trust score for a servicer.

In another example embodiment, a home services platform 10 may include a service request system, a broker service 226, and a scheduler service. The service request system may create service requests for repair services requested by subscribers of the platform, where each service request relates to at least one repair service to be performed at a property of each subscriber and may be possibly covered in a home protection plan for each subscriber. The broker service may designate servicers registered with the platform to perform jobs at the properties of the subscribers associated with the service requests by matching the servicer profile objects of the servicers to the service requests, where the servicer profile objects may include information identifying the servicers and may include at least one repair service that the servicers provide, and binding at least some of the matching servicers to the jobs. The scheduler service may schedule same-day times for the bound services to perform the jobs. The platform may also include a servicer management system that creates the servicer profile objects for the servicers registered with the platform.

There are several different ways to provide a same-day service. Examples may include: allowing the subscriber to pay a premium for faster service (e.g., "surge pricing"); allowing the subscriber to select a same day service appointment with preferred times, and/or servicers may decide whether they want to accept these times with no additional fee; and then allowing the subscriber to select a same day appointment that was shown to be available on the subscriber app 1102-1 via integration with a field service management system.

A sophisticated scheduling system may also keep an inventory of pre-reserved appointments and execute the appointments as needed. These appointments may have been pre-purchased. Pre-purchased appointments may be fully reserved (e.g., meaning the servicer cannot book another appointment at that time under any circumstances) or reserved up until a certain time deadline before the appointment (e.g., so that they may book another appointment as needed). These different reserve types may have different costs associated with each.

In one example implementation, during the matching of the servicer profile objects of the servicers to the service requests, the broker service may calculate a matching score, and may select servicers with matching scores above a threshold level as the matching servicers.

In one example implementation, the broker service 226 may filter the matching servicers based upon quality metrics within each of the servicer profile objects for the servicers. In another example implementation, the broker service may bind at least some of the matching servicers to the jobs by one or more of the following: sending solicitation messages to the matching servicers to perform the jobs; identifying servicers that respond affirmatively to the solicitation messages; instructing the servicer management system to create servicer work objects derived from the servicer profile objects of the identified servicers; and/or linking the servicer work objects to the jobs.

Additionally, the platform 10 may include a prediction engine. The prediction engine may be configured to predict date ranges of failures of covered entities at the properties of the subscribers, based upon data associated with the covered entities collected and stored by the platform for each of the properties. For this purpose, the prediction engine typically may send information including the predicted date ranges of failures of the covered entities at the properties in messages to a claim management system. In more detail, the claim management system may be configured to create internal claim objects for internal claims in response to the messages received from the prediction engine. The broker service may match the servicers to the internal claims, and the broker service may bind at least some of the matching servicers to the internal claims. The scheduling system may schedule times for the bound servicers to perform at least one repair service identified in the claim objects for the internal claims. In one example implementation, the data may be sensor data sent from one or more covered entities at the properties.

In another example embodiment, the broker service may filter the matching servicers based upon a trust score including a level of trust metrics.

In one example implementation, the broker service may be configured to optimize job distribution against the level of trust metrics automatically. In another example implementation, the broker service may be configured to provide an interface for a user to set percentages or an absolute number of jobs based on an optimization against the level of trust metrics.

In another example embodiment, a computer-implemented method or process for providing home services is disclosed. The method may create service requests for repair services requested by subscribers of a platform, where each service request relates to at least one repair service to be performed at a property of each subscriber and is possibly covered in a home protection plan for each subscriber. The method may additionally designate servicers to perform jobs at the properties of the subscribers associated with the service requests by matching servicer profile objects of the servicers registered with the platform to the service requests. The servicer profile objects may include information identifying the servicers and may include at least one repair service that the servicers provide. The method additionally may bind at least some of the matching servicers to the jobs.

The method may also additionally create the servicer profile objects for the servicers registered with the platform. In another example embodiment, a predictive service apparatus is disclosed. Here, the predictive service apparatus may be able to determine a state of operation or level of performance of one or more entities in the home, such as an HVAC system. The apparatus may predict when the entities may fail, and proactively schedule repair services in advance of the predicted failure. For this purpose, in one example, the apparatus may analyze sensor data sent from the entities.

Using the example of an HVAC system, the apparatus may analyze sensor data from the HVAC system, such as a difference in temperature between the supply and return of air of the HVAC system to determine whether service may be required. If the difference is above a threshold value, the apparatus may create a repair service request for subsequent scheduling, schedule the repair service directly, or possibly even dispatch a servicer to the home and/or request that a servicer contact the homeowner concerning the need of a repair. In this way, the apparatus may determine whether HVAC system performance has degraded to a point where a repair is needed, even though the consumer may not yet be aware that degradation has occurred. In a similar vein, based upon the sensor data or other data from or otherwise associated with the HVAC system, the apparatus may either predict when further degradation will occur, or predict when consequential damage may occur, such as when a breakdown in one component of the HVAC system may cause damage to another component of the HVAC system. Other sensor data from the HVAC system may include a return air temperature, a supply air temperature, voltage/current control lines, a liquid line temperature, and/or suction line temperature, in examples.

The predictive service apparatus may include a service request system and a prediction engine. The service request system may create service requests for repair services, where each service request may relate to at least one repair service to be performed at a property of a subscriber and may be possibly covered in a home protection plan for the subscriber. The prediction engine may predict failures of entities at the properties of each subscriber, based upon data associated with the entities that the apparatus collects and stores for each of the properties. Here, the entities may be possibly covered in the home protection plan of each subscriber. The prediction engine may preferably send information including the predicted failures of the entities at the properties in messages to the service request system, and the service request system may create the service requests for repair services to be performed at the properties of the subscribers based upon the information in the messages sent from the prediction engine.

A goal of predictive service technology is to optimize the dispatching of servicers to jobs such that dispatches may be sent only when repair service is required such that unnecessary dispatches may be minimized, and ideally before a subscriber notices a failure with an entity. Unnecessary dispatching of servicers to jobs may increase claims expenses and may defeat the purpose of predictively dispatching servicers. To optimize the dispatches, in one example, the apparatus may correlate the sensor data from multiple homes of subscribers with a history of service requests from the subscribers.

In one example implementation, the data associated with the entities at each property of each subscriber may be sensor data sent from one or more entities at the properties. In another example implementation, the prediction engine may analyze the sensor data to determine whether the entities may be in need of repair or servicing, where the prediction engine may include the determination of whether the entities may be in need of repair or servicing in the information that the prediction engine sends in the messages to the service request system.

In yet another example implementation, the prediction engine may analyze the sensor data to predict when future faults of the entities may occur. For this purpose, the prediction engine may include the prediction of whether future faults of the entities may occur in the information that the prediction engine sends in the messages to the service request system. In another example implementation, the prediction engine may analyze the sensor data to predict a type of repair needed for the entities and to predict a cost of repair for the entities, where the prediction engine may include the predicted type of repair of the entities and the predicted cost of repair of the entities in the information that the prediction engine sends in the messages to the service request system.

In yet another example implementation, the prediction engine may execute a lookup of the data associated with the entities against an action table, where the action table may map the data associated with the entities to a recommended time frame for scheduling repair or replacement of the entities. For this purpose, the prediction engine may include the data associated with the entities and the recommended time frame for scheduling repair or replacement of the entities in the information that the prediction engine sends in the messages to the service request system. The service request system may extract the recommended time frame for scheduling repair or replacement of the entities from the information in the messages, and may notify a smart scheduler service to schedule the service requests using the extracted recommended time frame for scheduling repair or replacement of the entities.

In still another example implementation, the prediction engine may analyze the data associated with the entities at the properties. Upon determining that one or more of the entities are network-connected entities, the prediction engine may send messages that include automatic actions for the network-connected entities to execute in response to receiving the messages.

In one example, the data associated with the entities at the properties of the subscribers may be diagnostics data sent from one or more entities at the properties. In another example, the data associated with the entities at the properties of the subscribers may be collected by the apparatus from an inspection report for the property of each subscriber. In still another example embodiment, the data associated with the entities at the properties of the subscribers may be provided to the apparatus by servicers that have previously performed repair services at the properties of the subscribers.

In another example embodiment, a computer-implemented method or process for providing predictive service is disclosed. The method may create service requests for repair services, where each service request may relate to at least one repair service to be performed at a property of a subscriber and may be possibly covered in a home protection plan for the subscriber. The method may also predict failures of entities at the properties of each subscriber, based upon data associated with the entities that may be collected and stored for each of the properties, where the entities may be possibly covered in the home protection plan of each subscriber. The method additionally may send information including the predicted failures of the entities at the properties in messages to a service request system, and the service request system may create the service requests for repair services to be performed at the properties of the subscribers based upon the information in the messages.

Another capability of the pricing system 90 is "price to risk." Price to risk refers to the ability of the pricing system 90 to calculate the price of a warranty, subscription, or premium that an individual may pay to be a subscriber of the platform 10 or for a specific repair service.

The pricing system 90 may also include a memory. The memory may store non-transitory computer instructions for execution by the pricing engine 92. The pricing engine 92 may be configured to execute the non-transitory computer executable instructions to cause the pricing engine to calculate the price of the premium based upon one or more risk factors. In more detail, the premium may be associated with a requested repair service to be performed at a property of the subscriber, and the pricing engine 92 may include the price and the risk factors in an object created and stored by the platform 10 for the requested repair.

The risk factors may include physical attributes of the property, a coverage level selected by the subscriber, and state of repair information for covered entities at the property, and subscriber information associated with claim-related activities. The physical attributes, the state of repair information, and the subscriber information may be collected and maintained by one or more components of the platform 10 that are in communication with the pricing system 90.

The pricing engine 92 may include various parameters, including the calculated price and the risk factors in a set of items covered by the home services policy for each subscriber, servicer pricing in the area, the cost of components, pricing of offerings by third party competitors, and others.

In example embodiments, the cost of each covered repair may be paid by the owner/operator of the platform 10, while the subscriber typically may pay a per-incident deductible (e.g., co-pay or service fee) in addition to the policy period of the premium.

The subscriber information may be demographic or behavioral in nature. The demographic information may include an age and gender, ethnicity, number of children and their ages, whether the children reside at the premises, a highest education level, length of residence, average yearly income, and marital status, in examples. The behavioral information may include information indicating whether the subscribers regularly maintain the components or other covered entities at the premises (or wait until the components are near failure or fail, when indications of failure were known and presented to the subscribers); how many service claim requests the subscriber submitted over the policy period; timeliness of payment of the premium, and payment of the deductibles for jobs associated with the claims that servicers performed, in examples.

The one or more physical attributes of the property may include at least one of an age of the property, a condition of the property, a location of the property, and a square footage of the property. The risk factors may include at least state of operation information of covered entities at the platform.

In another example, the subscriber information may include at least a number of repairs requested by the subscriber and a timeliness of payment information by the subscriber for each of the requested repairs, over a period of time that starts at a time of subscription.

The state of operation information may be included within sensor data 321 sent from one or more sensors 320 at the premises of the subscribers.

The coverage level selected by the subscriber may have different types. Example types may include "seller plan", "buyer plan", or "existing homeowner plan", each of which may come with different associated risks.

The pricing correlation engine 94 may compare the calculated price of the premium against that of one or more related premiums, and the pricing engine 92 may be configured to adjust the calculated price in response to the comparison. Additionally or alternatively, the pricing system 90 may pass the calculated price for a premium as input to a trained ML model 42 of the AI system 40. In example embodiments, the ML model 42 may be previously trained using training data 26 that incorporates historical repair information collected by the platform 10 for other subscribers, including amounts requested, amounts paid, deductible information, and the like. In response to passing the calculated price for the new premium to the trained ML model, the output of the model may be a predicted price of the premium.

The predicted price may anticipate the repair expenses that the subscriber may typically incur over a policy period (e.g., year). Based on the predicted price (and in light of the calculated price), and in conjunction with either a target gross margin or a loss-to-premium ratio, the pricing system 90 may calculate an estimated premium for the subscriber in response.

The pricing correlation engine 94 may compare the price of the premium calculated by the pricing engine 92 for the requested repair against one or more prices of one or more stored objects for repairs previously adjudicated by the platform 10 that are related to the requested repair. The pricing engine 92 may be configured to adjust the price for the requested repair in response to the comparison.

The pricing correlation engine 94 may also compare the price of the premium calculated by the pricing engine 92 for the requested repair against one or more prices of related repairs stored in a third party database. The pricing engine 92 may be configured to adjust the price of the premium for the requested repair in response to the comparison.

The pricing ranking engine 96 may also identify one or more stored objects for repairs previously adjudicated by the platform 10 that are related to the requested repair. In one example, the identification may be based upon a ranking score that the ranking engine 96 calculates for each of the one or more stored objects.

The pricing system 90 may also pass the calculated price of the premium for the requested repair, in conjunction with at least a portion of the risk factors upon which the pricing engine calculated the price, as input to a trained machine learning model to obtain a predicted price as output. The pricing engine 92 may be configured to adjust the calculated price based upon the predicted price. Typically, the machine learning model may be previously trained using training data 26 that may include a plurality of stored objects for repairs previously adjudicated by the platform. In example embodiments, the stored objects may each include at least one of a price and the same risk factors, in one example.

The price that a subscriber has to pay for a home protection plan may depend upon a number of factors. These factors may include a size of the home (e.g., square footage), age of the home and entities within the home, and/or a state of repair of the home and its entities, in examples. Because these factors may affect the price (or premium) that the subscriber pays, these factors may also be known as risk factors.

In another example embodiment, an intelligent pricing system in a home protection and service automation platform is disclosed. The pricing system may include a pricing engine and a memory that stores non-transitory computer instructions for execution by the pricing engine. The pricing engine may be configured to execute the non-transitory computer executable instructions to cause the pricing engine to calculate a price for a premium that an individual may pay to be a subscriber of the platform, based upon one or more risk factors of a property. For this purpose, the premium may be associated with a subscription that relates to at least one repair service possibly covered in a home protection plan for the property.

In examples, the risk factors may include at least one of: a physical attribute of the property; a coverage level selected by the subscriber; state of repair information for covered entities at the property; or subscriber information associated with repair-related activities. In example embodiments, the physical attributes may include attributes of an entity or component of the home (e.g., roof), system (e.g., refrigerator, HVAC system, water heater), or component of a system (e.g., HVAC compressor), and possibly make and model and type of each (e.g., geothermal HVAC system).

It can also be appreciated that there are many other risk factors that impact the price of the premium calculated by the pricing engine, including:

a. size of home/square footage;

b. type of homeowner (i.e., new home buyer or pre-existing homeowner)

c. age of home d. history of claims entered by subscriber, and possibly even how the subscriber may have initiated a request for repair service, such as by telephone or via the subscriber app 1102-1 (e.g., phone calls to operators may be expensive and thus increases risk; use of the subscriber app 1102-1 to enter repair service requests may be much less expensive and thus may not typically add risk)

e. history of entities and/or components replaced and/or maintained in the home or property (here, the risk decreases with an increasing number of systems and components in the home being replaced, and/or decreases with increasing maintenance and upkeep of these components and entities)

f. make & model of entities and components (some are known to have more problems or be more expensive to repair or replace than others)

g. age of systems and components, and subcomponents of each h. information of home and its entities obtained from inspection reports i. information provided by servicers at the property for entities at the home or property (whether for system/component in the job to be performed, or systems/components not being worked on by servicer)

j. behavioral information of the homeowners, provided by servicers at the property (servicers may report on suspect behaviors of the home owners such as unlawful burning of yard waste, an unusual number or type of animals living in the home or on the property, in examples)

k. behavioral information of the homeowners, inferred by or learned through telephone conversations with the homeowners and service agents of the platform 10, and via sentiment analysis tools applied to phone and email conversations with the homeowners, in examples (angry or frustrated homeowners represent a higher risk)

l. a score indicating how difficult a customer may be to work with (the customers themselves may be a risk)

m. public and semi-public information available for customer (e.g., credit history, whether subscriber escalated a credit dispute, employment status, court proceedings including bankruptcy proceedings, where legal)

n. demographic information of customers (where legal)

o. geographic location of home or property (a property in an area that is difficult to access or service because of terrain such as mountainous terrain, road conditions, distance to home, weather, and the like represents more risk; in a similar vein, a rural or isolated property that lacks access to a local or national electrical grid or lacks access to a community water source/public water source may represent more risk)

p. cost of the service request, including parts, labor, and/or equipment

In one implementation, the state of repair information includes at least one of maintenance information, repair information, an age of the covered entities, or an indication of how often the covered entities are used by the subscriber. In examples, the physical attribute of the property includes at least one of an age of the property, a condition of the property, a location of the property, or a square footage of the property.

In another implementation, the subscriber information includes at least a number of repairs requested by the subscriber and a timeliness of payment information by the subscriber for each of the requested repairs, over a period of time that starts at a time of subscription.

It can also be appreciated that the risk factors might include at least state of operation information of covered entities at the property of the subscriber, wherein the state of operation information is included within sensor data sent from one or more sensors of the covered entities. For this purpose, real-time monitoring via smart home technology may be employed. In examples, smart thermostats and appliances such as smart refrigerators may include sensors that send their sensor data to the pricing system 90 or other system.

More detail for the pricing system is as follows. The pricing system might include a correlation engine that compares the price of the premium calculated by the pricing engine for the requested repair against one or more prices of one or more stored objects for repairs previously adjudicated by the platform that are related to the requested repair, where the pricing engine is configured to adjust the price for the premium in response to the comparison. For this purpose, in one example, the correlation engine may compare the price of the premium calculated by the pricing engine for the requested repair against one or more prices of related repairs stored in a third party database, where the pricing engine is configured to adjust the price for the premium in response to the comparison.

Additionally and/or alternatively, the pricing system may further include a ranking engine that identifies one or more stored objects for repairs previously adjudicated by the platform that are related to the requested repair, wherein the identification is based upon a ranking score that the ranking engine calculates for each of the one or more stored objects.

In yet another implementation, the pricing system may pass the calculated price of the premium for the requested repair, in conjunction with at least a portion of the risk factors upon which the pricing engine calculated the price, as input to a trained machine learning model to obtain a predicted price as output. Here, the pricing engine is configured to adjust the calculated price based upon the predicted price. In one example, the machine learning model was previously trained using training data 26 that includes a plurality of stored objects for repairs previously adjudicated by the platform, where the stored objects each include at least one of a price and the same risk factors.

More information regarding the risk factors are as follows in the disclosure. In one example, the one or more risk factors may be based on at least one of: a size of the property, an age of the property, a history of repair in the property, a make and model of systems and components in the property, an age of systems and components in the property, information obtained from one or more inspection reports for the property, and/or information provided by servicers for the property. In another example, the one or more risk factors may be based on at least one of: a customer score for the subscriber based on historical interactions with servicers, demographic information for the subscriber, and/or a history of service requests entered by the subscriber. In yet another example, the one or more risk factors may include public and semi-public information for the subscriber including at least one of: credit history, employment status, and/or court proceedings.

In another example embodiment, a computer-implemented method or process for providing intelligent pricing is disclosed. The method may calculate a price for a premium that an individual may pay to be a subscriber based upon one or more risk factors of a property, wherein the premium may be associated with a subscription that relates to at least one repair service possibly covered in a home protection plan for the property.

In one example implementation, the machine learning model may predict the anticipated claim expense for the home and the subscriber based on the inputs to the model. In another example, these inputs may be passed to a churn prediction model, and the churn prediction output of the model may be taken into consideration in order to generate a price that yields the greatest lifetime value for the customer. The integration of pricing to risk (e.g., expected claims expense) and churn prediction, for determining the price of a premium the subscriber has to pay, may be an important aspiration goal of the pricing system 92.

In another example implementation, a more rudimentary approach that may not include machine learning may be utilized to determine the price of the premium the subscriber pays. In one example, the gross margin for a subscriber over a previous year and the variation of the subscriber's gross margin from the average may be used.

It may also be appreciated that a history of repairs and upgrades to, and maintenance performed upon entities in the home may be an indicator of future service requests and thus impact the risk. A replacement of a system or subcomponent of a system and/or frequent maintenance of/preventative maintenance requests for that system may be an indication of claims reduction/a reduction in repair service requests in the future, because repairs may be less likely to occur. For this purpose, in one example, the subscriber may pay for a filter replacement service (e.g., for HVAC system and water filter for refrigerator). Here, the filters may ship with time-stamps, so service providers may check to determine if subscribers may be replacing their filters in a timely fashion. Alternatively, the filters may be "smart filters" that may have built-in sensors that may send sensor data including information regarding air flow and usage, and alerts including a recommended replacement date, in some examples.

Additionally and/or alternatively, the predicted cost of a repair service or predicted price that the subscriber has to pay may also predict the likelihood of a home insurance claim. Factors that may influence the likelihood of a home insurance claim may include a lack of maintenance performed (e.g., for maintaining HVAC), make and model data indicating a high likelihood of failures that may result in home insurance claims, and age of systems (e.g., age of water heater, furnace, etc.).

Additionally and/or alternatively, the pricing system 90 may correlate the predicted cost of a repair service or predicted price that the subscriber has to pay with product recall data that may be available via third parties. Such a correlation may provide insight as to whether a product recall was the primary reason for a repair service request, that a product recall was the primary reason why the manufacturer covered the repairs under the manufacturer's warranty, or that a lack of repair resulted to either a breakdown to a system, consequential damage to the system, or consequential damage to the home, in examples.

Additionally and/or alternatively, customer/subscriber ratings may also be passed as input to churn prediction models to ascertain risk.

In another example embodiment, a same day service system in a home services platform is disclosed. The same day service system includes a service request system, a broker service, and a smart scheduler service as well as optionally a servicer management system. In more detail, the service request system creates service requests for repair services requested by subscribers of the platform, where each service request relates to at least one repair service to be performed at a property of a subscriber and is possibly covered in a home protection plan for the subscriber. The broker service designates servicers to perform jobs at the properties of the subscribers associated with the service requests by matching servicer profile objects of servicers registered with the platform to the service requests, where the servicer profile objects may include information identifying the servicers and may include at least one repair service that the servicers provide, and binding at least some of the matching servicers to the jobs. The smart scheduler service 224 then schedules same-day times for the bound servicers to perform the jobs.

The same-day system may also include a servicer management system that creates the servicer profile objects for the servicers registered with the platform The scheduler service 224 may schedule same-day times for the bound servicers to perform the jobs based upon various criteria. These criteria may include:

a. availability of the bound servicers;

b. proximity of the bound servicers to the properties of the jobs at time of scheduling;

c. a trust score included within the servicer profile object for each of the bound servicers for each job;

d. a job rate included within the servicer profile object for each of the bound servicers for each job;

e a job type for each of the jobs;

f. performance history of the same job type by the bound servicers as the job type for each of the jobs; and g. whether preferred job types within the servicer profile objects for each of the servicers match the job type for each of the jobs.

The scheduler service may also schedule same-day times for the bound servicers to perform the jobs after receiving messages from the bound servicers confirming willingness of the bound servicers to perform the jobs.

In another example, the scheduler service may arrange for the purchase of at least some inventory for performing each job, in advance of the scheduled same-day times for the bound servicers to perform the jobs. In still another example, the scheduler service may schedule a specific bound servicer for same-day performance of the jobs based upon a trust score for the specific bound servicer.

It may also be appreciated that scheduling of jobs may be performed by an individual or an entity other than the smart scheduler service. In one example, a single servicer may be selected and dispatched/designated by the platform 10, and it may be the responsibility of the servicer to schedule with the subscriber. For this purpose, the subscriber may select available times based on an integration of the subscriber app 1102-1 with a field service management system. In another example, multiple servicers may qualify to perform a job. In one model, the platform 10 may forward the repair service request to servicers, and the first servicer to respond to the service request may then be designated by the platform 10 to perform the job. In another model, a "round robin" selection of servicers may be used, where the platform 10 may first forward the repair service request to the most preferred servicer (e.g., with highest trust score), and if the servicer does not reply, the platform 10 may forward the request to the next preferred servicer. The servicer may then accept the preferred times requested by the customer. In still another example model, "reverse scheduling" may be used. Here, one servicer may be selected and may enter their preferred times. The subscriber may then select from the preferred times.

In another example embodiment, a computer-implemented method or process for providing same day service system in a home services platform is disclosed. The method may create service requests for repair services requested by subscribers of a platform, where each service request may relate to at least one repair service to be performed at a property of a subscriber and may be possibly covered in a home protection plan for the subscriber. The method may also designate servicers to perform jobs at the properties of the subscribers associated with the service requests by matching servicer profile objects of servicers registered with the platform to the service requests. The servicer profile objects may include information identifying the servicers and including at least one repair service that the servicers provide, binds at least some of the matching servicers to the jobs, and schedules same-day times for the bound servicers to perform the jobs.

In other examples, the same day service system may predict the number of jobs and may obtain confirmation from the servicer in advance of the jobs, reserve and possibly pre-purchase inventory and other replacement parts in advance of the jobs, adjust the requested reserved inventory based on any "waste" (e.g., unperformed jobs that were prepaid), and may use a yield optimization algorithm to determine how many to reserve in advance to minimize wasteful expense but also maximize the number of customers getting same day service. The system may also provide home repair services in a home services platform that includes various modules for performing specific operations, and contains service request, machine learning, and prediction elements. This may include a system for creating service requests for appliances or equipment, receiving various data inputs relating to prior service requests with outcomes and diagnostic data, predicting whether each of the different types of repair jobs for which a respective prior service request was initially requested did in fact require the need for a service provider to be bound to them, predicting a date range of failure of the appliances or equipment based upon the data inputs, and scheduling a repair job in advance of the failure based on whether such repair job should be bound to a service provider and an analysis of a comparison of performance metrics of each service provider associated with prior jobs performed by each of the service providers. Various performance metrics may be utilized. The aforementioned, integral aspects of the claimed invention as a whole, offer significant advantages in that they not only predict: (a) whether each of the different types of repair jobs for which a respective prior service request was initially requested did in fact require the need for a service provider to be bound to them and (b) when appliances or equipment will fail, but also ensuring that a repair job of the failing appliance or equipment be performed prior to failure by the most appropriate service provider. Furthermore, the system improves over time by iteratively receiving updated data inputs and operating on a model thereof via machine learning to improve the accuracy of the need for a future repair job to be bound to a respective service provider. This system reflects the improvement in technology by explicitly setting forth the use of prediction engines and accompanying machine learning, and also sets forth the interplay between the various functions of the modules with the continual improvement to the model by iteratively improving its accuracy for use in future service requests.

In one embodiment, a system for providing home repair services in a home services platform includes one or more computers having non-transitory computer readable mediums having stored thereon instructions which, when executed by one or more processors of the one or more computers, causes the system to perform the steps of: (a) receiving a service request for a repair job to be performed on appliances or equipment at a home of a subscriber of the home services platform; (b) determining if a repair job is required of the appliance or equipment by: (1) receiving data inputs relating to: prior service requests requested by respective subscribers of the home services platform; prior scheduled appointments for each of the prior service requests; prior repair jobs of different types bound to and performed by respective service providers at each respective prior appointment; a corresponding outcome of each prior repair job; diagnostics data sent from one or more sensors associated with respective appliances or equipment of the home of the respective subscribers; and information about the respective appliances or equipment from the service providers bound to the prior repair jobs associated with the respective appliances or equipment; and (2) operating on a first machine learning model of the received data inputs to predict whether each of the different types of repair jobs for which a respective prior service request was initially requested does require any of the service providers to be bound to that type of repair job in the future because the respective appliance or equipment was required to be repaired, and over time improving the accuracy of the predicting whether a future repair job is required to be bound to any of the service providers by: (i) continually receiving updated sets of data inputs for each type of service request performed by each service provider; (ii) determining a prediction value for each of the updated sets of data inputs, wherein higher prediction values are representative of an appliance or equipment needing to be serviced by a service provider and lower prediction values are representative of an appliance or equipment not needing to be serviced by a service provider; (iii) determining a prediction value for the service request based on information associated with the service request provided by at least the subscriber regarding the appliance or equipment of the subscriber; (iv) designating a threshold prediction value representative of when an appliance or equipment of the subscriber is required to be serviced; (v) comparing the prediction value determined for the service request to the threshold prediction value and if the prediction value is equal to or greater than the threshold prediction value, allowing for the scheduling of the repair job for that appliance or equipment; and (vi) receiving data after completion of the repair job corresponding to whether the appliance or equipment was repaired and retraining the first machine learning model (via an algorithm) to reflect the accuracy or inaccuracy of the prediction value determined for the service request; (c) designating a specific service provider for the repair job of the appliance or equipment by: (1) receiving performance metrics of each service provider including a dispatch cost and a claim cost; a customer ranking created from one or more customer surveys; a job acceptance rate; a service fee collection rate; and a task-specific service repair rate; and (2) operating on a second machine learning model using an analysis of a comparison of the performance metrics of each service provider associated with prior jobs performed by each of the service providers, wherein the analysis includes: (i) determining a payment value based on the plurality of performance metrics; (ii) continually updating the payment value for each type of job as new jobs of all the service providers are performed; (iii) predicting which of the payment values for each of the prior type of jobs represents a type of job for which a service provider was approved resulting in increased claim expenses for the home services platform, and designating such payment value as a threshold for future approval of the same types of jobs; (iv) automatically approving the specific service provider for the repair job if the payment value associated with a previous same type of job as the approved scheduled job is above the threshold; (v) receiving data after completion of the repair job by the specific service provider and retraining the second machine learning model (via an algorithm) to reflect the accuracy or inaccuracy of approval of the specific service provider based on a determination of whether or not the repair job by the specific service provider results in increased claim expenses for the home services platform; and (d) scheduling a repair job for the service request for the respective appliance or equipment based on: (1) the prediction that the future repair job is to be bound to one of the service providers; and (2) the approval of the specific servicer provider.

A claim adjudication system in a home services platform includes a controller and a memory that stores non-transitory computer instructions for execution by the controller, wherein the controller may be configured to execute the non-transitory computer instructions to cause the claim adjudication system to perform the steps of: (a) receiving a service request for a property of a subscriber, and wherein the service request relates to at least one repair service possibly covered by a home protection plan for the property of the subscriber; (b) receiving a designation of a servicer to perform a job at the property of the subscriber, based upon one or more problems identified by the subscriber in the service request, and receive a job estimate object for the job from the servicer that includes the one or more problems identified by the subscriber and an estimated cost prepared by the servicer to address the one or more problems; (c) analyzing via a machine learning engine a plurality of performance metrics of all servicers associated with each of the prior jobs performed by the servicers for the home services platform, wherein the analyzing includes, for each prior job: (1) receiving a first data input corresponding to a type of job that addressed one of the problems identified by the subscriber; (2) receiving a second data input corresponding to a ratio of repair rate to maintenance in having addressed one of the problems identified by the subscriber; (3) receiving a third data input corresponding to an out-of-pocket expenses cost charged to subscribers in having the servicer having addressed one of the problems; (4) receiving a fourth data input corresponding to an acceptance rate for each type of job previously designated to the servicer in having addressed one of the problems; (5) determining a variable payment value via a service performance engine based on the first, second, third, and fourth data inputs; (6) continually updating the variable payment value for each type of job by repeating steps (1)-(5) as new jobs of all the servicers are performed; and (7) predicting which of the variable payment values for each of the prior type of jobs represents a type of job for which a servicer was unnecessarily approved resulting in increased claim expenses for the home services platform and designating such variable payment values as a threshold for future approval of the same types of jobs; and (e) automatically approving the performance of the job in whole or in part by the servicer based upon: (1) coverage limits in the home protection plan for the job; (2) the variable payment value associated with a previous same type of job as the approved job that is above the threshold; and (3) a minimum trust score calculated for the servicer. A servicer being unnecessarily approved may relate to a servicer not having addressed one of the problems identified by the subscriber yet still being paid by the home services platform. The intent of the system is to identify situations where approval of a servicer is only made when there is a more likely-than-not or greater chance or high-certainty threshold that a service (e.g., repair) is required and would be performed that results in the service addressing the reason for the requested service.

An intelligent pricing system in a home protection and service automation platform includes one or more computers having non-transitory computer readable mediums having stored thereon instructions which, when executed by one or more processors of the one or more computers, may cause the system to perform the steps of: (a) receiving risk factor inputs relating to: (1) a physical attribute of respective properties of subscribers of the platform; (2) a coverage level selected by the respective subscribers of the platform; (3) state of repair information for covered entities at the property; and (4) subscriber information associated with repair-related activities at the property; (b) calculating via a pricing engine a premium that respective subscribers of the platform pay based upon the risk factor inputs of the respective properties, wherein the premium is associated with a subscription that relates to at least one repair service covered in a home protection plan for the respective properties, wherein the premium corresponds to an expected claim expense to be paid by the platform for the at least one repair service; (c) operating on a machine learning model of the received risk factor inputs and premiums to predict claim expenses for at least one repair service for future subscribers without the need to obtain risk factors inputs specific to any one particular property of the future subscriber by: (1) continually receiving updated risk factor inputs; (2) determining a premium for each of the updated risk factor inputs; (3) associating respective values for each of the risk factor inputs and premiums; (4) receiving a portion of the risk factor inputs corresponding to a new subscriber; (5) associating a predictive value for the portion of the risk factors and performing a best-match analysis to the existing respective values to determine the corresponding premium that minimizes claim expenses to the platform for the at least one repair service for that new subscriber; (6) analyzing the claim expenses during a defined period of time for that new subscriber to determine if associating the predictive value for the portion of the risk factors resulted in claim expenses that were equal or less than the claim expenses associated with the expected claim expense for the at least one repair service of the new subscriber; and (7) retraining the machine learning model to reflect the accuracy or inaccuracy of the predictive value determined for the portion of the risk factors; and (d) generating via a churn prediction model engine a price that yields a greatest lifetime value for the respective customers, and wherein the pricing engine adjusts the calculated premium based upon the respective predicted claim expense and the churn prediction generated price.

A computer-implemented system and method for providing home services may include: (a) creating service requests for repair services requested by subscribers of a home services platform, wherein each service request relates to at least one repair service to be performed at a property of each subscriber and is possibly covered in a home protection plan for each subscriber; (b) creating servicer profile objects for servicers registered with the platform, wherein the servicer profile objects include information identifying the servicers and include the at least one repair service that the servicers provide; (c) designating servicers registered with the platform to perform jobs at same-day times on the day when the service requests were made at the properties of the subscribers associated with the service requests by matching the servicer profile objects of the servicers to the service requests; (d) binding at least some of the matching servicers to the jobs; (e) maintaining an inventory of pre-reserved appointments used for booking the jobs by the servicers, wherein the pre-reserved appointments represent the inability of the servicers from booking another appointment with an entity other than the home services platform at a time of the pre-reserved appointment; (f) pre-purchasing the pre-reserved appointments from the servicers by the home services platform; (g) receiving data inputs at the home services platform relating to: (1) a repair service performed by the respective servicers at prior appointments of respective subscribers of the home services platform; and (2) a corresponding outcome of each repair service; (h) using a yield optimization algorithm via machine learning engine to operate on a model of: (1) the pre-purchased pre-reserved appointments to determine over time the amount of pre-reserved appointments to pre-purchase in the future by (i) minimizing an amount of pre-reserved appointments not having the jobs performed at the pre-reserved appointments and (ii) maximizing an amount of the scheduled same-day times for the bound servicers; and (2) the data inputs to predict whether or not each of the requested repair services for which a respective service request was created requires that a matching service provider be bound to the job, and over time with further inputs improving the accuracy of the need for a job to be bound to a matching service provider, wherein the yield optimization algorithm is continually retrained upon outcomes of a large number of service jobs such that an optimal inventory of pre-reserved appointments is maintained that balances the benefit of same-day service and the cost of maintaining unused inventory of pre-reserved appointments to decrease expenses of the home services platform; (i) scheduling the same-day times for the bound servicers to perform the jobs at one of the pre-reserved appointments purchased based on the yield optimization algorithm, and further based upon a trust score included within the servicer profile object for each of the bound servicers for each job; and (j) updating each of the trust scores upon completion of performance of the jobs.

An intelligent pricing system in a home protection and service automation platform may include one or more computers having non-transitory computer readable mediums having stored thereon instructions which, when executed by one or more processors of the one or more computers, causes the system to perform the steps of: (a) receiving risk factor inputs relating to: (1) a physical attribute of respective properties of subscribers of the platform; (2) a coverage level selected by the respective subscribers of the platform; (3) state of repair information for covered entities at the property; and (4) subscriber information associated with repair-related activities at the property; (b) calculating via a pricing engine an original premium that respective subscribers of the platform pay based upon the risk factor inputs of the respective properties, wherein the original premium is associated with a subscription that relates to at least one repair service covered in a home protection plan for the respective properties, wherein the original premium corresponds to an expected claim expense to be paid by the platform for the at least one repair service; (c) operating on a machine learning model of the received risk factor inputs and a plurality of calculated premiums to predict claim expenses for at least one repair service for future potential subscribers without the need to obtain risk factors inputs specific to any one particular property of the future potential subscriber by: (1) continually receiving updated risk factor inputs; (2) determining a premium for each of the updated risk factor inputs; (3) associating respective values for each of the risk factor inputs and premiums; (4) receiving a portion of the risk factor inputs corresponding to a new subscriber; (5) associating a predictive value for the portion of the risk factors and performing a best-match analysis to the existing respective values to determine the corresponding premium that minimizes claim expenses to the platform for the at least one repair service for that new subscriber; and (6) analyzing the claim expenses during a defined period of time for that new subscriber to determine if associating the predictive value for the portion of the risk factors resulted in claim expenses that were equal or less than the claim expenses associated with the expected claim expense for the at least one repair service of the new subscriber; (d) transmitting the calculated original premium to an application operating on a user device of one of the future potential subscribers of the home protection plan; (e) receiving data from the user device corresponding to a selection of a rejection instead of an acceptance of the calculated original premium; and (f) in response to receiving the data corresponding to the rejection, retraining the machine learning model to reflect a user price sensitivity to the calculated original premium, wherein the pricing engine calculates a new premium for the same risk factor inputs that were used to calculate the original premium for the home protection plan. The system may further perform the steps of: (a) transmitting the new premium to the application operating on the user device of the one of the future potential subscribers of the home protection plan; (b) receiving data from the user device corresponding to a selection of an acceptance of the new premium by the one of the future potential subscribers; and (c) in response to receiving data corresponding to acceptance, retraining the machine learning model to reflect a user price insensitivity to the new premium, wherein the system transmits the future premiums to other future potential subscribers requesting a home protection plan that covers the same risk factor inputs as associated with the home protection plan of the one of the future potential subscribers. It is to be understood that the recalculated premiums may have modified coverage associated with them and be adjusted by various factors to still maximize revenue (e.g., providing the same originally quoted coverage with a lowered premium, but locking in the subscriber to a longer subscription to make up for the lowered premium).

Methods and systems for enabling a host provider to provide a consumer homeowner with improved maintenance and repair services for items in the home are included under a subscription model that provides the consumer with predictable cost while assuring reliable services. The predictable cost and that presented for acceptance may be modified by interaction with remote data input from potential subscribers in real-time to maximize the amount of actual subscribers.

It is to be understood that training and retraining various machine learning models may be done by a computer based on various input data and training algorithms that may be focused on different objectives and optimizations. One such algorithm may be backpropagation. Other types of artificial intelligence machine-learning methods and algorithms that may be utilized include but are not limited to: Supervised learning (ANOVA, Averaged one-dependence estimators, Artificial neural network: Convolutional neural network, Extreme learning machine, Feedforward neural network, Logic learning machine, Long short-term memory, Recurrent neural network, Self-organizing map; Bayesian networks, Boosting, Case-based reasoning, Conditional random field, Decision tree algorithms: C4.5 algorithm, C5.0 algorithm, Chi-squared automatic interaction detection, Classification and regression tree, Conditional decision tree, Decision stump, Decision tree, ID3 algorithm, Iterative dichotomiser 3, Random forest, SLIQ; Ensembles of classifiers, Bootstrap aggregating, Boosting, Gaussian process regression, Gene expression programming, Group method of data handling, Inductive logic programming, Information fuzzy networks, Instance-based learning, K-nearest neighbor, Lazy learning, Learning vector quantization, Linear: Elastic-net, Lasso, Linear discriminant analysis, Linear regression, Logistic regression, Multinomial logistic regression, Naive bayes classifier, Ordinary least squares, Passive aggressive algorithms, Perceptron, Polynomial regression, Ridge regression/classification, Support vector machine; Logistic model tree, Minimum message length: Analogical modeling, Nearest neighbor algorithm; Ordinal classification, Probably approximately correct learning, Quadratic classifiers, Random forests, Ripple down rules, Symbolic machine learning); Semi-supervised learning (Active learning, Co-training, Graph-based methods, Generative models, Low-density separation, Transduction); Unsupervised learning (Association rule learning: Apriori algorithm, Eclat algorithm, FP-growth algorithm; Auto-encoders, Cluster analysis: BIRCH, Conceptual clustering, DBSCAN, Expectation-maximization, Fuzzy clustering, Hierarchical clustering, K-means clustering, K-medians, Mean-shift, OPTICS algorithm, Single-linkage clustering; Dimensionality reduction: Canonical correlation analysis, Dynamic mode decomposition, Factor analysis, Feature extraction, Feature selection, Independent component analysis, Linear discriminant analysis, Multidimensional scaling, Non-negative matrix factorization, Partial least squares regression, Principal component analysis, Principal component regression, Projection pursuit, Sammon mapping, T-distributed stochastic neighbor embedding; Expectation-maximization algorithm, Generative topographic map, Information bottleneck method, Manifold learning, Vector quantization); Reinforcement learning (Deterministic policy gradient, Learning automata, Proximal policy optimization, Q-learning, Soft actor-critic, State-action-reward-state-action, Temporal difference learning, Trust region policy Optimization); Other (Bayesian belief network, Bayesian knowledge base, Deep belief networks, Deep Boltzmann machines, Deep neural networks, Discrepancy modelling, Gaussian naive bayes, Generative adversarial network, Hierarchical temporal memory, Knowledge-enhanced machine learning, Markov models, Multinomial naive bayes, Neural style transfer, Physics-informed machine learning, Sparse identification of nonlinear dynamics, Transformer).

It is to be understood that any of the foregoing functionalities and/or processes may be integrated with any other disclosed functionality/processes. Similarly, any functionality and/or processes may be removed.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

Artificial intelligence, machine learning, expert systems, robotic process automation systems, deep learning systems, supervised learning systems, semi-supervised learning systems, and the like may be used for the various operations described herein, including classification, state determination, status determination, prediction, automation, optimization, recommendations, and others. Such systems may use neural networks, including feedback neural networks, feed forward neural networks, convolutional neural networks, recurrent neural networks, other neural networks, and the like.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the disclosure.

While the disclosure has been disclosed in connection with the preferred embodiments shown and described in detail, various modifications and improvements thereon will become readily apparent to those skilled in the art. Accordingly, the spirit and scope of the disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") disclosed herein, is intended merely to better illuminate the disclosure and does not pose a limitation on the scope of the disclosure unless otherwise claimed. No language in the specification should be construed as indicating any non-claimed element as essential to the practice of the disclosure.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. An intelligent pricing system in a home protection and service automation platform, the system comprising one or more computers having non-transitory computer readable mediums having stored thereon instructions which, when executed by one or more processors of the one or more computers, causes the system to perform the steps of:

(a) receiving risk factor inputs relating to:

(1) a physical attribute of respective properties of subscribers of the platform;

(2) a coverage level selected by the respective subscribers of the platform;

(3) state of repair information for covered entities at the property; and (4) subscriber information associated with repair-related activities at the property;

(b) calculating via a pricing engine an original premium that respective subscribers of the platform pay based upon the risk factor inputs of the respective properties, wherein the original premium is associated with a subscription that relates to at least one repair service covered in a home protection plan for the respective properties, wherein the original premium corresponds to an expected claim expense to be paid by the platform for the at least one repair service;

(c) operating on a machine learning model of the received risk factor inputs and a plurality of calculated premiums to predict claim expenses for at least one repair service for future potential subscribers without the need to obtain risk factors inputs specific to any one particular property of the future potential subscriber by:

(1) continually receiving updated risk factor inputs;

(2) determining a premium for each of the updated risk factor inputs;

(3) associating respective values for each of the risk factor inputs and premiums;

(4) receiving a portion of the risk factor inputs corresponding to a new subscriber;

(5) associating a predictive value for the portion of the risk factors and performing a best-match analysis to the existing respective values to determine the corresponding premium that minimizes claim expenses to the platform for the at least one repair service for that new subscriber; and (6) analyzing the claim expenses during a defined period of time for that new subscriber to determine if associating the predictive value for the portion of the risk factors resulted in claim expenses that were equal or less than the claim expenses associated with the expected claim expense for the at least one repair service of the new subscriber;

(d) transmitting the calculated original premium to an application operating on a user device of one of the future potential subscribers of the home protection plan;

(e) receiving data from the user device corresponding to a selection of a rejection instead of an acceptance of the calculated original premium;

(f) in response to receiving the data corresponding to the rejection, retraining the machine learning model in real-time to reflect a user price sensitivity to the calculated original premium;

(g) preventing a future transmission of the calculated original premium for the same risk factor inputs that were used to calculate the original premium for the home protection plan;

(h) calculating in real-time via the pricing engine a new premium for the same risk factor inputs that were used to calculate the original premium for the home protection plan;

(i) transmitting the new premium to the application operating on the user device of the one of the future potential subscribers of the home protection plan;

(l) receiving data from the user device corresponding to a selection of an acceptance of the new premium by the one of the future potential subscribers;

(k) in response to receiving data corresponding to acceptance, retraining the machine learning model in real-time to reflect a user price insensitivity to the new premium, wherein the user price insensitivity corresponds to an acceptance rate of the new premium by the future potential subscribers that maximizes an amount of the future potential subscribers in comparison to an amount of future potential subscribers that would have accepted the original premium; and (l) transmitting the future premiums to other future potential subscribers requesting a home protection plan that covers the same risk factor inputs as associated with the home protection plan of the one of the future potential subscribers; and (m) continually retraining the machine learning model in real-time to reflect any user price sensitivities relating to the new premium.

* * * * *